United States Patent
Pugh et al.

(10) Patent No.: US 10,204,329 B2
(45) Date of Patent: Feb. 12, 2019

(54) SYSTEM AND METHOD FOR EFFECTING PAYMENT FOR POS PURCHASES

(71) Applicant: Meijer, Inc., Grand Rapids, MI (US)

(72) Inventors: Brian Pugh, Grand Rapids, MI (US); Elmer L. Robinson, Jr., Marne, MI (US); David Scott Pallas, Hudsonville, MI (US); K. Michael Ross, Grand Rapids, MI (US)

(73) Assignee: Meijer, Inc., Grand Rapids, MI (US)

( * ) Notice: Subject to any disclaimer, the term of this patent is extended or adjusted under 35 U.S.C. 154(b) by 319 days.

(21) Appl. No.: 14/965,837

(22) Filed: Dec. 10, 2015

(65) Prior Publication Data

US 2016/0171469 A1    Jun. 16, 2016

Related U.S. Application Data

(60) Provisional application No. 62/090,196, filed on Dec. 10, 2014.

(51) Int. Cl.
| | | |
|---|---|---|
| *G06Q 20/00* | (2012.01) | |
| *G06Q 20/20* | (2012.01) | |
| *G06Q 20/38* | (2012.01) | |
| *G06Q 20/22* | (2012.01) | |

(52) U.S. Cl.
CPC .......... *G06Q 20/20* (2013.01); *G06Q 20/227* (2013.01); *G06Q 20/385* (2013.01)

(58) Field of Classification Search
CPC ..... G06Q 20/20; G06Q 20/227; G06Q 20/385
USPC .................................................. 705/16, 25
See application file for complete search history.

(56) References Cited

U.S. PATENT DOCUMENTS

| | | | |
|---|---|---|---|
| 8,965,800 B2* | 2/2015 | Soysa | G06Q 20/327 705/30 |
| 2003/0078094 A1* | 4/2003 | Gatto | G07F 17/32 463/25 |
| 2008/0121726 A1* | 5/2008 | Brady | G06K 19/06196 235/493 |
| 2015/0242892 A1* | 8/2015 | Priebatsch | G06Q 30/0255 705/14.53 |

* cited by examiner

*Primary Examiner* — Rokib Masud
(74) *Attorney, Agent, or Firm* — Barnes & Thornburg LLP

(57) ABSTRACT

A system and method effecting payment for POS purchases includes a database in which a unique code is associated with one of one or more electronic payment systems specified by a customer having one of a plurality of enterprise membership service identification codes stored in the database that uniquely identifies the customer as one of a plurality of shopper members of an enterprise membership service program associated with a retail enterprise. In response to receipt by an input device of a point-of-sale system of the retail enterprise of a manually-supplied code as part of a transaction for the purchase of one or more items, a processor processes payment for the one or more items using the one of the one or more electronic payment systems if the manually-supplied code matches the unique code associated with the one of the one or more electronic payment systems in the database.

20 Claims, 15 Drawing Sheets

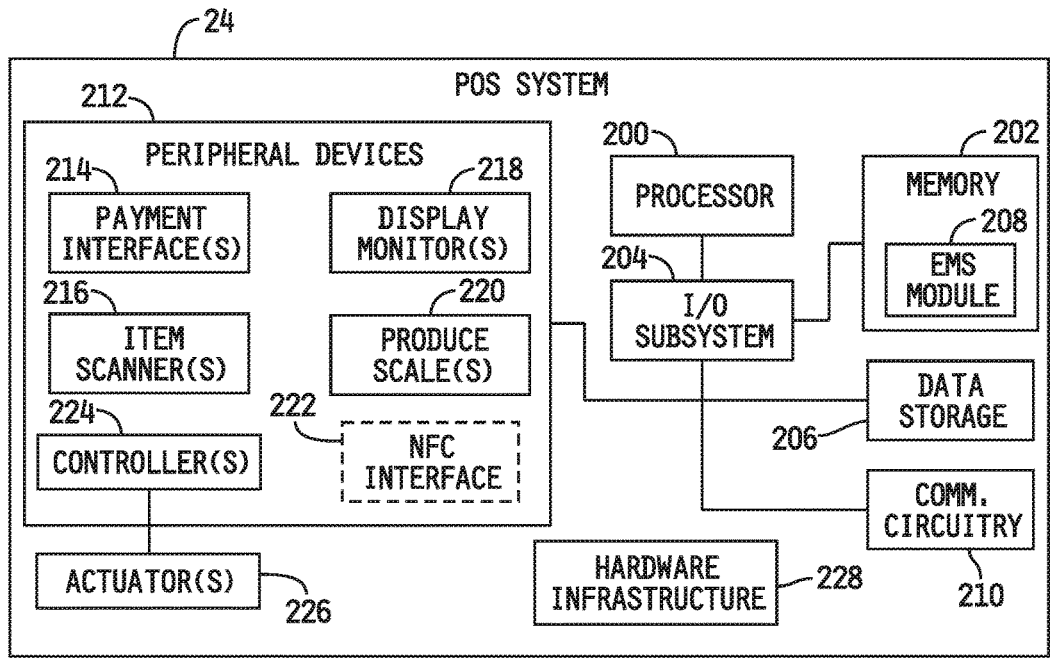
FIG. 2
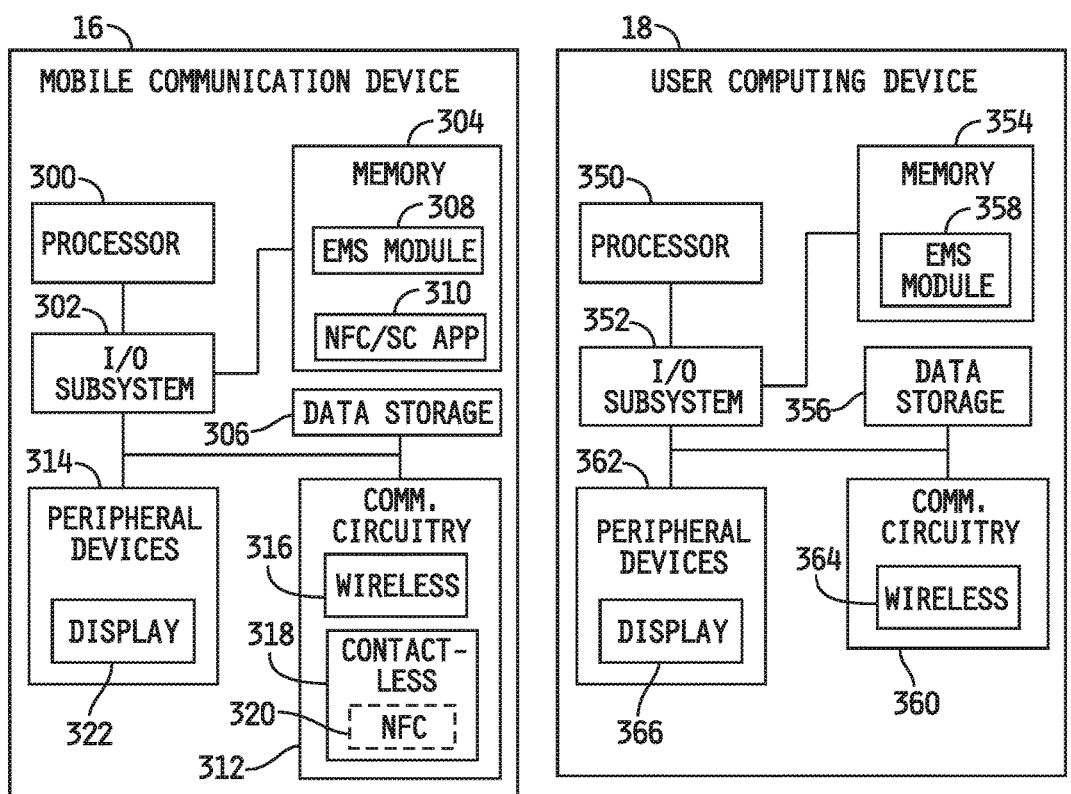
FIG. 3A
FIG. 3B

SYSTEM AND METHOD FOR EFFECTING PAYMENT FOR POS PURCHASES

CROSS-REFERENCE TO RELATED APPLICATIONS

This patent application claims the benefit of, and priority to, U.S. Provisional Patent Application Ser. No. 62/090,196, filed Dec. 10, 2014, the disclosure of which is expressly incorporated herein by reference.

FIELD OF THE INVENTION

The present invention relates generally to systems and methods for effecting payment for point-of-sale purchases at a retail enterprise, and more specifically to systems and methods for effecting such payment using an instrument of electronic funds transfer.

BACKGROUND

Retailers of goods and services typically offer such goods and services for purchase via one or more conventional brick-and-mortar retail stores. It may be desirable for retailers to offer a shopper membership service program to their customers for the purpose of offering shopping benefits and/or tracking customer purchases over time. It may further be desirable to include in such a shopper membership service program a mechanism via which customers can pay for purchases using an instrument of electronic funds transfer in a manner that does not require the customers to produce or supply a tangible form of the instrument at the point-of-sale.

SUMMARY

The present invention may comprise one or more of the features recited in the attached claims, and/or one or more of the following features and combinations thereof. In one aspect, a method of effecting payment for POS purchases may comprise creating, with a processor, a unique code, associating, with the processor in a database, the unique code with one of one or more electronic payment systems specified by a customer having one of a plurality of enterprise membership service identification codes stored in the database that uniquely identifies the customer as one of a plurality of shopper members of an enterprise membership service program associated with a retail enterprise, and in response to receipt by an input device of a point-of-sale system of the retail enterprise of a manually-supplied code as part of a transaction for the purchase from the retail enterprise of one or more items, processing payment for the one or more items using the one of the one or more electronic payment systems if the manually-supplied code matches the unique code associated with the one of the one or more electronic payment systems in the database.

In another aspect, a system for effecting payment for POS purchases may comprise at least one database having stored therein (a) a plurality of enterprise membership service identification codes each uniquely identifying a different customer as a shopper member of an enterprise membership service program associated with a retail enterprise, (b) two or more electronic payment systems each associated with a different one of the plurality of enterprise membership service identification codes, and (c) a unique code associated with one of the two or more electronic payment systems that is associated with one of the plurality of enterprise membership identification codes, a processor, a point-of-sale system controlled, at least in part, by the processor, the point-of-sale system including an input device, and memory having instructions stored therein which, when executed by the processor, cause the processor to process, in response to receipt by the input device of the point-of-sale system of the retail enterprise of a manually-supplied code as part of a transaction for the purchase from the retail enterprise of one or more items, payment for the one or more items using the one of the one or more electronic payment systems if the manually-supplied code matches the unique code associated with the one of the one or more electronic payment systems in the database.

In yet another aspect, a system for effecting payment for POS purchases may comprise at least one database having stored therein (a) a plurality of enterprise membership service identification codes each uniquely identifying a different customer as a shopper member of an enterprise membership service program associated with a retail enterprise, (b) two or more electronic payment systems each associated with a different one of the plurality of enterprise membership service identification codes, and (c) a unique code associated with one of the two or more electronic payment systems that is associated with one of the plurality of enterprise membership identification codes, a point-of-sale system including an input device, and a server coupled to the point-of-sale system, the server including at least one module to process, in response to receipt by the input device of the point-of-sale system of the retail enterprise of a manually-supplied code as part of a transaction for the purchase from the retail enterprise of one or more items, payment for the one or more items using the one of the one or more electronic payment systems if the manually-supplied code matches the unique code associated with the one of the one or more electronic payment systems in the database.

In still another aspect, a non-transitory machine-readable medium comprising a plurality of instructions which, when executed by at least one processor, may result in the at least one processor associating, in a database, a unique code with one of one or more electronic payment systems specified by a customer having one of a plurality of enterprise membership service identification codes stored in the database that uniquely identifies the customer as one of a plurality of shopper members of an enterprise membership service program associated with a retail enterprise, and in response to receipt by an input device of a point-of-sale system of the retail enterprise of a manually-supplied code as part of a transaction for the purchase from the retail enterprise of one or more items, processing payment for the one or more items using the one of the one or more electronic payment systems if the manually-supplied code matches the unique code associated with the one of the one or more electronic payment systems in the database.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

FIG. 2 is a simplified block diagram of an embodiment of one of the point-of-sale systems illustrated in FIG. 1.

FIG. 3A is a simplified block diagram of an embodiment of one of the mobile communication devices illustrated in FIG. 1.

FIG. 3B is a simplified block diagram of an embodiment of one of the user computing devices illustrated in FIG. 1.

DETAILED DESCRIPTION OF THE DRAWINGS

Figure 1:
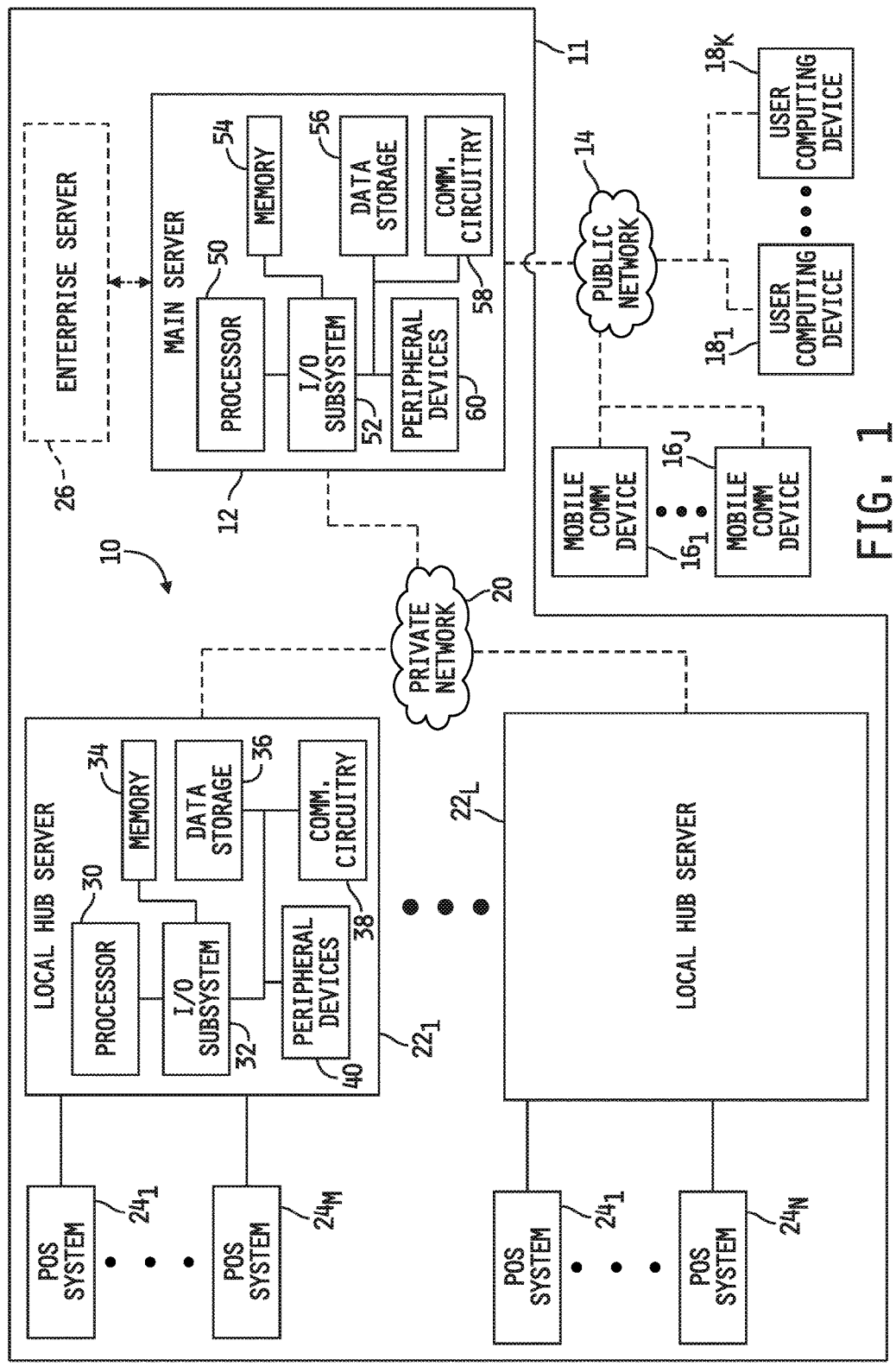
FIG. 1 is a simplified block diagram of an embodiment of a system for effecting payment for POS purchases.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic, and/or any subset of features, structures, process, process steps or characteristics, disclosed herein may be combined with any one or more other disclosed feature, structure, process, process step or characteristic, whether or not explicitly described, and it will be understood that no limitations on the types and/or number of such combinations are therefore intended or should be inferred.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more machine-readable media, which may be read and executed by one or more processors. A machine-readable medium should be understood to mean a non-transitory machine-readable medium, i.e., one that does not include transitory signals, and such a machine-readable medium may illustratively be embodied as any device or physical structure for storing or transmitting information in a form readable by a machine (e.g., a computing device). For example, and without limitation, a machine-readable medium may be embodied as any one or combination of read

System Components

Referring now to FIG. 1, a system 10 is shown for effecting payment for POS purchases. The system 10 includes a retail enterprise 11 having a main server 12 configured to communicate with customers of the retail enterprise via a public network 14, e.g., the Internet, and customers may access the public network 14 using any conventional public network accessible electronic device and/or system. In the illustrated embodiment, for example a number, J, of mobile communication devices $16_1$-$16_J$ are shown, where J may be any positive integer. The retail enterprise 11 may include any number of brick-and-mortar retail stores or locations each having one or more point-of-sale systems $24_1$-$24_M$ operating therein. As used herein, the phrases "brick-and-mortar enterprise location" and brick-and-mortar store" will be understood to be synonymous. In any case, the main server 12 is configured to communicate with each such point-of-sale (POS) system $24_1$-$24_M$, each of which operates in a conventional manner to process items to be purchased by customers during purchase transactions. In some embodiments, as will be described in greater detail below, the main server 12 may be coupled, e.g., via a private network 20, to one or more local hub servers $22_1$-$22_L$ each associated with one of the brick-and-mortar stores, wherein each such hub server $22_1$-$22_L$ is communicatively coupled to any number of POS system(s) $24_1$-$24_N$. In some alternate embodiments, some or all of the local hub servers $22_1$-$22_L$ may be omitted and for each such omitted local hub server $22_1$-$22_L$, the main server 12 may be coupled directly to the corresponding POS system(s) $24_1$-$24_M$, $24_1$-$24_N$.

In the embodiment illustrated in FIG. 1, the main server 12 is illustratively coupled via a private network 20 to a plurality of local hub servers 22, and each local hub server 22 is associated with a different one of the one or more brick-and-mortar stores. Some retail enterprises 11 may include a single brick and mortar outlet, and other larger retail enterprises 11 may include two or more physically remote brick and mortar outlets. In the latter case, the retail enterprise 11 may include, for example, a main physical location with two or more remote physical locations, and for purposes of this document the two or remote physical locations in such an arrangement are referred to as "hub" locations. In this disclosure, the system 10 will be illustrated and described in the context of such a larger retail enterprise having a main physical location and two or more physical hub locations. In this regard, the main server 12 in the system 10 shown in FIG. 1 will typically be located at a main business location of the retail enterprise, and will be coupled via the network 20 to two or more local hub servers 22, each of which will typically be located at a different one of the two or more hub locations. In embodiments which do not include any local hub servers $22_1$-$22_L$, the main server 12 will be coupled via the network 20 to the one or more POS systems $24_1$-$24_M$, $24_1$-$24_N$. In any case, communicative coupling between the local hub server 22 or the main server 12 and the one or more point-of-sale systems $24_1$-$24_M$, $24_1$-$24_N$ may be accomplished using any known hardware and/or wireless communication coupling, and communications over any such hardwire and/or wireless coupling may be accomplished using any known communication protocol.

In some alternative embodiments, as described above, one or more (or all) of the local hub servers $22_1$-$22_L$ may be omitted. In other alternative embodiments, the main server 12 may be omitted and at least one of the local hub servers 22 may be configured to act as a so-called master server with the remaining local hub servers 22 configured to act as so-called slave servers. In still other alternative embodiments in which the retail enterprise 11 includes only a single brick and mortar outlet, the local hub servers 22 may be or include the main server 12 or vice versa. For purposes of the following description, any process disclosed as being controlled by the main server 12 may, in some embodiments, instead be controlled, in whole or in part, by one or more local hub servers 22 and vice versa, and/or may be controlled, in whole or in part, by one of the point-of-sale systems $24_1$-$24_M$, $24_1$-$24_N$ and vice versa.

In embodiments which include one or more local hub servers $22_1$-$22_L$, each such local hub server 22 may be embodied as any type of server (e.g., a web server) or similar computing device capable of performing the functions described herein. In the illustrative embodiment of FIG. 1, the local hub server 22 includes a processor 30, an I/O subsystem 32, a memory 34, a data storage 36, a communication circuitry 38, and one or more peripheral devices 40. It should be appreciated that the local hub server 22 may include other components, sub-components, and devices commonly found in a server and/or computing device, which are not illustrated in FIG. 1 for clarity of the description.

The processor 30 of the local hub server 22 may be embodied as any type of processor capable of executing software/firmware, such as a microprocessor, digital signal processor, microcontroller, or the like. The processor 30 may be a single processor or include multiple processors. The I/O subsystem 32 of the local hub server 22 may be embodied as circuitry and/or components to facilitate input/output operations with the processor 30 and/or other components of the local hub server 22. The processor 30 is communicatively coupled to the I/O subsystem 32.

The memory 34 of the user local hub server 22 may be embodied as or otherwise include one or more conventional volatile and/or non-volatile memory devices. The memory 34 is communicatively coupled to the I/O subsystem 32 via a number of signal paths. Although only a single memory device 34 is illustrated in FIG. 1, the local hub server 22 may be or include any number of memory devices. Various data and software may be stored in the memory 34. The data storage 36 is also communicatively coupled to the I/O subsystem 32 via a number of signal paths, and may be embodied as any type of device or devices configured for the short-term or long-term storage of data such as, for example, memory devices and circuits, memory cards, hard disk drives, solid-state drives, or other data storage devices.

The communication circuitry 38 of the local hub server 22 may include any number of devices and circuitry for enabling communications between the local hub sever 22 and the main server 12 and/or between the local hub server 22 and the one or more point-of-sale systems $24_1$-$24_M$, $24_1$-$24_N$. In the illustrated embodiment, for example, communication between the local hub server 22 and the main server 12 takes place wirelessly via the network 20, wherein the network 20 may represent, for example, a private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the local hub server 22 and the main server 12 may be a non-private network and/or may be, in whole or in part, a wired connection. Generally, the communication circuitry 38 may be configured to use any one or more, or combination, of conventional secure and/or unsecure communication protocols to communicate with the main server 12. As such, the network 20 may include any number of additional devices, such as additional computers, routers, and switches, to facilitate communications between the local hub server 22 and the main server 12. Communication between the local hub server 22 and the one or more point-of-sale systems $24_1$-$24_M$, $24_1$-$24_N$ may take place via one or more such wireless communication interfaces and/or via one or more conventional wired interfaces.

In some embodiments, the local hub server 22 may also include one or more peripheral devices 40. Such peripheral devices 40 may include, for example, but are not limited to, any number of additional input/output devices, interface devices, and/or other peripheral devices. For example, the peripheral devices 40 may include a display, a keyboard, a mouse, audio processing circuitry, and/or other input/output devices.

Others of the local hub servers $22_1$-$22_L$, e.g., serving other brick-and-mortar locations, may be substantially similar to the local hub server 22 and include similar components. As such, the description provided above of the components of the local hub server 22 may be equally applicable to such similar components of other local hub servers and are not repeated herein so as not to obscure the present disclosure. Of course, it should be appreciated that in some embodiments one or more of the local hub servers 22 and may be dissimilar to others of the local hub servers 22.

An embodiment of the main server 12 is also illustrated in FIG. 1, and generally includes the same components as the local hub server 22. For example, a processor 50 is coupled to an I/O subsystem 52, and the I/O subsystem 52 is coupled to a memory 54, a data storage unit 56, communication circuitry 58 and one or more peripheral devices 60. In some embodiments, each of the foregoing components may be identical to corresponding components of the local hub server 22 described above, and a detailed explanation of such components therefore will not be repeated here. In other embodiments, the main server 12 may be configured differently than the local hub server 22 described above. In any case, the communication circuitry 38 of each of the local hub servers 22 facilitates communication with the communication circuitry 58 of the main server 12 and vice versa so that information can be shared between the main server 12 and each of the one or more local hub servers 22 via the network 20. Although only one such main server 12 is shown in FIG. 1, it should be appreciated that, in other embodiments, the system 10 may include any number of main servers, and in still other embodiments the main server 12 may be communicatively coupled to one or more remote servers of the retail enterprise, e.g., at least one remote enterprise server 26 as shown by dashed-line representation in FIG. 1. Any such one or more remote servers 26 may include any structure or feature illustrated and described herein with respect to the main server 12, and may be configured to execute any one or more functions described with respect to the main server 12 either alternatively to the main server 12 or in addition to the main server 12. In any case, the main server 12 may be embodied as any type of server (e.g., a web server) or similar computing device capable of performing the functions described herein.

In embodiments in which the one or more point-of-sale systems $24_1$-$24_M$, $24_1$-$24_N$ are controlled by the main server 12, and also in embodiments in which such components are controlled by one or more of the local hub servers $22_1$-$22_L$, it will be understood that any such server may be or include a single server, multiple servers, one or more cloud servers, i.e., one or more dedicated hosting and/or shared hosting, off-site servers providing server resources to the retail enterprise according to a rental or lease arrangement, one or more shared-processor servers, two or more point-to-point servers, or the like.

The mobile communication devices $16_1$-$16_J$ and the user computing devices $18_1$-$18_K$ illustrated in FIG. 1 are intended to depict mobile communication devices and personal or general purpose computers respectively that are each separately owned and/or operated by a different customer. No limit on the total number of such mobile communication devices $16_1$-$16_J$ and/or user computing devices $18_1$-18K that may be owned and operated by any one customer, or on the total number of such mobile communication devices $16_1$-$16_J$ and/or user computing devices $18_1$-$18_K$ that may communicate with the main server 12, is intended or should be inferred. The mobile communication devices $16_1$-$16_J$ may be or include any mobile electronic device capable of executing one or more software application programs as described herein and of communicating with the main server 12 via the public network 14. Examples of the mobile communication devices $16_1$-$16_J$ include, but should not be limited to, mobile telephones, smart phones, tablet computers, personal data assistants (PDAs), wearable electronic communication devices, including eye glasses, watches, devices attached to and/or integral with clothing, headwear and/or footwear, implanted electronic communication devices, and the like. Other examples include any one or more such mobile communication devices mounted to or integral with a mobile structure and configured to communicate with, or to at least wirelessly exchange some amount of information with, any of the foregoing example customer (and/or employee) mobile communication devices, and examples of such mobile structures include, but are not limited to, a wheeled cart, such as a conventional shopping cart or other wheeled cart, basket, platform or carriage, a manually-carried shopping basket, a wheeled or non-wheeled walking aid, a wheelchair, an electrically powered or motorized vehicle such as a mobility scooter, and the like.

The user computing devices $18_1$-$18_K$ illustrated in FIG. 1 are intended to include any of privately owned and accessed computers, such as those residing in customer's residences, to include semi-privately owned and accessed computers, such as those residing at multiple-employee business enterprises, and publicly accessible computers, such as those available at internet cafés and kiosks. The user computing devices $18_1$-$18_K$ may be or include any computer capable of executing one or more software programs and of communicating with the main server 12 via the public network 14. Examples of the user computing devices $18_1$-$18_K$ include, but should not be limited to, personal computers (PCs), laptop computers, notebook computers and the like, whether or not networked with one or more other computing devices.

Point-of-Sale System Components

Referring now to FIG. 2, an embodiment 24 of one of the one or more point-of-sale systems, $24_1$-$24_M$, $24_1$-$24_N$, is shown which includes components similar to the main server 12 and also to the one or more local hub servers $22_1$-$22_L$, such as a processor 200, an I/O subsystem 204, a memory 202, a data storage device 206, communication circuitry 210 and a number of peripheral devices 212. In some embodiments, each of the foregoing components may be identical to corresponding components of the local hub server $22_1$ described above, and a detailed explanation of such components will not be repeated here for brevity. In other embodiments, any of the one or more point-of-sale systems $24_1$-$24_M$, $24_1$-$24_N$ may be configured differently than the local hub server $22_1$ described above. In the illustrated embodiment, the memory 202 illustratively includes an EMS module 208 in the form of, e.g., instructions executable by the processor 200, to communicate customer-member information relating to customers' enterprise membership system (EMS) accounts (e.g., described below with respect to FIG. 4) to and from the main server 12, and to control one or more local peripheral devices to facilitate communications between customer-members and the main server 12 and to facilitate manual customer input of customer-identifying information as will be described in detail below.

Additionally, the illustrated point-of-sale system 24 includes one or more actuators 226 and hardware infrastructure 228, examples of which will be described below. It will be appreciated that the point-of-sale system 24 may include other components, sub-components, and devices commonly found in a computer and/or computing device. In any case, the communication circuitry 210 is configured to facilitate communication with a corresponding one of the local hub servers $22_1$-$22_L$ and the point-of-sale system 24 may use any suitable communication protocol to communicate with the corresponding local hub server $22_1$-$22_L$.

In addition to, or alternatively to, the number of peripheral devices 40 of the local hub server $22_1$ described above, the number of peripheral devices 212 of the point-of-sale system 24 may include any number of other peripheral or interface devices. Examples of some of the peripheral devices 212 illustrated in FIG. 2 include, but should not be limited to, one or more conventional payment interfaces 214, one or more conventional item price scanners 216, one or more conventional display monitors 218, one or more conventional produce scales 220 and one or more conventional controllers 224 for controlling one or more conventional actuators 226 associated with the operation of the point-of-sale system 24. The one or more payment interfaces 214 are provided, e.g., to facilitate physical receipt of credit/debit card and/or other form of payment from customers (shoppers), and each such interface 214 may illustratively include one or more of a display, a touch screen, a keyboard, a mouse, external speakers, and/or other peripheral devices. One or more of the payment interfaces 214 may further include a produce scale 220, and one or more produce scales 220 may alternatively be coupled to the point-of-sale system 24 separately from the one or more customer payment interfaces 214. The one or more item scanner(s) 216 is/are configured to scan price code labels or other such indicators for items being purchased by customers and to also scan print media coupons.

The one or more display monitor(s) 218 provide item and/or pricing information to customers and/or enterprise employees, and may further provide additional information regarding cost and/or discounts for one or more items being purchased as well as information regarding discounts realized by customers through the use of print media and/or virtual coupons. The display monitor(s) 218 may additionally provide an interface, e.g., touchscreen or a co-located keypad, via which customers may input information such as their EMSID into the system 10. The peripheral devices 212 of the point-of-sale system 24 may further optionally include a near-field communication (NFC) interface 222, as illustrated in dashed-line configuration in FIG. 2, which may be included in embodiments in which one or more of the mobile communication devices $16_1$-$16_J$ also has such a near-field communication (NFC) device such that information, e.g., customer identification information and/or customer payment information can be transferred from such one or more of the mobile communication devices $16_1$-$16_J$ to the point-of-sale system 24 by tapping the two near-field communication devices together or by passing the near-field communication device of a so-equipped mobile communication device $16_1$-$16_J$ sufficiently close to the near-field communication device 222 to effectuate such communication. Illustratively, customers may additionally transfer customer identification information to the point-of-sale system 24 via the payment interface 214, item scanner 216 or other peripheral device(s).

The point-of-sale system 24 further includes hardware infrastructure 228 which forms the structural backbone of the point-of-sale system 24. Examples of structural components that may be included in the hardware infrastructure 228 include, but should not be limited to, one or more purchased item transport units, e.g., one or more purchased item conveyance units or systems, one or more conventional purchased item bagging areas, e.g., one or more conventional item bagging carousals, one or more purchased item support units, and the like. The one or more actuators 226 may be or include any actuator that is controllable by at least one of the one or more conventional controllers 224, and which may facilitate operation and/or control of the hardware infrastructure of the point-of-sale system 24. Examples of such one or more actuators may include, but should not be limited to, one or more linear and/or rotational drive motors, one or more electronically controlled switches, and the like.

Mobile Communication Device Components

Referring now to FIG. 3A, an embodiment of one of the mobile communication devices 16 illustrated in FIG. 1 is shown, which includes components similar to the main server 12 and also to the one or more local hub servers $22_1$-$22_L$ and the one or more POS systems $24_1$-$24_M$, $24_1$-$24_N$, such as a processor 300, an I/O subsystem 302, a memory 304 including an EMS module 308, a data storage device 306, communication circuitry 312 and a number of peripheral devices 314. In some embodiments, each of the foregoing components may be identical to corresponding components of the local hub server $22_1$ and/or POS system 24 described above, and a detailed explanation of such components will not be repeated here for brevity. In other embodiments, any of the one or more mobile communication devices $16_1$-$16_J$ may be configured differently than the local hub server $22_1$ described above. It will be appreciated that the mobile communication device 16 may include other components, sub-components, and devices commonly found in a computer and/or computing device.

The memory 304 illustratively includes an EMS module 308 in the form of, e.g., instructions executable by the processor 300 to communicate customer-member information to and from the main server 12, and to control one or more local peripheral devices to facilitate communications between customer-members of an enterprise membership service (EMS) program (EMS program is described below) and the main server 12 and to facilitate customer input of customer-identifying information, e.g., an EMS identifying number and/or code (EMSiD). The memory 304 further illustratively includes an NFC/SC application 310 in the form of, e.g., instructions executable by the processor 300 to facilitate transfer by the mobile communication device 16 of one or more security codes to one of the point-of-sale systems $24_1$-$24_M$, $24_1$-$24_N$ during a transaction for the purchase of one or more items at the point-of-sale system for the purpose of identifying to the main server 12 via the point-of-sale system a selected electronic payment system to process for payment of the items. Example embodiments of the NFC/SC application 310 will be described in greater detail hereinafter with respect to FIGS. 8A, 10A, 10B, 11A, 11B and 12.

The communication circuitry 312 illustratively includes conventional wireless communication circuitry 316 configured to facilitate communication with the main server 12 via the network 14, and the mobile communication device 16 may use any suitable communication protocol to communicate with the corresponding main server 12. The communication circuitry 312 of the mobile communication device 16 may further optionally include conventional contact-less communication circuitry 318, which may include a conventional near-field communication (NFC) device 320, as illustrated by dashed-line representation in FIG. 3A. The near-field communication device 320 may be included, for example, in embodiments in which one or more of the point-of-sale systems $24_1$-$24_M$, $24_1$-$24_N$ also has/have such a near-field communication interface 222 such that customer information, e.g., customer identification information in the form of one or more identification codes, user names, passwords, or the like, and/or customer payment information, e.g., credit/debit card information or the like, can be transferred from the mobile communication device 16 to such one or more point-of-sale systems $24_1$-$24_M$, $24_1$-$24_N$ by tapping the two near-field communication devices together or by passing the near-field communication 320 device of the mobile communication device 16 sufficiently close to the near-field communication interface 222 to effectuate such communication. In addition to, or alternatively to, the number of peripheral devices 40 of the local hub server $22_1$ described above, the number of peripheral devices 314 of the mobile communication device 16 may include any number of other or additional peripheral or interface devices. One example of such an additional peripheral device illustrated in FIG. 3A includes, but should not be limited to, a conventional visual display unit or screen 322.

User Computing Device Components

Referring now to FIG. 3B, an embodiment of one of the user computing devices 18 illustrated in FIG. 1 is shown, which includes components similar to the main server 12 and also to the one or more local hub servers $22_1$-$22_L$, the one or more mobile communication devices $16_1$-$16_J$, and to the one or more POS systems $24_1$-$24_M$, $24_1$-$24_N$, such as a processor 350, an I/O subsystem 352, a memory 354 including an EMS module 358, a data storage device 356, communication circuitry 360 and a number of peripheral devices 362. In some embodiments, each of the foregoing components may be identical to corresponding components of the local hub server $22_1$ and/or POS system 24 and/or mobile communication device 16 described above, and a detailed explanation of such components will not be repeated here for brevity. In other embodiments, any of the one or more user computing devices $18_1$-$18_K$ may be configured differently than the local hub server $22_1$, point-of-sale system 24 and/or mobile communication device 16 described above. It will be appreciated that the user computing device 18 may include other components, sub-components, and devices commonly found in a computer and/or computing device. In any case, the communication circuitry 360 illustratively includes conventional wireless communication circuitry 364 configured to facilitate communication with the main server 12 via the network 14, and the user computing device 18 may use any suitable communication protocol to communicate with the main server 12. In addition to, or alternatively to, the number of peripheral devices 40 of the local hub server $22_1$ and/or the number of peripheral devices 212 of the POS system 24 and/or the number of peripheral devices 314 of the mobile communication device 16 described above, the number of peripheral devices 362 of the user computing device 18 may include any number of other or additional peripheral or interface devices. One example of such an additional peripheral device illustrated in FIG. 3B includes, but should not be limited to, a conventional visual display unit 366.

Main Server Environment

Figure 4:
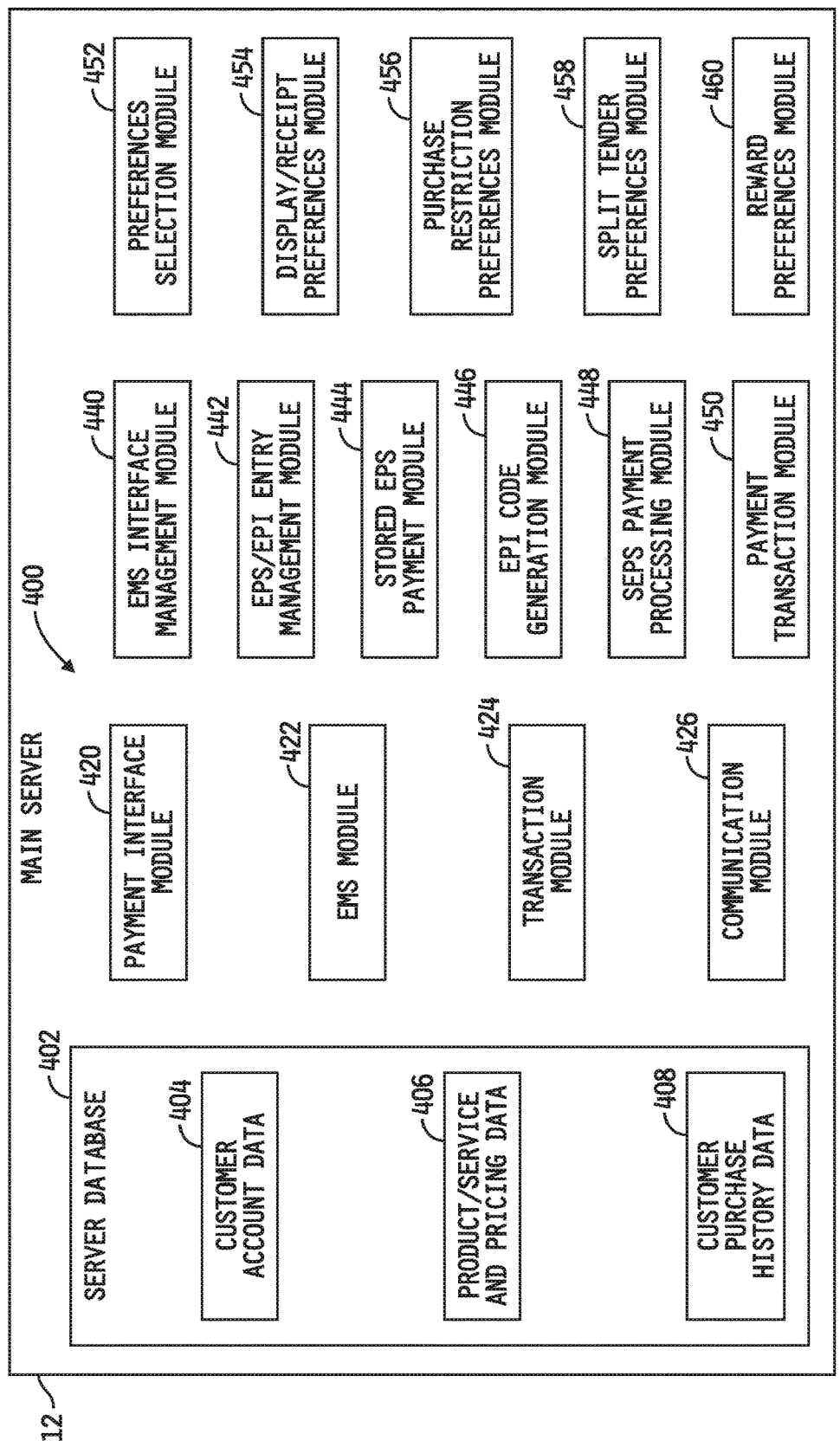
FIG. 4 is a simplified block diagram of an embodiment of an environment of the main server of FIG. 1.

Referring now to FIG. 4, a simplified block diagram is shown of an embodiment of an environment 400 of the main server 12 illustrated in FIG. 1. In the embodiment shown in FIG. 4, the environment 400 includes a server database 402 which illustratively includes customer account data 404, product/service and pricing data 406 and, in some embodiments, a customer purchase history data 408.

The main server 12 illustratively hosts, manages and maintains an enterprise member or membership services (EMS) program. As used herein, the term "enterprise member services program," "enterprise membership services program" or "EMS" are interchangeable and refer to one or more services offered by the retail enterprise 11 to customer members thereof. Examples of such services may include, but are not limited to, making available to customer members via the main server 12 one or more virtual discount coupons redeemable by the retail enterprise 11, tracking and maintaining with the server 12 of customer purchase histories, i.e., histories of products and/or services purchased by customer members over time, in the customer purchase history database 408, and the like.

In embodiments in which the server 12 offers via the EMS program virtual discount coupons to customer members, the server database 402 may include a virtual discount coupon repository which contains for each customer member a plurality of virtual discount coupons provided to thereto by the server 12 from a virtual discount coupon database, and which identifies for each customer member one or more virtual discount coupons which may be selected or "clipped" by the customer member for automatic redemption via the customer virtual discount coupon repository during subsequent qualifying purchases made via one of the POS systems $24_1$-$24_M$, $24_1$-$24_N$. Illustratively, virtual discount coupons stored in the virtual coupon database are, in some embodiments, received from an external source, although in other embodiments the virtual discount coupons stored in the virtual coupon database may alternatively or additionally be generated by the processor 50 of the main server 12. In any case, customer members of the EMS program may redeem such virtual discount coupons stored or identified in the customer's virtual discount coupon repository 306 by presenting such virtual discount coupons at a POS $24_1$-$24_M$, $24_1$-$24_N$ against the purchase of from the retail enterprise 11 of various goods and/or services.

Customers may elect to participate in such an enterprise membership services (EMS) program offered, managed and maintained by the main server 12 of the retail enterprise 11 by establishing a user account within the customer account database 404. In this regard, the terms "customer membership account" and "EMS account" are interchangeable and refer to a collection of information about a customer member of the EMS program that is stored in the customer account data 404 separately from such collections of information about other customer members of the EMS program. In one embodiment, the customer account data 404 of the server database 402 illustratively has stored therein one or more access codes and profile data for each customer member of the EMS program. As customers join the EMS program, the server 12 establishes an EMS account within the customer account data 404 that is unique to the customer, and assigns to the customer, and/or the customer selects, a unique, corresponding enterprise membership services identification code, EMSID. The EMSID associated with each customer is stored by the server 12 along with the customer's profile data in the customer account data 404, and can be used by the customer member thereafter to access the customer's EMS account.

The term "EMS identification code" or EMSID illustratively refers to at least one collection of letters, symbols and/or numbers that is different for, and therefore unique to, each customer member of the enterprise membership services program. The EMSID of each customer member of the EMS program is used by the server 12 to uniquely identify that customer's EMS account in the customer account data 404 of the server database 402. The EMSID is further illustratively used by the server 12 to access information about that customer stored and maintained by the main server 12 in the customer account data 404, to access for redemption one or more virtual coupons selected or "clipped" by the customer and stored in that customer's virtual discount coupon repository in embodiments which include such virtual discount coupons as part of the EMS program, and to also access and/or update that customer's purchase history stored in the customer purchase history data 408. In one example embodiment, the EMSID for each customer member of the EMS program may include a unique, several-digit access code and a separate and unique, several-digit password, although in other embodiments the EMSID may include more, fewer and/or different codes and/or passwords.

The customer account data 404 illustratively further includes additional information relating to the customer members of the EMS program. Examples of such additional information may include, but are not limited to, customer name, customer address, digital image of the customer, communication information (CI) of one or more mobile communication devices 16 carried by the customer, and the like. The communication information, CI, of any customer mobile communication device 16 stored in the customer account data 404 may be or include any information via which another communication device or system may establish wireless communications, e.g., text or other wireless signal communications, with that mobile communication device 16. In one example embodiment in which the mobile communication device 16 is a mobile phone, the communication information (CI) may be or include the telephone number of the customer's mobile phone 16. In other embodiments, the communication information (CI) may be or include a serial number, electronic identification code or other communication identifier associated with the customer's mobile communication device 16 via which another communication device or system may establish wireless communications with that mobile communication device 16. In any case, all such customer information for each customer member is illustratively associated, i.e., linked or mapped together, in the customer account data 404 such that a search by the server 12 of one customer-specific parameter will provide access to the other customer parameters linked thereto in the customer account data 404. Likewise, the purchase history stored in the customer purchase history data 408 for each customer member of the EMS program is linked or mapped to that customer member's information stored in the customer account data 404 such that a search by the server 12 of any customer-specific parameter in the customer account data 404 will link, and therefore provide access, to that customer's purchase history stored in the customer purchase history data 408 and vice versa.

In some embodiments, the EMSID may be provided on or as part of one or more of a customer ID card, an ID associated with an RFID tag, which RFID tag may be part of NFC communication circuitry 320 of the customer's mobile communication device 16 in embodiments that include such circuitry, a customer's shopping incentive card, or the like. In other embodiments, the EMSID may not be provided in or as part of any tangible form, and may instead be or include one or more easily remembered sequences of numbers, letters, symbols or other characters. In any case, customer members of the EMS program described herein may scan, enter via a keypad or touchscreen or otherwise manually communicate their EMSID and/or other information to the server 12 directly or via to one of the point-of-sale terminals $24_1$-$24_M$, $24_1$-$24_N$. In some embodiments, for example, when a customer member provides the customer's EMSID to one of the point-of-sale system $24_1$-$24_M$, $24_1$-$24_N$ as part of a purchase transaction (e.g., during the purchase transaction or as part of the process of commencing the purchase transaction), the processor 200 of the point-of-sale system $24_1$-$24_M$ communicates the EMSID to the main server 12 which identifies the customer via the EMSID and associates that customer with the current purchase transaction being carried out at the corresponding point-of-sale system $24_1$-$24_M$, $24_1$-$24_N$. Illustratively, all such purchase transaction data relating to items purchased by such an identified customer during a purchase transaction carried out via one of the point-of-sale system $24_1$-$24_M$, $24_1$-$24_N$ is stored in the customer's purchase history data 408 where it is associated with the identified customer via the customer's EMSID. Illustratively, the purchase transaction data stored in the customer purchase history data 408 may include, but is not limited to, product/service identification information, product/service pricing, product purchase date and time, total quantity of products purchased, total quantity of identical products purchased, total transaction price, and the like, and purchases made by the customer through the retail enterprise 11 are thus monitored and tracked by the main server 12. It is through the customer's EMSID that the main server 12 also makes virtual discount offers available to the customer and that the customer may redeem virtual discount coupons stored or identified in the customer's virtual discount coupon repository against purchases of products and/or surfaces.

The main server 12 illustratively includes an EMS module 422 configured to control and manage customer EMS accounts and EMS-related activity of customer members of the EMS program. In one embodiment, the EMS module 422 manages and controls a customer-member interface, e.g., a web-based interface, to the EMS program via which customers can access and manage their individual EMS accounts stored in the customer account database 404 and via which customers can select or "clip" virtual discount coupons in the virtual discount database for inclusion or identification in the customer's virtual coupon repository. Illustratively, each customer may access their individual (and private from other customer-members) EMS account, i.e., their individual EMS page(s) within the web-based EMS interface, which may be referred to herein as an "EMS website" or "EMS web portal," by entering that customer's EMSID into a graphic user interface element of the web-based EMS interface. Therein, the customer may establish, access, modify and otherwise manage the customer's EMS account information including, for example, but not limited to, name, address, email address, mobile telephone number, photograph of the customer or the like.

Illustratively, a software application program is available for download from the main server 12 via the public network 14 for customers electing to access the EMS program via their mobile communication device, e.g., one of the mobile communication devices $16_1$-$16_J$, or via their user computing device, e.g., one of the user computing devices $18_1$-$18_K$. Once downloaded and activated, shoppers can access and manage their EMS account and program features via the network 14 with the software application program executed by a computing device $18_1$-$18_K$ and/or by a mobile communication device $16_1$-$16_J$ if the latter is equipped with a web browser. Such a software application program is illustratively stored in the EMS module 308 of the customer's mobile communication device 16, as illustrated in FIG. 3A, and is executable by the processor 300 of the customer's mobile communication device 16, and/or is stored in the EMS module 358 of the customer's user computing device 18, as illustrated in FIG. 3B, and is executable by the processor 350 of the customer's user computing device 18.

As used herein, a "customer membership account" or "EMS account" may in some cases be an individual account accessible only by an individual person, e.g., an individual customer, and in other cases may be a group or "household" account accessible by each of a plurality of members of a predefined group of persons, e.g., members of a family or household, one or more employees of a business enterprise, etc. The terms "member," "customer member," "customer" and "household," and variants thereof, are used interchangeably in the following description, and such terms should be understood to refer interchangeably to an individual customer or a predefined group of individual customers (referred to herein as a "household") who shop at and purchase items from the retail enterprise 11, and who are members of an enterprise membership service (EMS) of the type described herein and provided and managed by the retail enterprise 11, i.e., by the server 12. MPERKS®, a virtual customer coupon collection and redemption program offered to customers by Meijer, Inc. of Grand Rapids, Mich., is an example of one such EMS program of the type described herein, although it will be appreciated that any retail enterprise membership service which offers virtual discount coupons and/or other benefits to customer members, and/or which tracks items purchased by customer members during item purchase transactions at point-of-sale systems or terminals may be alternatively be used.

The product/service and pricing data 406 contains information relating to the retail products and services sold by the retail enterprise 11 which the main server 12 serves. Illustratively such information may include, but is not limited to, product/service description information including product/ service manufacturer, product/service family or brand, primary product type (e.g., canned tomatoes), secondary product type (e.g., canned diced tomatoes), tertiary product type (e.g., canned diced tomatoes Italian style), etc., product container size (e.g., 12 oz. can, 32 oz. can, 16 oz. package, etc.), product/service pricing information, product/service unit pricing information, current product inventory, ordered product data, product sales history, product/service location within the corresponding retail outlet, and the like. Illustratively, product/service pricing information is linked to product/service identification information via scan codes, e.g., scannable bar codes such as Universal Product Codes (UPC) or the like, such that when items are scanned for purchase, the scan code of each item will identify a particular item at a particular price in the product/service and pricing database 406.

The environment 400 of the main server 12 further includes a payment interface module 420, a transaction module 424 and a communication module 426. In one embodiment, the payment interface module 420 is configured, in a conventional manner, to process tangible forms of electronic payment systems (EPS), e.g., tangible electronic funds transfer instruments such as credit cards, debit cards, etc., used at the point-of-sale systems $24_1$-$24_M$, $24_1$-$24_N$. In an example of such embodiments, the payment interface module 420 illustratively is or includes a conventional magnetic strip reading device configured to read payment information stored in magnetic form on a strip affixed to a conventional credit or debit card. Alternatively or additionally, the payment interface module 420 may be or include the NFC interface 220, and in such embodiments the NFC interface 220 is configured to access, via contact or near-contact with a portable electronic device having a like-configured NFC device 320, electronically readable customer payment system (EPS) information stored on or accessible by the portable electronic device.

The transaction module 424 is configured to monitor purchases of products and services made by shopper members of the EMS program using any of the point-of-sale systems $24_1$-$24_M$, $24_1$-$24_N$, and to store purchase transaction data associated with such purchases in the customer purchase history database 408. Illustratively, the customer purchase history database 408 is partitioned or otherwise configured to store such purchase transaction data in a manner that provides for the separate tracking and identification of some or all of the shopper purchase history of each shopper (or household) member.

The communication module 426 is configured, in a conventional manner, to control and manage all communications between the main server 12 and the local hub servers $22_1$-$22_L$ in embodiments that include the local hub servers $22_1$-$22_L$, and to control and manage all communications between the main server 12 and all point-of-sale systems $24_1$-$24_M$, $24_1$-$24_N$ in embodiments that do not include a local hub server $22_1$-$22_L$.

The customer payment interface 214 and item scanner 216, and in some embodiments the NFC interface 22, of the point-of-sale systems $24_1$-$24_M$, $24_1$-$24_N$, together with the payment interface module 420 of the main server 12, make up a product purchase interface, a customer-accessible portion of which is provided in the at the point-of-sale terminals or systems $24_1$-$24_M$, $24_1$-$24_N$ physically located at a brick-and-mortar location of the business enterprise. In some embodiments, the payment interface module 420 and the transaction module 424 of the main server 12 are operable to control all purchase transactions made at any of the point-of-sale systems $24_1$-$24_M$, $24_1$-$24_N$, and in such embodiments the processors 200 of the point-of-sale systems $24_1$-$24_M$, $24_1$-$24_N$ are operable to control the various peripheral devices 212 based on instructions from the processor 50 of the main server and to provide information relating to purchase transactions taking place at the point-of-sale systems $24_1$-$24_M$, $24_1$-$24_N$ back to the processor 50. In other embodiments, the processors 200 of the point-of-sale systems $24_1$-$24_M$, $24_1$-$24_N$ may control some or all aspects of the purchase transactions made thereat. The communication module 426 controls and manage all communications between the main server 12 and the local hub servers $22_1$-$22_L$ via the network 20 (an to thereby control and manage all communications between the main server 12 and the point-of-sale systems $24_1$-$24_M$, $24_1$-$24_N$), all communications between the main server 12 and the mobile communication devices $16_1$-$16_J$ via the network 14 and all communications between the main server 12 and the user computing devices $18_1$-$18_K$ via the network 14.

Figure 5A:
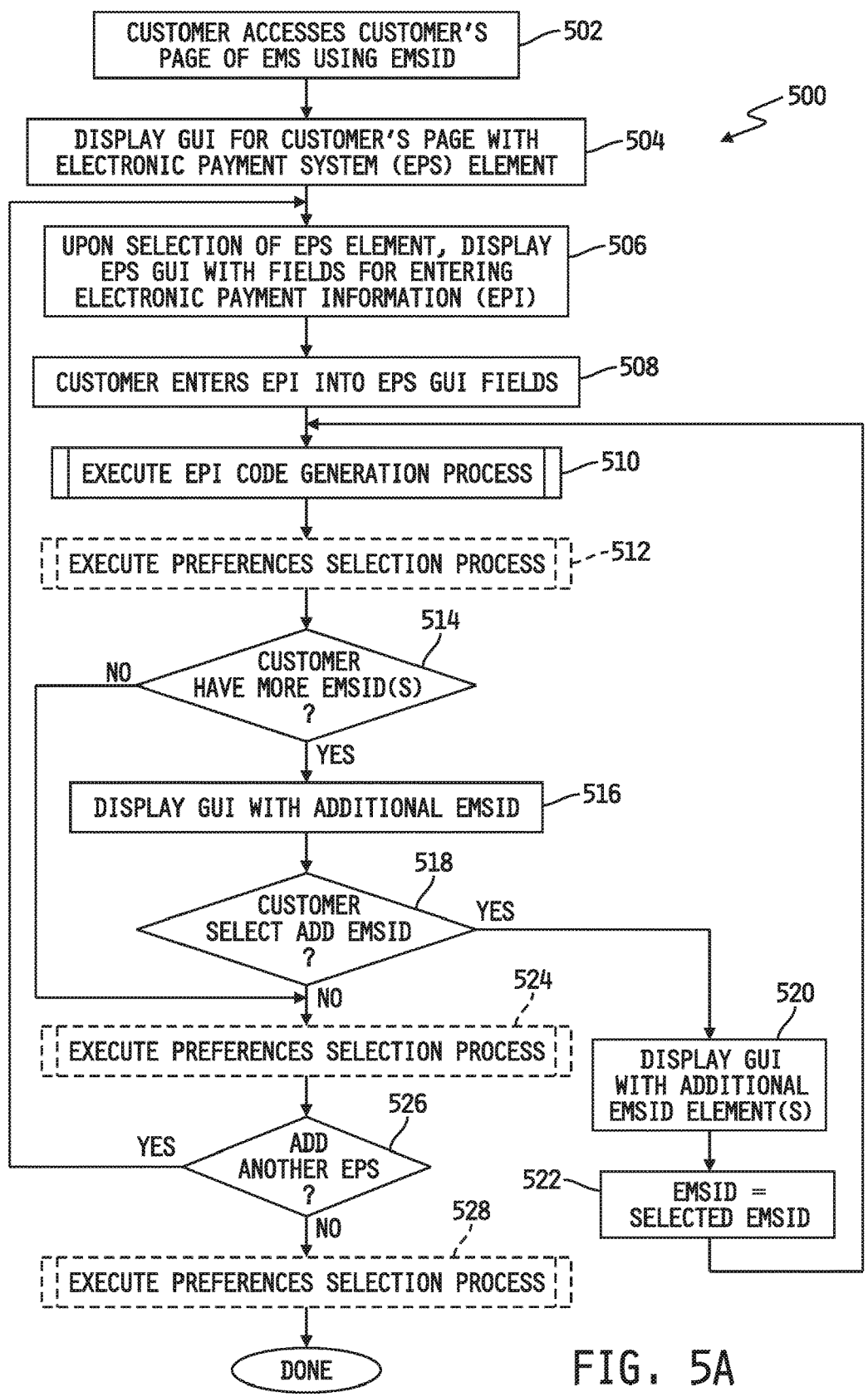
FIG. 5A is a simplified flow diagram of an embodiment of a process for facilitating entry by customers into their enterprise membership accounts electronic payment information for one or more electronic payment systems and for creating unique codes for each.

The environment 400 of the main server 12 further includes one or more of an EMS interface management module 440, an EPS/EPI entry management module 442, a stored EPS payment module 444, an EPI code generation module 446, a SEPS payment processing module 448, a payment transaction module 450, a preferences selection module 452, a display/receipt preferences module 454, a purchase restriction preferences module 456, a split tender preferences module 458 and a reward preferences module 460. The EMS interface management module 440 is illustratively operable to provide, control and manage a customer interface to the EMS program, e.g., a web-based EMS interface or EMS website. The EPS/EPI entry module 442 is illustratively operable to provide and control via the EMS program, e.g., as part of each customer member's EMS page(s) within a web-based EMS interface or EMS website, a graphic user interface for use by customer members to enter into their EMS accounts electronic payment information (EPI) for one or more electronic payment systems (EPS), e.g., one or more credit cards, debit cards or the like, and to associate or link the entered EPI(S) with one or more corresponding customer's EMSID(S) within the customer account data 404. In some embodiments, the graphic user interface provided by the EPS/EPI module 442 may be additionally configured to facilitate customer selection and entry of one or more customer preferences. An example embodiment of a process 500 executed by the EMS interface management module 440 and the EPS/EPI entry module 442, or executed by the EPS/EPI entry management module 442 alone, is illustrated in FIG. 5A, and the illustrated process 500 will be described in detail hereinafter.

Figure 7:
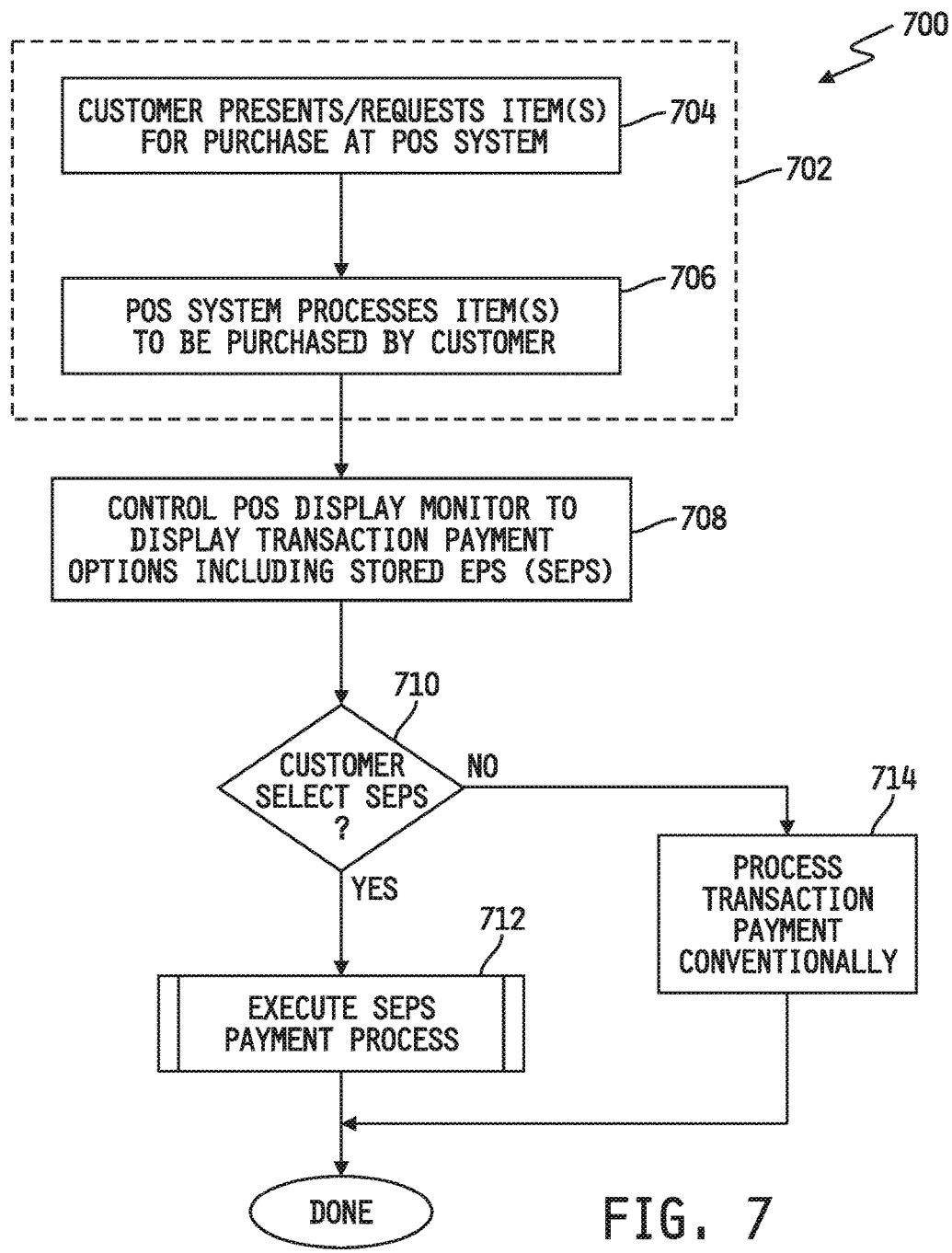
FIG. 7 is a simplified flow diagram of an embodiment of a process for selecting, during a transaction for the purchase of one or more items at a point-of-sale system of the retail enterprise, a stored electronic payment system previously entered into the customer's enterprise membership service account, for the purpose of effecting payment for the transaction using the stored electronic payment system.

The stored EPS payment module 444 is illustratively operable to control the various point-of-sale systems $24_1$-$24_M$, $24_1$-$24_N$, e.g., solely or jointly with the processors 200 of the point-of-sale systems $24_1$-$24_M$, $24_1$-$24_N$ and/or the processor 30 of a corresponding local/hub server 22, to provide for customer selection, during a transaction for the purchase of one or more items at one of the point-of-sale systems $24_1$-$24_M$, $24_1$-$24_N$ of the retail enterprise 11, as between a conventional payment mechanism or a stored electronic payment system, SEPS, i.e., an electronic payment system EPS previously selected or entered into the customer's enterprise membership service (EMS) account, payment, or at least partial payment, for at least some of the one or more items in the purchase transaction. An example embodiment of a purchase transaction process 700 executed by the stored EPS payment module 444 is illustrated in FIG. 7, and the illustrated process 700 will be described in detail hereinafter.

The EPI code generation module 446 is illustratively operable to generate an EPI code, in the form of a security code, for each EPS, and/or for each EPS/EMSID pair, entered by a customer into the customer's EMS account data 400. Each EPI code is unique to a corresponding EPS or EPS/EMSID pair entered into a customer's EMS account, and provides one mechanism for identifying and authorizing use of an EPS selected by a customer or another user authorized by the customer at a point-of-sale system $24_1$-$24_M$, $24_1$-$24_N$. Several example embodiments of processes executed by the EPI code generation module 446 are illustrated in FIGS. 8A, 10A, 11A and 12, and such processes will each be described in detail hereinafter.

The SEPS payment processing module 448 is illustratively operable to execute a payment transaction process of matching EMSIDs and security codes presented by customers or other users to point-of-sale systems $24_1$-$24_M$, $24_1$-$24_N$ during item purchase transactions with corresponding EPI codes and EMSIDs stored in a database and associated with EPS/EPIs selected by the customers as payment for the item purchase transactions. Several example embodiments of processes executed by the SEPS payment processing module 448 are illustrated in FIGS. 8B, 10B and 11B, and such processes will each be described in detail hereinafter.

Figure 9:
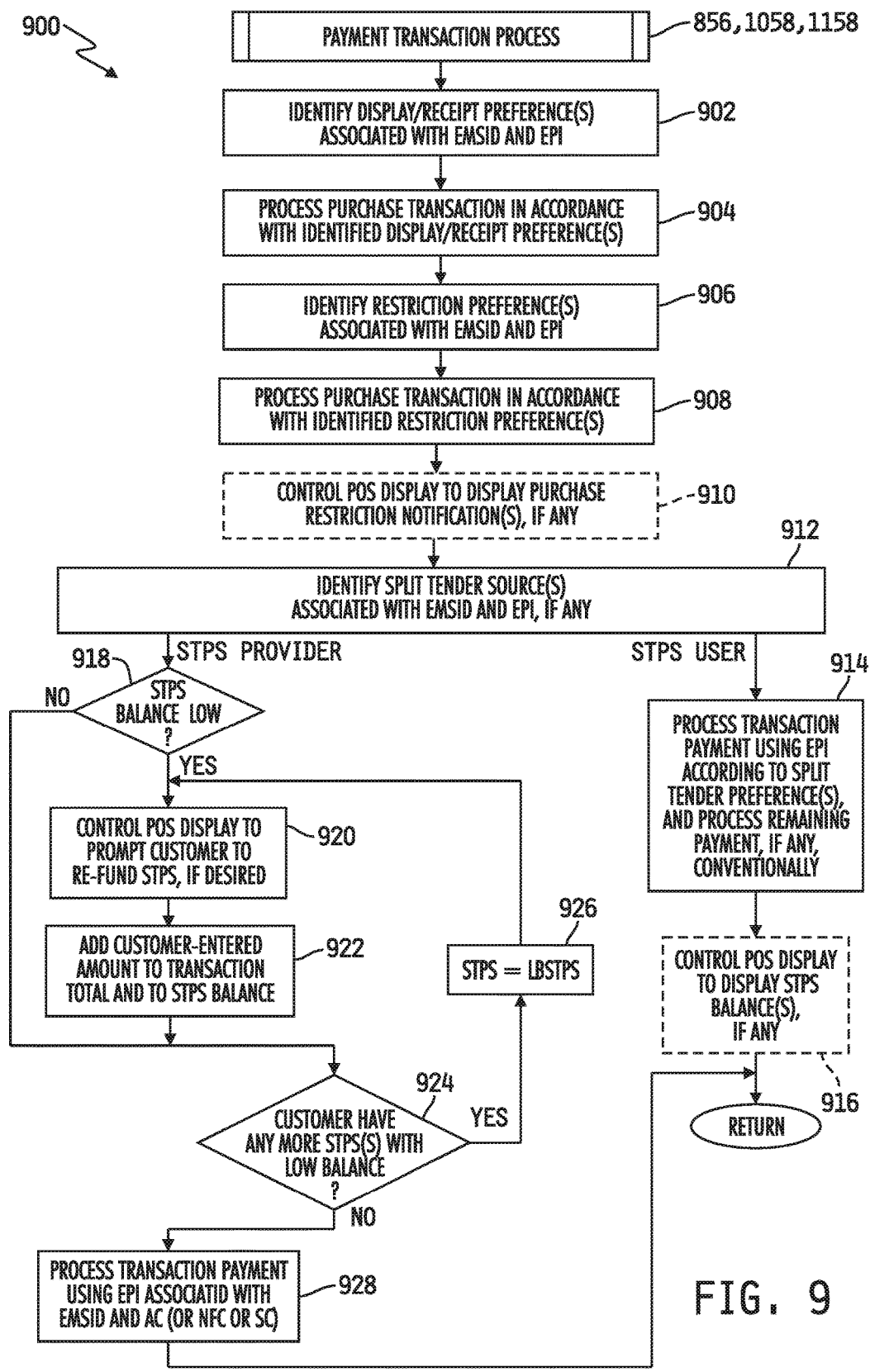
FIG. 9 is a simplified flow diagram a payment transaction process executed as part of any of the SEPS payment processes illustrated in the flow diagrams of FIGS. 8B, 10B and 11B.

The payment transaction module 450 is illustratively operable to control the various point-of-sale systems $24_1$-$24_M$, $24_1$-$24_N$, e.g., solely or jointly with the processors 200 of the point-of-sale systems $24_1$-$24_M$, $24_1$-$24_N$ and/or the processor 30 of a corresponding local/hub server 22, to effect payment, or at least partial payment, for at least one or more items in transactions for the purchase of one or more items at one of the point-of-sale systems $24_1$-$24_M$, $24_1$-$24_N$ of the retail enterprise 11 made in accordance with a stored electronic payment system, SEPS, i.e., an electronic payment system EPS previously selected or entered into the customer's enterprise membership service (EMS) account. An example embodiment of a payment transaction process 900 executed by the payment transaction module 450 is illustrated in FIG. 9, and the illustrated process 900 will be described in detail hereinafter.

Figure 5B:
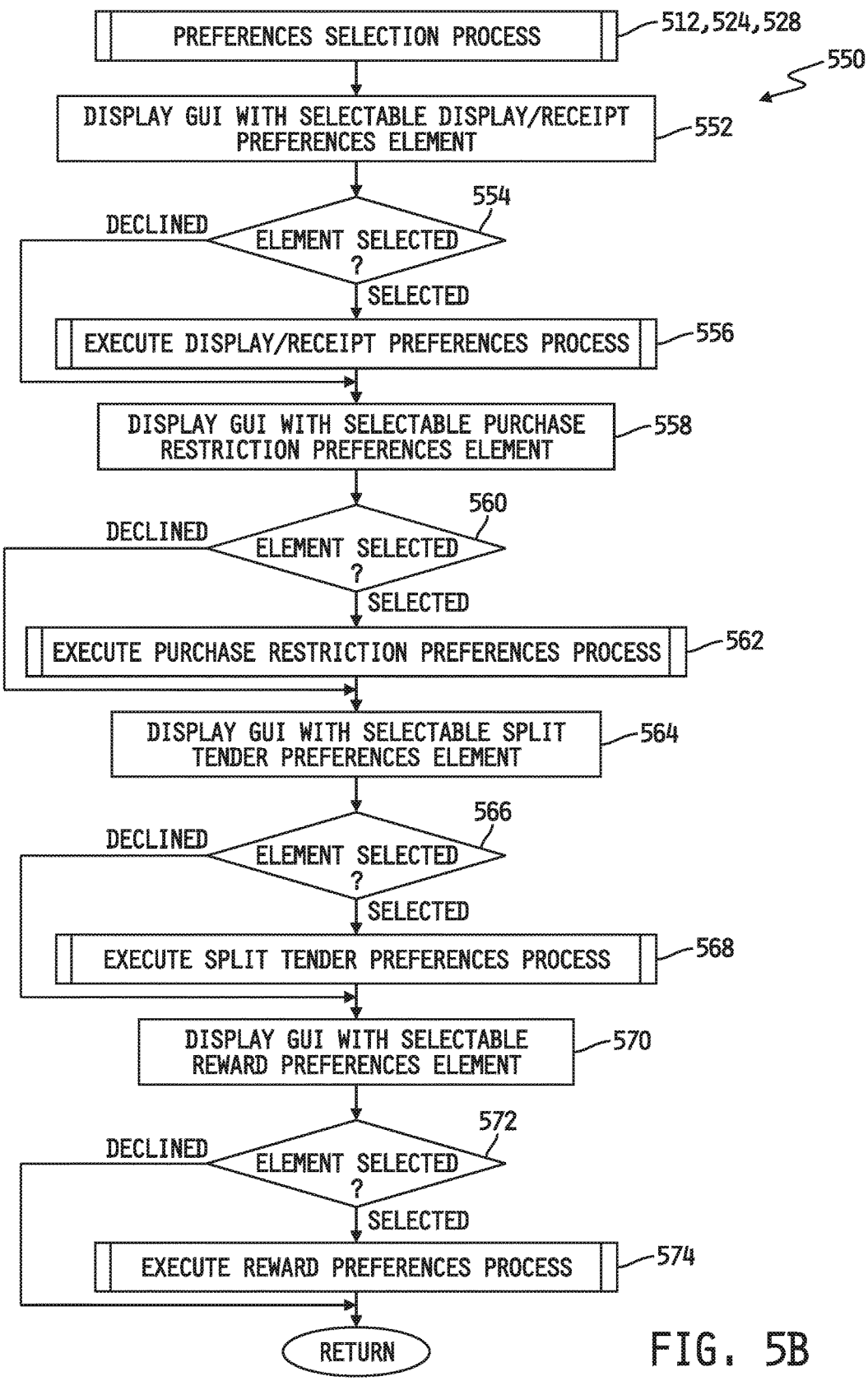
FIG. 5B is a simplified flow diagram of an embodiment of a process for facilitating selection by customers of one or more different types of preferences to associate in their enterprise membership accounts with one or more electronic payment systems so that such one or more preferences is/are implemented during purchase transactions conducted using associated electronic payment systems.

The preferences selection module 452 is illustratively operable to provide and control via the EMS program, e.g., as part of each customer member's EMS page(s) within a web-based EMS interface or EMS website, a graphic user interface for use by customer members to select one or more preference types to be linked in their EMS accounts to one or more EPS/EPI and EMSID pairs. An example embodiment of a preferences selection process 550 executed by the preferences selection module 452 is illustrated in FIG. 5B, and the illustrated process 550 will be described in detail hereinafter.

Figure 6A:
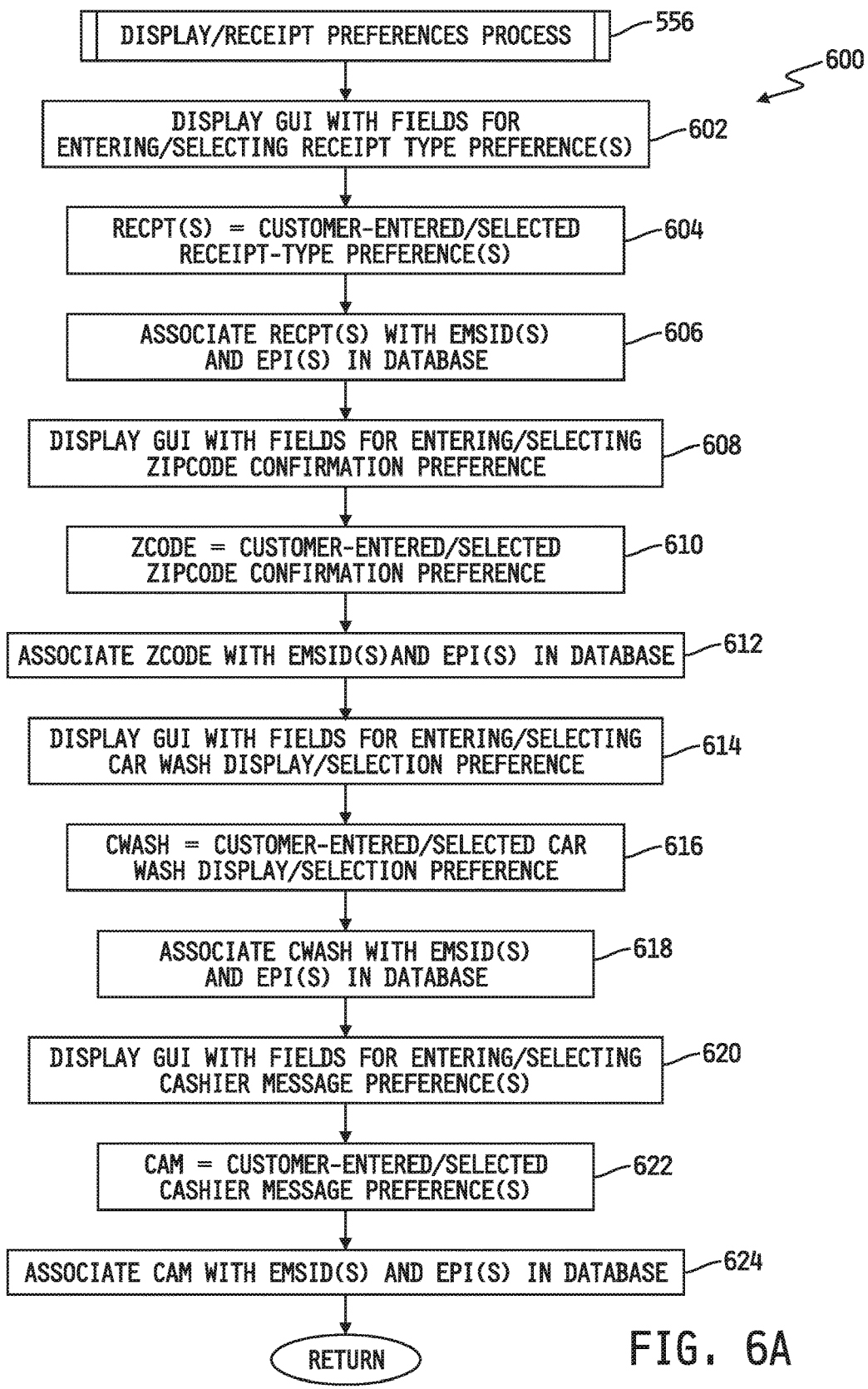
FIG. 6A is a simplified flow diagram of an embodiment of a process for facilitating entry by customers into their enterprise membership accounts display/receipt preferences to be associated in their enterprise membership accounts with one or more electronic payment systems.

The display/receipts preferences module 454 is illustratively operable to provide and control via the EMS program, e.g., as part of each customer member's EMS page(s) within a web-based EMS interface or EMS website, a graphic user interface for use by customer members to link in their EMS accounts one or more display and/or receipt preferences with one or more EPS/EPI and EMSID pairs. An example embodiment of a display/receipts preferences process 600 executed by the display/receipt preferences module 454 is illustrated in FIG. 6A, and the illustrated process 600 will be described in detail hereinafter.

Figure 6B:
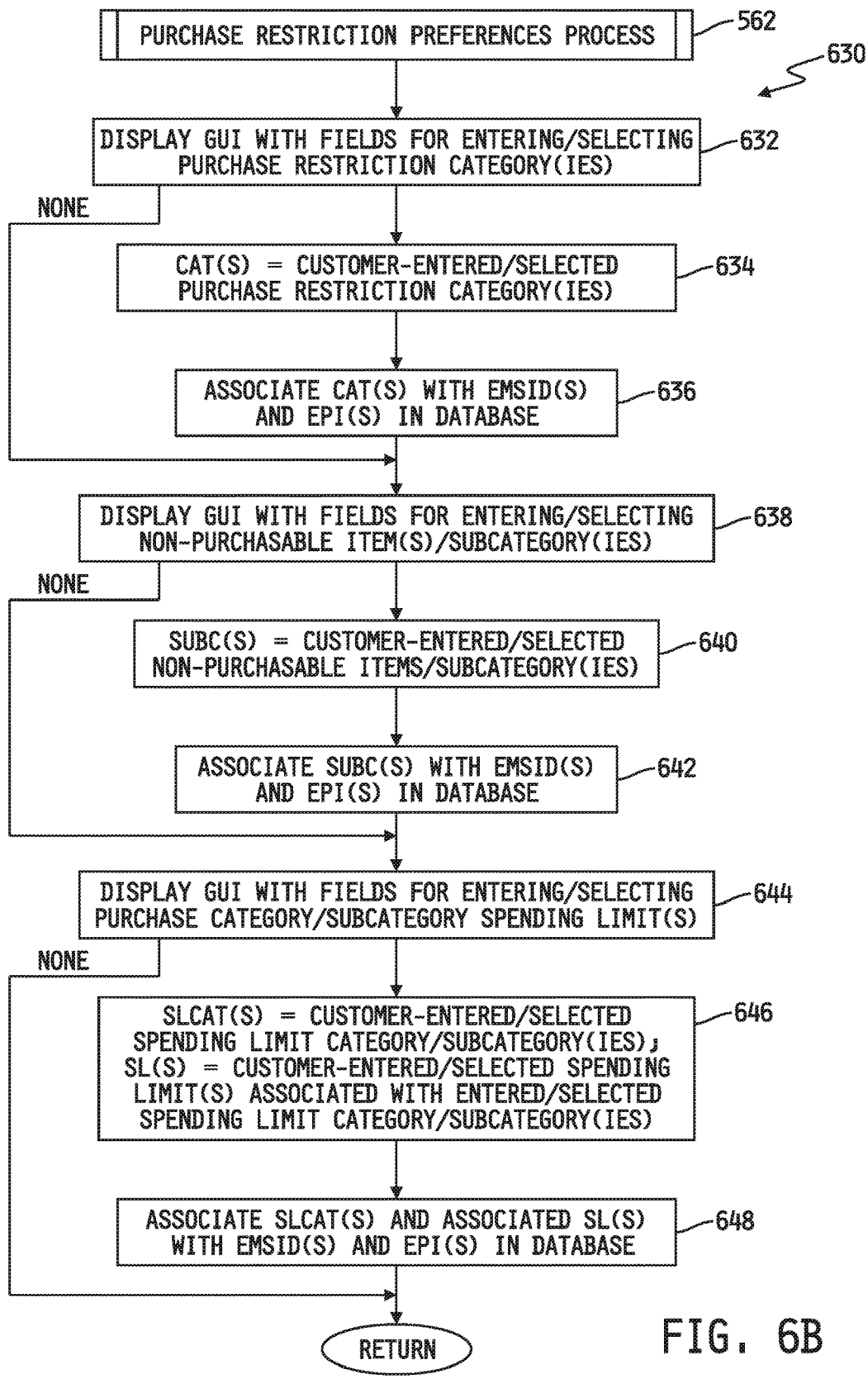
FIG. 6B is a simplified flow diagram of an embodiment of a process for facilitating entry by customers into their enterprise membership accounts purchase restriction preferences to be associated in their enterprise membership accounts with one or more electronic payment systems.

The purchase restriction preferences module 456 is illustratively operable to provide and control via the EMS program, e.g., as part of each customer member's EMS page(s) within a web-based EMS interface or EMS website, a graphic user interface for use by customer members to link in their EMS accounts one or more purchase restriction preferences with one or more EPS/EPI and EMSID pairs. An example embodiment of a purchase restriction preferences process 630 executed by the purchase restriction preferences module 456 is illustrated in FIG. 6B, and the illustrated process 630 will be described in detail hereinafter.

Figure 6C:
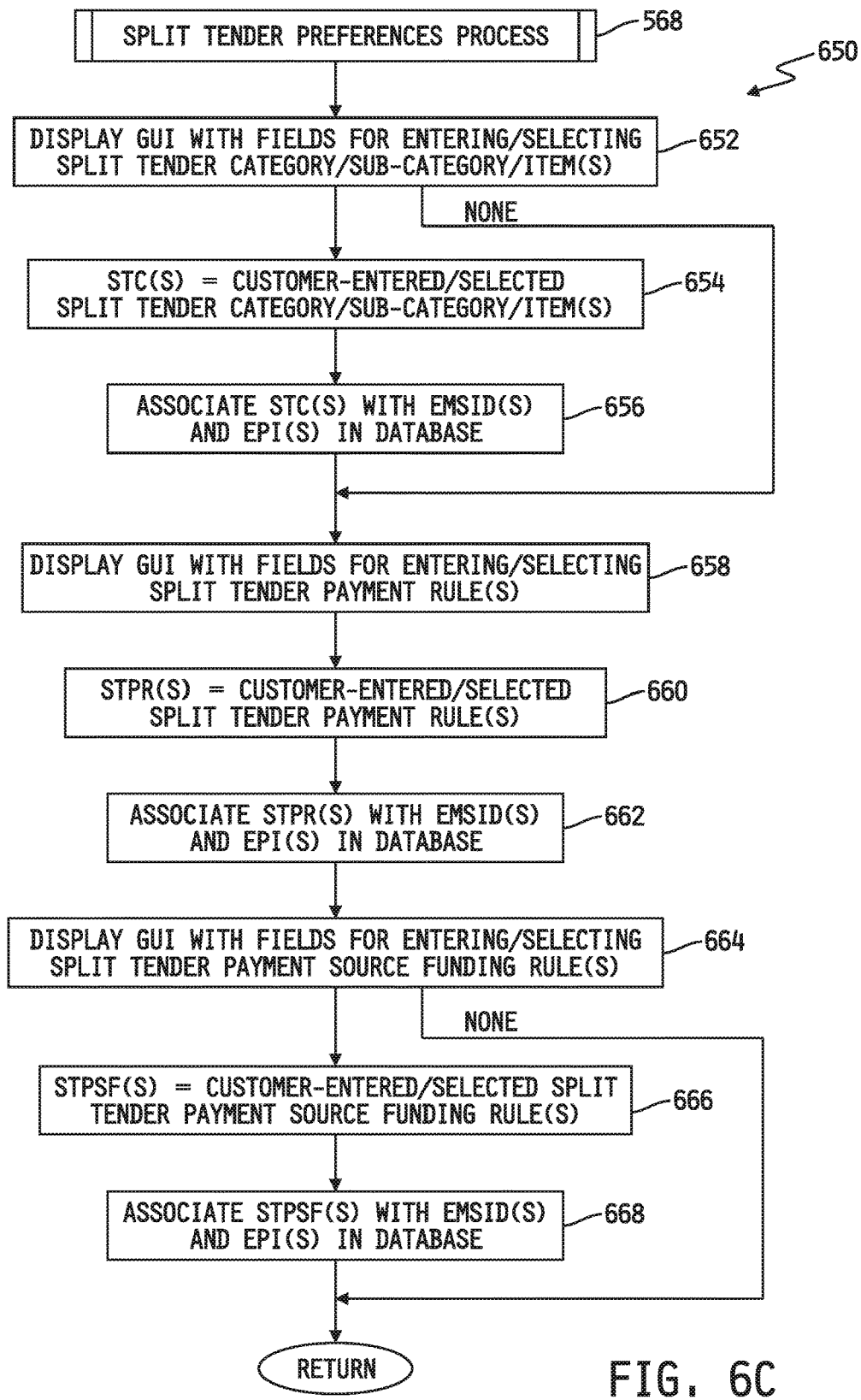
FIG. 6C is a simplified flow diagram of an embodiment of a process for facilitating entry by customers into their enterprise membership accounts split-tender preferences to be associated in their enterprise membership accounts with one or more electronic payment systems.

The split tender preferences module 458 is illustratively operable to provide and control via the EMS program, e.g., as part of each customer member's EMS page(s) within a web-based EMS interface or EMS website, a graphic user interface for use by customer members to link in their EMS accounts one or more split-tender preferences with one or more EPS/EPI and EMSID pairs. An example embodiment of a split tender preferences process 650 executed by the split tender preferences module 458 is illustrated in FIG. 6C, and the illustrated process 650 will be described in detail hereinafter.

Figure 6D:
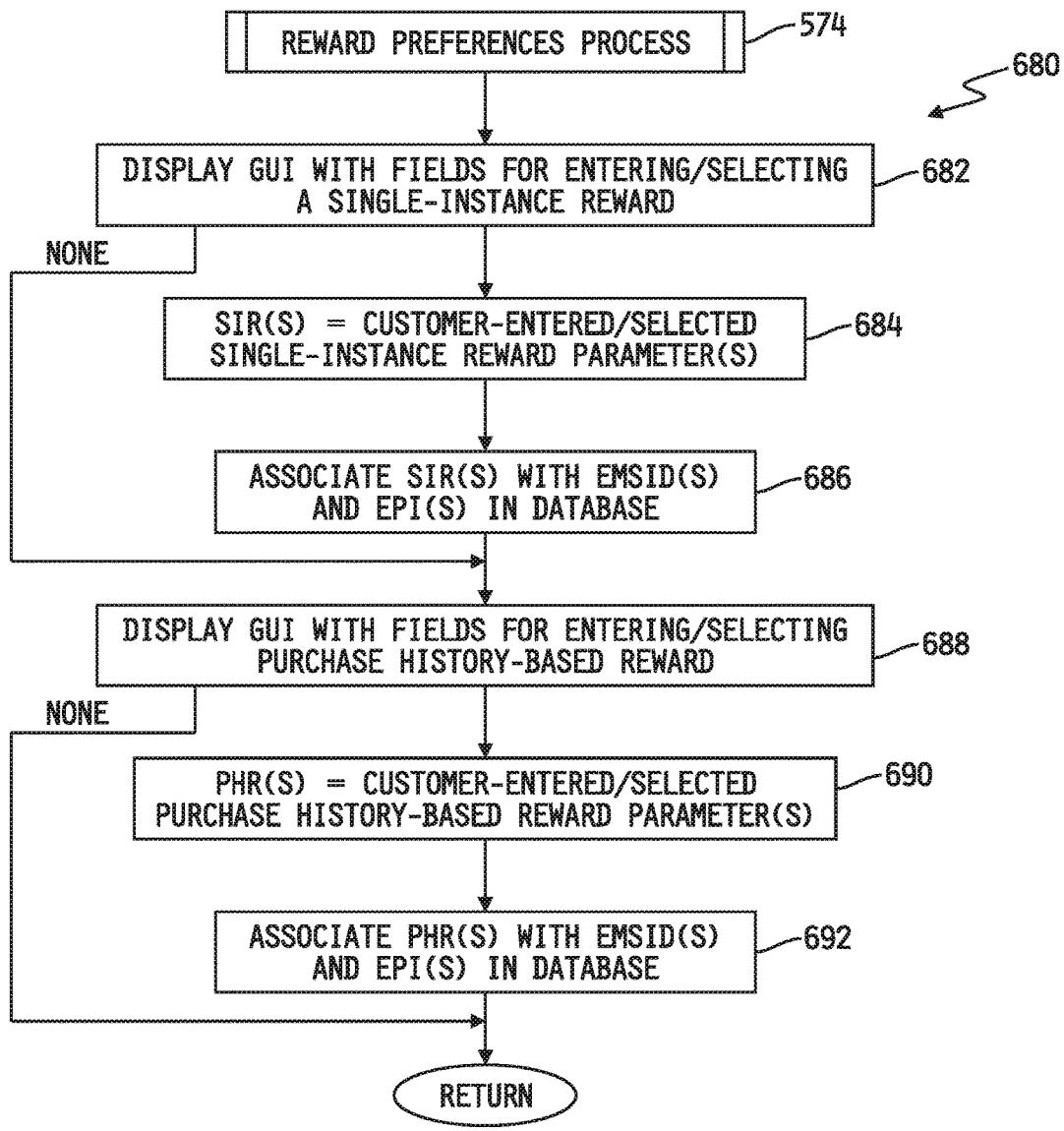
FIG. 6D is a simplified flow diagram of an embodiment of a process for facilitating entry by customers into their enterprise membership accounts reward preferences to be associated in their enterprise membership accounts with one or more electronic payment systems.

The reward preferences module 460 is illustratively operable to provide and control via the EMS program, e.g., as part of each customer member's EMS page(s) within a web-based EMS interface or EMS website, a graphic user interface for use by customer members to link in their EMS accounts one or more reward preferences with one or more EPS/EPI and EMSID pairs. An example embodiment of a reward preferences process 680 executed by the reward preferences module 460 is illustrated in FIG. 6D, and the illustrated process 680 will be described in detail hereinafter.

EPS/EPI Entry Process

Referring now to FIG. 5A, a simplified flow diagram is shown depicting an embodiment of a process 500 for facilitating entry by customers into their EMS accounts, e.g., within the customer account data 404 of the database 402, electronic payment information (EPI) for one or more electronic payment systems (EPS) and for linking any such EPI to one or more customer-supplied EMSIDs. The process 500 further illustratively includes a process for creating an EPI code for each such entered EPS, some example embodiments of which are illustrated in FIGS. 8A, 10A, 11A and 12 and will be described in detail hereinafter. The one or more EPI codes are illustratively used in combination with the one or more customer-supplied EMSIDs to identify and authorize access by the main server 12 to EPS data associated with the customer's EMS account, some example embodiments of which are illustrated in FIGS. 8B, 10B and 11B and will be described in detail hereinafter, for the purpose of processing by the main server 12 of such EPS data for payment of one or more items in transactions for the purchase of such one or more items from the retail enterprise 11, as illustrated by example in FIG. 7 and as will be described in greater detail hereinafter. The process illustrated in FIG. 5A further illustratively includes a process for selecting one or more customer preferences, some example embodiments of which are illustrated in FIGS. 5B and 6A-6D and will be described in detail hereinafter. Such one or more customer preferences are illustratively used during the processing of customer purchase transactions at any of the POS systems $24_1$-$24_M$, $24_1$-$24_N$ to automatically carry out one or more customer-selected customer display preferences, one or more cashier message preferences, one or more purchase restriction preferences, one or more split tender preferences and/or one or more reward preferences.

In one embodiment, the process 500 is or includes the EMS interface management module 440 and/or the EPS/EPI entry management module 442 stored in the memory 54 (and/or data storage 56) of the main server 12 in the form of instructions executable by the processor 50 of the main server 12. The process steps of the process 500 will thus be described below for purposes of this disclosure as being executed by the processor 50 of the main server 12. It will be understood, however, that in some alternate embodiments, the process 500 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 500 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 500 may be stored, in whole or in part, in a memory of the enterprise server(s) 26 in the form of instructions executable, in whole or in part, by a processor of the enterprise server(s) 26. In any such embodiments, the process 500 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 500 begins at step 502 where the processor 50 is operable to determine whether a customer has accessed that customer's page of the EMS interface, e.g., an access page of one or more dedicated and private pages of the EMS website hosted by the main server 12 and associated with or assigned to the customer, using the customer's EMSID or, in some embodiments, using one of multiple EMSIDs associated with or assigned to the customer. Access by the customer of the customer's page of the EMS interface may be accomplished, for example, using a mobile communication device 16 or a user computing device 18. In any case, upon detection of such access by the customer of the customer's page of the EMS interface, the process 500 advances to step 504 where the processor 50 is operable to generate and include for display on the accessed customer's page of the EMS interface a graphic user interface (GUI) which includes at least one electronic payment system (EPS) element. Illustratively, the at least one EPS element includes one or more elements or fields which the customer may select in order to subsequently enter into the customer's EMS account information relating to one or more electronic payment systems (EMS) that the customer uses or may use to tender payment for purchases of items from the retail enterprise 11. Upon detection by the processor 50 of selection by the customer of the at least one EPS element, the process 500 advances to step 506 where the processor 50 is operable to generate and include for display on the accessed customer's page of the EMS interface, or as a new page for display on the accessed customer's page of the EMS interface, an EPS graphic user interface (EPS GUI) with a plurality of fields in which the user can enter electronic payment information (EPI) associated with an EPS. Thereafter at step 508, the customer enters the EPI of a selected EPS into the plurality of EPS GUI fields.

As used herein, the term "electronic payment system" or "EPS" refers generally to any instrument of electronic funds transfer that is identifiable by an account number, card number, access number, code or other identification and that may be used by a customer and accepted by the retail enterprise 11 in the course of a purchase transaction to satisfy payment for items purchased by the customer from the retail enterprise 11 via a one of the point-of-sale systems $24_1$-$24_M$, $24_1$-$24_N$ of the retail enterprise 11. Examples of such instruments of electronic funds transfer include, but are not limited to, credit cards, debit cards, pre-paid credit cards, on-line money transfer accounts, wire transfer accounts, electronic or digital money certificates and/or accounts, ecommerce payment systems, and the like.

As used herein, the term "electronic payment information" or "EPI" refers generally to information uniquely associated with an EPS that identifies that EPS for purposes of transferring funds from the EPS to the retail enterprise 11. In some embodiments, the EPI may be or include an account or identification number or code that identifies the EPS, e.g., a credit card number. In other embodiments, the EPI may include one or more numbers or codes, e.g., a security code, in addition to the identification number or code. Any such "code" referred to in herein will be understood to be a unique combination, at least for purposes of identifying an EPS account, of one or more numerical digits, one or more letters of an alphabet in any language, one or more punctuation symbols and/or one or more symbols other than punctuation symbols.

In still other embodiments, the EPI may include information alternatively to, or in addition to, an account or identification number/code (and, in some embodiments, further alternatively to or in addition to a security number/code), examples of which may include the name of the person to whom the EPS is issued, birthdate of the person to whom the EPS is issued, part or all of the address of the person to whom the EPS is issued, part or all of the billing address of the payer or other funding source of the EPS, contact information, such as one or more telephone or mobile phone numbers, one or more email addresses, etc. of the person to whom the EPS is issued and/or of the payer or other funding source of the EPS, identity of and/or other information about the EPS issuer, the EPS payment processing organization, e.g., Visa®, MasterCard®, etc., or the like. It will be understood that "EPI," as used herein, may be or include one or any combination of any of the foregoing numbers, codes and/or information, and that additional information about the EPS, in addition to EPI, may be required by the process 500 to be entered by the customer into the EPS GUI displayed at step 506. As one specific example, the EPI in one embodiment may be defined completely by a combination of an account or identification number and security code of the EPS, although the process 500 may additionally require some or all of the information just described to be entered into the displayed EPS GUI in order to completely satisfy step 506, i.e., in order for the process 500 to advance from step 506 to step 508.

The process 500 advances from step 508 to step 510 where the processor 50 is operable to execute an EPI code generation process in which the processor 50 generates an EPI code that will be associated with the EPI. In one embodiment, the EPI is stored by the processor 50 in the customer account data 404 of the database 402. In alternate embodiments, the EPI may be stored, in whole or in part, elsewhere in one or more other databases or memory units within the system 10. In still other embodiments, the EPI may be stored, in whole or in part, in one or more databases or memory units outside of the system 10. The EPI/EPI code association may likewise be stored in the customer account data 404 of the database 402, although the EPI/EPI code association may in alternate embodiments be stored, in whole or in part, elsewhere in one or more other databases or memory units within or outside of the system 10. The EPI code itself may also be stored in the same database as the EPI or may alternatively be stored, in whole or in part, in one or more other databases or memory units within our outside of the system 10. In any case, the processor 50 is illustratively operable to execute step 510 using any one or more conventional data association mechanisms, examples of which include, but are not limited to, a table, a chart, a linked list or other pointer, or the like.

The EPI code is illustratively an EPS identification code which will be required to be supplied, in addition to the customer's EMSID, to a point-of-sale system $24_1$-$24_M$, $24_1$-$24_N$ in order to pay for items being purchased from the retail enterprise 11 using the selected EPS. A number of different embodiments of the EPI code generation process executed at step 510 are illustrated by example in FIGS. 8A, 10A, 11A and 12 and will be described in detail hereinafter. Following execution of the EPI code generation process at step 510, the process 500 advances, in some embodiments, to step 512 where the processor 50 is operable to execute a preferences selection process in which the customer may select or define one or more preferences to be automatically implemented by the processor 50 during the processing of purchase transactions at any of the POS systems $24_1$-$24_M$, $24_1$-$24_N$ using the EPI/EPI code pair generated at step 510 in association with the originally entered (or most recently selected) EMSID in order to automatically carry out one or more customer-selected customer display preferences, one or more cashier message preferences, one or more purchase restriction preferences, one or more split tender preferences and/or one or more reward preferences. Step 512 is illustratively illustrated by dashed-line representation in FIG. 5A to indicate that this step is optional and may be omitted in some embodiments, and/or duplicated or relocated at one or more points in the process 500. In any case, an embodiment of the preferences selection process executed at step 512, in embodiments which include step 512, is illustrated by example in FIG. 5B and will be described in detail hereinafter.

In embodiments which include step 512, the process 500 advances therefrom to step 514, and in embodiments which do not include step 512 the process advances from step 510 to step 514, where the processor 50 is operable to determine whether the customer has been assigned, or is otherwise associated with, one or more additional EMSIDs. If so, the process 500 advances to step 516 where the processor 50 is operable to generate and include for display on the accessed customer's page of the EMS interface a graphic user interface (GUI) which includes at least one selectable GUI element and instructions to selectively add, i.e., link or associate, or not, one of the additional EMSIDs assigned to or otherwise associated with the customer. Thereafter at step 518, the processor 50 is operable to determine, e.g., based on customer selection of the at least one displayed GUI element, whether the customer wishes to add one of the additional EMSIDs. If so, the process 500 advances to step 520 where the processor 50 is operable to generate and include for display on the accessed customer's page of the EMS interface a graphic user interface (GUI) which identifies the one or more EMSIDs assigned to or otherwise associated with the customer. In some embodiments, the processor 50 may be operable to identify the one or more EMSIDs in the form of a selectable menu or list of EMSIDs. In any case, the processor 50 is further illustratively operable at step 520 to include in the displayed GUI instructions to select one of, or the one of, the displayed EMSIDs, and thereafter at step 522 the process 500 loops back to step 510 with the EMSID selected by the customer. In the embodiment, the processor 50 is operable to execute step 522 by assigning an EMSID variable to the customer-selected EMSID, although it will be understood that the processor 50 may alternatively use any conventional technique at step 522 for identifying the customer-selected EMSID. In any case, the processor 50 is thereafter operable at step 510 to generate another EPI code to associate with the customer-selected EMSID, and to then execute step 512 (optionally) and step 514. The sub-process illustrated in steps 510-522 will be executed for each EMSID assigned to or otherwise associated with the customer that the customer wishes to link or otherwise associate with the EPS/EPI combination selected by the customer at step 506. If at any execution of step 514 the processor 50 determines that the customer does not have any additional assigned or otherwise associated EMSIDs, the process 500 advances along the "NO" branch of step 514. Likewise, if at any execution of step 518 the customer declines to link or associate the presently selected EPI/EPI code pair with any further EMSIDs assigned to or otherwise associated with the customer, the process 500 advances along the "NO" branch of step 518.

Following the "NO" branch of either of steps 514 and 518, the process 500 advances, in some embodiments in which the process 500 does not include step 512 or does not include the steps 512-522, to step 524 where the processor 50 is operable to execute the preferences selection process in which the customer may select or define one or more preferences to be automatically implemented by the processor 50 during the processing of purchase transactions at any of the POS systems $24_1$-$24_M$, $24_1$-$24_N$ using the EPI/EPI code pair generated at step 510 in association with the originally entered, or most recently selected, EMSID in order to automatically carry out one or more customer-selected customer display preferences, one or more cashier message preferences, one or more purchase restriction preferences, one or more split tender preferences and/or one or more reward preferences. Step 524 is illustratively illustrated by dashed-line representation in FIG. 5A to indicate that this step is optional and may be omitted in some embodiments, and/or duplicated or relocated at one or more points in the process 500.

In embodiments which include step 524, the process 500 advances therefrom to step 526, and in embodiments which do not include step 524 the process advances from the "NO" branch of either of steps 514 and 518 to step 526, where the processor 50 is operable to determine whether the customer wishes to specify and enter another EPS for potential subsequent use as a mechanism of payment for purchases made at the retail enterprise 11. If so, the process 500 loops back to step 506 where the customer is again presented with the EPS GUI within which the customer may enter electronic payment information, EPI, for another electronic payment system, EPS. If, at step 526, the customer does not wish to specify another electronic payment system, EPS, the process 500 advances, in some embodiments, to step 528 where the processor 50 is operable to execute a preferences selection process in which the customer may select or define one or more preferences to be automatically implemented by the processor 50 during the processing of purchase transactions at any of the POS systems $24_1$-$24_M$, $24_1$-$24_N$ using the EPI/EPI code pair generated at step 510 in association with the originally entered (or most recently selected) EMSID in order to automatically carry out one or more customer-selected customer display preferences, one or more cashier message preferences, one or more purchase restriction preferences, one or more split tender preferences and/or one or more reward preferences. Step 528 is illustratively illustrated by dashed-line representation in FIG. 5A to indicate that this step is optional and may be omitted in some embodiments, and/or duplicated or relocated at one or more points in the process 500. Following step 528, or following the "NO" branch of step 526 in embodiments which do not include step 528, the process 500 is complete.

The process 500 provides for any number of electronic payment systems, EPS, to be specified by the customer and associated with any one or more ESMIDs assigned to or otherwise associated with the customer, and any such specified EPS may be subsequently selected and used by the customer, in combination with any (selectable) one of the EMSIDs assigned to or otherwise associated with the customer, as payment for a purchase transaction at a point-of-sale system $24_1$-$24_M$, $24_1$-$24_N$ of the retail establishment 11. In some embodiments, the process 500 further allows the customer to selectively establish one or more preferences for one, all or any combination of EPI/EPI code pair and associated EMSID as illustrated by one or more of steps 512, 524 and 528.

Preferences Selection Process

Referring now to FIG. 5B, a simplified flow diagram is shown depicting an embodiment 550 of the preferences selection process executed at one or more of steps 512, 524 and 528 of the process 500 in embodiments of the process 500 which include one or more of the steps 512, 524 and 528. In one embodiment, the process 550 is or includes the preferences selection module 452 stored in the memory 54 (and/or data storage 56) of the main server 12 in the form of instructions executable by the processor 50 of the main server 12. The process steps of the process 550 will thus be described below for purposes of this disclosure as being executed by the processor 50 of the main server 12. It will be understood, however, that in some alternate embodiments, the process 550 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 550 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 550 may be stored, in whole or in part, in a memory of the enterprise server(s) 26 in the form of instructions executable, in whole or in part, by a processor of the enterprise server(s) 26. In any such embodiments, the process 550 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 550 begins at step 552 where the processor 50 is operable to generate and include for display on the accessed customer's page of the EMS interface a graphic user interface (GUI) which includes at least one selectable display/receipt preferences element. Illustratively, the at least one display/receipt element includes one or more elements or fields which the customer may select in order to subsequently enter into the customer's EMS account one or more display/receipt preferences to be executed by the processor 50 during the processing of purchase transactions at any of the POS systems 24₁-24_M_, 24₁-24_N_, in accordance with an associated EPI/EPI code pair and EMSID combination selected in the process 500 illustrated in FIG. 5A, to automatically implement one or more customer-selected display and/or receipt preferences. Upon subsequent detection at step 554 by the processor 50 of selection by the customer of the at least one display/receipt preferences element, the process 550 advances to step 556 where the processor 50 is operable to execute a display/receipt preferences process. An example embodiment of such a display/receipt preferences process is illustrated in FIG. 6A and will be described in detail hereinafter. If, at step 554, the processor 50 detects that the customer has declined selection of the at least one display/receipt preferences element, and also following execution of step 556, the process 550 advances to step 558.

At step 558 the processor 50 is operable to generate and include for display on the accessed customer's page of the EMS interface a graphic user interface (GUI) which includes at least one selectable purchase restriction preferences element. Illustratively, the at least one purchase restriction element includes one or more elements or fields which the customer may select in order to subsequently enter into the customer's EMS account one or more purchase restriction preferences to be executed by the processor 50 during the processing of purchase transactions at any of the POS systems 24₁-24_M_, 24₁-24_N_, in accordance with an associated EPI/EPI code pair and EMSID combination selected in the process 500 illustrated in FIG. 5A, to automatically implement one or more customer-selected purchase restrictions. Upon subsequent detection at step 560 by the processor 50 of selection by the customer of the at least one purchase restriction preferences element, the process 550 advances to step 562 where the processor 50 is operable to execute a purchase restriction preferences process. An example embodiment of such a purchase restriction preferences process is illustrated in FIG. 6B and will be described in detail hereinafter. If, at step 560, the processor 50 detects that the customer has declined selection of the at least one purchase restriction preferences element, and also following execution of step 562, the process 550 advances to step 564.

At step 564 the processor 50 is operable to generate and include for display on the accessed customer's page of the EMS interface a graphic user interface (GUI) which includes at least one selectable split tender preferences element. Illustratively, the at least one split tender preferences element includes one or more elements or fields which the customer may select in order to subsequently enter into the customer's EMS account one or more split tender preferences to be executed by the processor 50 during the processing of purchase transactions at any of the POS systems 24₁-24_M_, 24₁-24_N_, in accordance with an associated EPI/EPI code pair and EMSID combination selected in the process 500 illustrated in FIG. 5A, to automatically implement one or more customer-selected split tender preferences. Upon subsequent detection at step 566 by the processor 50 of selection by the customer of the at least one split tender preferences element, the process 550 advances to step 568 where the processor 50 is operable to execute a split tender preferences process. An example embodiment of such a split tender preferences process is illustrated in FIG. 6C and will be described in detail hereinafter. If, at step 564, the processor 50 detects that the customer has declined selection of the at least one split tender preferences element, and also following execution of step 566, the process 550 advances to step 570.

At step 570 the processor 50 is operable to generate and include for display on the accessed customer's page of the EMS interface a graphic user interface (GUI) which includes at least one selectable reward preferences element. Illustratively, the at least one reward preferences element includes one or more elements or fields which the customer may select in order to subsequently enter into the customer's EMS account one or more reward preferences to be executed by the processor 50 during the processing of purchase transactions at any of the POS systems 241-24M, 241-24N, in accordance with an associated EPI/EPI code pair and EMSID combination selected in the process 500 illustrated in FIG. 5A, to automatically implement one or more customer-selected reward preferences. Upon subsequent detection at step 572 by the processor 50 of selection by the customer of the at least one reward preferences element, the process 550 advances to step 574 where the processor 50 is operable to execute a reward preferences process. An example embodiment of such a reward preferences process is illustrated in FIG. 6D and will be described in detail hereinafter. If, at step 572, the processor 50 detects that the customer has declined selection of the at least one reward preferences element, and also following execution of step 574, the process 550 returns to the process 500 illustrated in FIG. 5. 528.

The process 550 is illustrated in FIG. 5B and described herein as including a sequence of four different selectable preferences processes, i.e., a display/receipt preferences process, a purchase restriction preferences process, a split tender preferences process and a reward preferences process. It will be understood, however, that alternative embodiments of the process 550 may include more, fewer, different or different combinations of such selectable preferences processes, and that any such alternative embodiments of the process 550 are contemplated by this disclosure.

Display/Receipt Preferences Process

Referring now to FIG. 6A, a simplified flow diagram is shown depicting an embodiment 600 of the display/receipt preferences process executed at step 556 of the process 550 illustrated in FIG. 5B. In accordance with the process 600, the customer may select one or more display/receipt preferences to be automatically implemented during subsequent processing of purchase transactions at any of the POS systems 24₁-24_M_, 24₁-24_N_ and conducted in accordance with the EPI/EPI code pair and EMSID combination selected in the process 500 illustrated in FIG. 5A.

In one embodiment, the process 600 is or includes the display/receipts preferences module 454 stored in the memory 54 (and/or data storage 56) of the main server 12 in the form of instructions executable by the processor 50 of the main server 12. The process steps of the process 600 will thus be described below for purposes of this disclosure as being executed by the processor 50 of the main server 12. It will be understood, however, that in some alternate embodiments, the process 600 may be alternatively stored, in whole or in part, in the memory 34 (and/or data storage 36) of the one or more of the local servers 22₁-22_L_ in the form of instructions executable, in whole or in part, by the processor 30 of one or more of the local servers 22₁-22_L_, and in other embodiments the process 600 may be stored, in whole or in part, in the memory 202 (and/or data storage 206) of the one or more of the POS systems 24₁-24_M_, 24₁-24_N_ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 600 may be stored, in whole or in part, in a memory of the enterprise server(s) 26 in the form of instructions executable, in whole or in part, by a processor of the enterprise server(s) 26. In any such embodiments, the process 600 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 600 begins at step 602 where the processor 50 is operable to generate and include for display on the accessed customer's page of the EMS interface a graphic user interface (GUI) which includes one or more fields for entering at least one receipt-type preference or one or more GUI elements for selecting at least one receipt-type preference; i.e., at least one preference for the form of sales receipt to be produced following the purchase transaction. Example receipt-type preferences may illustratively include, but are not limited to, one or more of a hard-copy (i.e., paper) receipt, an email receipt, e.g., emailed by the server 12 to one or more selected email addresses entered by the customer, a text receipt, e.g., sent by the server 12 via a mobile messaging service to one or more mobile communication devices 16 entered by the customer, and the like. Following step 602, the process 600 advances to step 604 where the processor 50 captures the receipt type preference(s) selected and/or entered by the customer at step 602. In the illustrated embodiment, the processor 50 is operable to execute step 604 by assigning at least one receipt-type variable RECPT (S) to the at least one customer selected or entered receipt-type, although it will be understood that the processor 50 may alternatively use any conventional technique at step 604 for capturing the receipt type preference(s) selected and/or entered by the customer at step 602. Thereafter at step 606, the processor 50 is operable to associate the captured receipt type preference(s) selected and/or entered by the customer, e.g., RECPT(S), with the corresponding EPI/EPI code pair and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI/EPI code pair and EMSID combination, the processor 50 will automatically implement the one or more receipt-type preferences selected and/or entered by the customer at step 602.

The process 600 illustratively advances from step 606 to step 608 where the processor 50 is operable to generate and include for display on the accessed customer's page of the EMS interface a graphic user interface (GUI) which includes one or more fields for entering a zip code confirmation preference or one or more GUI elements for selecting a zip code confirmation preference. In some conventional purchase transactions in which an electronic payment system (EPS) medium, e.g., a credit card, debit card or the like, is used as the form of payment, the payment processing system may require confirmation of the zip code of the billing address of the EPS medium holder before payment can be processed, and in some such cases the holder must manually enter such the zip code into a payment system keypad or touchscreen. The zip code confirmation preferences offered at step 608 illustratively allow the customer to maintain this practice or to instruct the processor 50 to automatically confirm the customer's zip code based on zip code information provided by the customer as part of the EPI information entered by the customer in the process 500 illustrated in FIG. 5A. Following step 608, the process 600 advances to step 610 where the processor 50 captures the zip code preference selected and/or entered by the customer at step 608. In the illustrated embodiment, the processor 50 is operable to execute step 610 by assigning a zip code variable ZCODE to the customer selected or entered zip code preference, although it will be understood that the processor 50 may alternatively use any conventional technique at step 610 for capturing the zip code preference selected and/or entered by the customer at step 608. Thereafter at step 612, the processor 50 is operable to associate the captured zip code preference selected and/or entered by the customer, e.g., ZCODE, with the corresponding EPI/EPI code pair and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI/EPI code pair and EMSID combination, the processor 50 will automatically implement the zip code preference selected and/or entered by the customer at step 608. If, for example, the customer selects as the zip code preference at step 608 the conventional zip code confirmation process, the customer's zip code will be required to be provided, e.g., via manual entry using a keypad or touchscreen, during subsequent processing of purchase transactions at any of the POS systems $24_1$-$24_M$, $24_1$-$24_N$ which are conducted in accordance with the associated EPI/EPI code pair and EMSID combination. If, on the other hand, the customer selects as the zip code preference at step 608 an automatic zip code confirmation process, the processor 50 will automatically confirm the customer's zip code during subsequent processing of purchase transactions at any of the POS systems $24_1$-$24_M$, $24_1$-$24_N$ which are conducted in accordance with the associated EPI/EPI code pair and EMSID combination by accessing the customer' zip code information associated in the database with the EPI/EPI code pair and EMSID combination.

The process 600 illustratively advances from step 612 to step 614 where the processor 50 is operable to generate and include for display on the accessed customer's page of the EMS interface a graphic user interface (GUI) which includes one or more fields for entering a car wash preference or one or more GUI elements for selecting a car wash preference. In some conventional purchase transactions, e.g., such as at a fuel pump or station, in which an electronic payment system (EPS) medium, e.g., a credit card, debit card or the like, is used as the form of payment, the payment processing system may require the purchaser to elect or decline to add to the purchase total an amount for a car wash to be administered following the fueling purchase, and in some such cases the holder must manually enter the selection into a payment system keypad or touchscreen. The car wash preferences offered at step 614 illustratively allow the customer to maintain this practice, to automatically charge the car wash amount to the EPS identified by the EPI/EPI code provided by the customer as part of the EPI information entered by the customer in the process 500 illustrated in FIG. 5A or to automatically decline the car wash offer. Following step 614, the process 600 advances to step 616 where the processor 50 captures the car wash preference selected and/or entered by the customer at step 614. In the illustrated embodiment, the processor 50 is operable to execute step 616 by assigning a car wash variable CWASH to the customer selected or entered car wash preference, although it will be understood that the processor 50 may alternatively use any conventional technique at step 616 for capturing the car wash preference selected and/or entered by the customer at step 614. Thereafter at step 618, the processor 50 is operable to associate the captured car wash preference selected and/or entered by the customer, e.g., CWASH, with the corresponding EPI/EPI code pair and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI/EPI code pair and EMSID combination, the processor 50 will automatically implement the car wash preference selected and/or entered by the customer at step 614, e.g., by continuing to prompt for a car wash selection at each such purchase transaction in accordance with the conventional process, by automatically charging at each such purchase transaction the EPS identified by the EPI/EPI code pair for a car wash without prompting for selection thereof according to the conventional process, or by automatically declining a car wash at each such purchase transaction without prompting for selection thereof as in the conventional process according to the conventional process.

The process 600 illustratively advances from step 618 to step 620 where the processor 50 is operable to generate and include for display on the accessed customer's page of the EMS interface a graphic user interface (GUI) which includes one or more fields for entering one or more cashier message preferences or one or more GUI elements for selecting one or more cashier message preferences. As described hereinabove, some embodiments of the POS systems $24_1$-$24_M$, $24_1$-$24_N$ may include a number of display monitors 218, and at least such display monitor 218 may be or include a cashier display monitor 218 controllable by the processor 50 of the main server 12, the processor 30 of the corresponding local hub server 22 and/or the processor 200 of the POS system 24 to display information to the cashier or POS attendant. In such embodiments, the one or more cashier message preferences which may be selected or entered by the customer at step 620 will be automatically implemented by the processor 50 by controlling the cashier display monitor 218 to display one or more corresponding messages, instructions or other information to the cashier or POS attendant each time a purchase transaction is conducted at such a POS system in accordance with the associated EPI/EPI code pair and EMSID combination. Examples of such cashier messages that may be selected or entered by the customer at step 620 may include, but are not limited to, instructions to verbally offer lottery tickets to the customer, instructions to automatically charge and provide the customer with some predesignated number of lottery tickets, instructions to verbally offer the customer postage stamps, instructions to automatically charge and provide the customer with some predesignated number or rolls of postage stamps, instructions to automatically select, e.g., without asking the customer to select, the form or style of bags to be used in the bagging area, e.g., paper or plastic, instructions to automatically charge and provide product warranties for products being purchased with optional warranties, instructions to refrain from asking the customer whether the customer wishes to pay for product warranties for products being purchased with optional warranties, information relating to physical or other disabilities of the customer, the customer's name, the customer's birthday, instructions to verbally provide the customer with prescription refill reminders and/or prescriptions ready for pickup, notification of, and information relating to, government assistance payment forms, e.g., government assistance EPS number(s) and/or code(s), split tender payment instructions, etc., instructions or notifications of preferred dialog level with customer, e.g., free dialog, minimal dialog, etc., and the like, and/or to provide any one or more such instruction, notification, message or other information with respect to one given access by the customer to the, or one of the, EPI code(s) and EMSID(s) associated in the customer account data 404 with the EPS identified by the EPI linked to the EPI code and EMSID. Those skilled in the art will recognize other instructions, messages, notifications and/or other information that the customer may select to be automatically displayed to the cashier or POS attendant, and it will be understood than any such other instructions, messages, notifications and/or other information is contemplated by this disclosure.

Following step 620, the process 600 advances to step 622 where the processor 50 captures the cashier message preference(s) selected and/or entered by the customer at step 620. In the illustrated embodiment, the processor 50 is operable to execute step 622 by assigning a cashier message variable CAM to each customer selected or entered cashier message preference, although it will be understood that the processor 50 may alternatively use any conventional technique at step 622 for capturing the cashier message preference(s) selected and/or entered by the customer at step 622. Thereafter at step 624, the processor 50 is operable to associate the captured cashier preference(s) selected and/or entered by the customer, e.g., CAM, with the corresponding EPI/EPI code pair and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI/EPI code pair and EMSID combination, the processor 50 will automatically implement the cashier message preference(s) selected and/or entered by the customer at step 620, e.g., by controlling the cashier display 218 to display one or more corresponding messages, instructions, notifications and/or other information.

The process 600 is illustrated in FIG. 6A and described herein as including a sequence of four different selectable display/receipt preferences, i.e., a receipt type preference(s), a zip code confirmation preference, a car wash preference and a cashier message preference(s). It will be understood, however, that alternative embodiments of the process 600 may include more, fewer, different or different combinations of such selectable preferences, and that any such alternative embodiments of the process 600 are contemplated by this disclosure. For example, in some conventional purchase transactions in which an electronic payment system (EPS) medium, e.g., a credit card, debit card or the like, is used as the form of payment, the payment processing system may require the purchaser to elect or decline to include in the transaction a monetary amount that the retail enterprise 11, e.g., via a cashier or attendant, will immediately provide to the user in the form of cash, e.g., a "cash back" amount, and in such cases the customer must typically enter the selection and amount, if any, into a payment system keypad or touchscreen. In some embodiments, the display/receipt preferences process 600 may illustratively include one or more additional cash back preferences steps, e.g., similar to those which implement the car wash preference, which operate to allow the customer to maintain the conventional practice just described, to automatically charge a defined monetary amount such that the customer always receives the defined amount of cash as part of every purchase transaction or to automatically decline the cash back offer at each such purchase transaction without the processor 50 controlling a POS display 218 and/or display of a POS purchase interface 214 to prompt for selection thereof as in the conventional process.

Purchase Restriction Preferences Process

Referring now to FIG. 6B, a simplified flow diagram is shown depicting an embodiment 630 of the purchase restriction preferences process executed at step 562 of the process 550 illustrated in FIG. 5B. In accordance with the process 630, the customer may select one or more purchase restriction preferences to be automatically implemented during subsequent processing of purchase transactions at any of the POS systems $24_1$-$24_M$, $24_1$-$24_N$ and conducted in accordance with the EPI and EMSID combination selected in the process 500 illustrated in FIG. 5A.

In some embodiments, a customer, e.g., a parent, guardian or other, ("the provider") may wish to allow another, e.g., a child, dependent or other, ("the user") to purchase items from the retail enterprise 11 by charging at least some of the items via one of the POS systems $24_1$-$24_M$, $24_1$-$24_N$ to an EPS established by the customer in the customer's EMS account data 404 (e.g., using the process 500 illustrated in FIG. 5A) without actually providing the user with physical or other access to the EPS. In such embodiments, the provider may provide the user with the EMSID, or one of the EMSIDs, associated in the customer account data 404 with a corresponding EPI established by the provider, and also with a security code. Embodiments of various processes for selecting or creating the security code are illustrated in FIGS. 8A, 10A, 11A and 12 and will be described hereinafter. In any case, the user may purchase items from the retail enterprise 11 and charge one or more such items via one of the POS systems $24_1$-$24_M$, $24_1$-$24_N$ to the EPS identified by a corresponding EPI associated in the provider's customer account data 404 with the EMSID and EPI code which matches the security code supplied by the provider to the user. Illustratively, the user will take action, e.g., manually or otherwise via some user-controlled physical movement or gesture, to provide the EMSID and security code to the one of the POS systems $24_1$-$24_M$, $24_1$-$24_N$ at which the purchase transaction is taking place. The processor 50, in turn, processes the user-supplied EMSID and security code by searching the customer account data 404 for a matching EMSID and EPI code, and then charges one or more of the items being purchased by the user to the EPS identified by the EPI associated in the customer account data 404 with the matching EMSID and EPI code.

In such embodiments in which the customer is the provider and another is the user and/or in other embodiments in which the customer is both the provider and the user, the provider of the EPS may wish to restrict or limit the items purchasable using the EPS as just described. Example restrictions may include, but are not limited to, restrictions on the type or category of items, the total number of items, the total number of items within an item category, the total amount spent, the total amount spent within one or more item category or on one or more types of items, and the like. The process 630 illustrated in FIG. 6B illustrates one example embodiment of a process by which the provider may establish purchase restriction preferences.

In one embodiment, the process 630 is or includes the purchase restriction preferences module 456 stored in the memory 54 (and/or data storage 56) of the main server 12 in the form of instructions executable by the processor 50 of the main server 12. The process steps of the process 630 will thus be described below for purposes of this disclosure as being executed by the processor 50 of the main server 12. It will be understood, however, that in some alternate embodiments, the process 630 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 630 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 630 may be stored, in whole or in part, in a memory of the enterprise server(s) 26 in the form of instructions executable, in whole or in part, by a processor of the enterprise server(s) 26. In any such embodiments, the process 630 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 630 begins at step 632 where the processor 50 is operable to generate and include for display on the accessed customer's page of the EMS interface a graphic user interface (GUI) which includes one or more fields for entering at least one purchase restriction category or one or more GUI elements for selecting at least one purchase restriction category; i.e., at least one category of goods or services for which purchases may be made at any of the POS systems $24_1$-$24_M$, $24_1$-$24_N$ in accordance with the associated EPI/EPI code pair and EMSID combination. Examples of such category restrictions may include, but are not limited to, any one or combination of grocery, fuel, pharmacy, general merchandise, photo-related items, outdoor items, automotive items, household items, pet-related items, sporting goods, computer-related items, school supplies, and the like. Illustratively, one or more purchase restriction categories may include one or more purchase restriction sub-categories. Example category/sub-category combinations include, but are not limited to, one or any combination of grocery/produce, grocery/dairy, pharmacy/prescription medication, computer-related items/printer cartridges, and the like.

Following step 632, the process 630 advances to step 634 where the processor 50 captures the purchase restriction category preference(s) selected and/or entered by the customer at step 632. In the illustrated embodiment, the processor 50 is operable to execute step 634 by assigning at least one purchase restriction category variable CAT(S) to the at least one customer selected or entered purchase restriction category, although it will be understood that the processor 50 may alternatively use any conventional technique at step 634 for capturing the purchase restriction category preference(s) selected and/or entered by the customer at step 632. Thereafter at step 636, the processor 50 is operable to associate the captured purchase restriction category preference(s) selected and/or entered by the customer, e.g., CAT(S), with the corresponding EPI/EPI code pair and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI/EPI code pair and EMSID combination, the processor 50 will automatically implement the one or more purchase restriction category preferences selected and/or entered by the customer at step 632, e.g., by not processing items outside of the one or more purchase restriction categories during processing of purchase transactions at any of the POS systems $24_1\text{-}24_M$, $24_1\text{-}24_N$ in accordance with the EPI/EPI code pair and EMSID combination and, in some embodiments, by controlling one or more of the displays 218 and/or display of the purchase interface 214 of the POS system 24 to display one or more notifications, messages or other information relating to one or more reasons for rejecting, i.e., not processing, one or more items. Following step 636, and also following the "NONE" branch of step 632 if the customer declines to select or enter one or more purchase restriction category preferences, the process 630 advances to step 638.

At step 638, the processor 50 is operable to generate and include for display on the accessed customer's page of the EMS interface a graphic user interface (GUI) which includes one or more fields for entering at least one non-purchasable item, item category and/or item sub-category or one or more GUI elements for selecting at least one non-purchasable item, item category and/or item sub-category; i.e., at least one item, category of items and/or sub-category of items which cannot be purchased at any of the POS systems $24_1\text{-}24_M$, $24_1\text{-}24_N$ in accordance with the associated EPI/EPI code pair and EMSID combination. Examples of non-purchasable item categories may include, but are not limited to, any one or combination of grocery, fuel, pharmacy, general merchandise, photo-related items, outdoor items, automotive items, household items, pet-related items, sporting goods, computer-related items, school supplies, and the like. Examples of non-purchasable item sub-categories may include, but are not limited to, any one or combination of alcohol, tobacco products, soft drinks, and the like. Examples of non-purchasable items may include, but are not limited to, beer, wine, lottery tickets, cigarettes, and the like.

Following step 638, the process 630 advances to step 640 where the processor 50 captures the non-purchasable category/sub-category/item preference(s) selected and/or entered by the customer at step 638. In the illustrated embodiment, the processor 50 is operable to execute step 640 by assigning at least one non-purchasable category/sub-category/item variable SUBC(S) to the at least one customer selected or entered non-purchasable category/sub-category/item, although it will be understood that the processor 50 may alternatively use any conventional technique at step 640 for capturing the non-purchasable category/sub-category/item preference(s) selected and/or entered by the customer at step 638. Thereafter at step 642, the processor 50 is operable to associate the captured non-purchasable category/sub-category/item preference(s) selected and/or entered by the customer, e.g., SUBC(S), with the corresponding EPI/EPI code pair and EMSID combination selected by the customer in the process 500 illustrated in FIG. 5A. During subsequent processing of purchase transactions at any of the POS systems $24_1\text{-}24_M$, $24_1\text{-}24_N$ which are conducted in accordance with the associated EPI/EPI code pair and EMSID combination, the processor 50 will automatically implement the one or more non-purchasable category/sub-category/item preferences selected and/or entered by the customer at step 638, e.g., by not processing any item in or defined by any customer-selected non-purchasable category/sub-category/item during processing of purchase transactions at any of the POS systems $24_1\text{-}24_M$, $24_1\text{-}24_N$ in accordance with the EPI/EPI code pair and EMSID combination and, in some embodiments, by controlling one or more of the displays 218 or the display of the purchase interface 214 of the POS system 24 to display one or more notifications, messages or other information relating to one or more reasons for rejecting, i.e., not processing, one or more such items. Following step 642, and also following the "NONE" branch of step 638 if the customer declines to select or enter one or more non-purchasable category/sub-category/item preferences, the process 630 advances to step 644.

At step 644, the processor 50 is operable to generate and include for display on the accessed customer's page of the EMS interface a graphic user interface (GUI) which includes one or more fields for entering at least one category/sub-category/item spending limit preference or one or more GUI elements for selecting at least one category/sub-category/item spending limit preference; i.e., at least one spending limit that may not be exceeded in at least one category or sub-category or exceeded on at least one item in one or a series of purchase transactions or in purchase transactions over a definable period of time at any of the POS systems $24_1\text{-}24_M$, $24_1\text{-}24_N$ in accordance with the associated EPI/EPI code pair and EMSID combination. Examples of category, sub-category and item spending limits may include, but are not limited to, a maximum currency amount per purchase transaction or per defined time period, e.g., per day, per week, per month, etc., for one or more item categories, e.g., as described by example above, and/or one or more item subcategories, e.g., as described by example above, and/or for one or more items, e.g., as described by example above, or for all purchases in the purchase transaction or within a defined time period.

Following step 644, the process 630 advances to step 646 where the processor 50 captures the category/sub-category/item spending limit preference(s) selected and/or entered by the customer at step 644. In the illustrated embodiment, the processor 50 is operable to execute step 646 by assigning at least one category/sub-category/item variable SLCAT(S) to the at least one customer selected or entered category/sub-category/item, and at least one spending limit variable SL(S) associated with each of the one or more category/sub-category/item variables SLCAT(S), although it will be understood that the processor 50 may alternatively use any conventional technique at step 646 for capturing the category/sub-category/item spending limit preference(s) selected and/or entered by the customer at step 644. Thereafter at step 648, the processor 50 is operable to associate the captured category/sub-category/item spending limit preference(s) selected and/or entered by the customer, e.g., SCAT(S)/SL(S), with the corresponding EPI/EPI code pair and EMSID combination selected by the customer in the process 500 illustrated in FIG. 5A. During subsequent processing of purchase transactions at any of the POS systems $24_1\text{-}24_M$, $24_1\text{-}24_N$ conducted in accordance with the associated EPI/EPI code pair and EMSID combination, the processor 50 will automatically implement the one or more category/sub-category/item spending limit preferences selected and/or entered by the customer at step 644, e.g., by processing items in any customer-defined category/sub-category/item during processing of purchase transactions at any of the POS systems $24_1\text{-}24_M$, $24_1\text{-}24_N$ in accordance with the EPI/EPI code pair and EMSID combination only if the associated spending limit(s) has/have not been exceeded, and to thereafter not process any such items and, in some embodiments, by controlling one or more of the displays 218 or the display of the purchase interface 214 of the POS system 24 to display one or more notifications, messages or other information relating to one or more reasons for rejecting, i.e., not processing, one or more such items. Following step 648, and also following the "NONE" branch of step 644 if the customer declines to select or enter one or more category/sub-category/item spending limit preference(s), the process 630 returns to step 562 of the process 550 illustrated in FIG. 5B.

The process 630 is illustrated in FIG. 6B and described herein as including a sequence of three different selectable purchase restriction preferences, i.e., one or more purchase restriction categories/sub-categories, one or more non-purchasable items and/or categories/sub-categories, and one or more category/sub-category/item spending limits. It will be understood, however, that alternative embodiments of the process 630 may include more, fewer, different or different combinations of such selectable preferences, and that any such alternative embodiments of the process 630 are contemplated by this disclosure.

Split Tender Preferences Process

Referring now to FIG. 6C, a simplified flow diagram is shown depicting an embodiment 650 of the split tender preferences process executed at step 568 of the process 550 illustrated in FIG. 5B. In accordance with the process 650, the customer may select one or more split tender preferences to be automatically implemented during subsequent processing of purchase transactions at any of the POS systems $24_1$-$24_M$, $24_1$-$24_N$ conducted in accordance with the EPI and EMSID combination selected in the process 500 illustrated in FIG. 5A.

As described above with respect to the purchase restriction preferences process, a customer, e.g., a parent, guardian or other, ("the provider") may wish to allow another, e.g., a child, dependent or other, ("the user") to purchase items from the retail enterprise 11 by charging at least some of the items via one of the POS systems $24_1$-$24_M$, $24_1$-$24_N$ to an EPS established by the customer in the customer's EMS account data 404 (e.g., using the process 500 illustrated in FIG. 5A) without actually providing the user with physical or other access to the EPS. In such embodiments, the user may charge one or more items in a purchase transaction conducted via one of the POS systems $24_1$-$24_M$, $24_1$-$24_N$ to the EPS identified by a corresponding EPI associated in the provider's customer account data 404 with the EMSID and EPI code which matches a security code supplied by the provider to the user. Illustratively, the user will take action to provide the EMSID and security code to the one of the POS systems $24_1$-$24_M$, $24_1$-$24_N$ at which the purchase transaction is taking place, and the processor 50 then processes the transaction by searching the customer account data 404 for a matching EMSID and EPI code, and then charges one or more of the items being purchased by the user to the EPS identified by the EPI associated in the customer account data 404 with the matching EMSID and EPI code.

In such embodiments in which the customer is the provider and another is the user and/or in other embodiments in which the customer is both the provider and the user, the provider of the EPS may wish to allow use of the EPS to subsidize purchases made by the user in a so-called "split tender" arrangement in which the EPS may be used in payment for only a defined portion of the cost of one or more items, categories of items and/or subcategories of items in any one purchase transaction or in any collection of purchase transactions over some defined time period. The process 650 illustrated in FIG. 6C illustrates one example embodiment of a process by which the provider may establish split tender preferences.

In one embodiment, the process 650 is or includes the split tender preferences module 458 stored in the memory 54 (and/or data storage 56) of the main server 12 in the form of instructions executable by the processor 50 of the main server 12. The process steps of the process 650 will thus be described below for purposes of this disclosure as being executed by the processor 50 of the main server 12. It will be understood, however, that in some alternate embodiments, the process 650 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 650 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 650 may be stored, in whole or in part, in a memory of the enterprise server(s) 26 in the form of instructions executable, in whole or in part, by a processor of the enterprise server(s) 26. In any such embodiments, the process 650 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 650 begins at step 652 where the processor 50 is operable to generate and include for display on the accessed customer's page of the EMS interface a graphic user interface (GUI) which includes one or more fields for entering at least one split tender category/sub-category/item or one or more GUI elements for selecting at least one split tender category/sub-category/item; i.e., at least one category of goods or services, sub-category of goods or services and/or one item of goods or services for which split tender purchases may be made at any of the POS systems $24_1$-$24_M$, $24_1$-$24_N$ in accordance with the associated EPI/EPI code pair and EMSID combination. Examples of such split tender categories may include, but are not limited to, any one or combination of grocery, fuel, pharmacy, general merchandise, photo-related items, outdoor items, automotive items, household items, pet-related items, sporting goods, computer-related items, school supplies, and the like. Examples of split tender sub-categories may include, but are not limited to, one or any combination of produce, dairy, prescription medication, printer cartridges, and the like. Examples of split tender items may include, but are not limited to, any single one or combination of individual products or services offered for sale by the retail enterprise 11.

Following step 652, the process 650 advances to step 654 where the processor 50 captures the split tender category/sub-category/item preference(s) selected and/or entered by the customer at step 652. In the illustrated embodiment, the processor 50 is operable to execute step 654 by assigning at least one split tender category/sub-category/item variable STC(S) to the at least one customer-selected or entered split tender category/sub-category/item preference, although it will be understood that the processor 50 may alternatively use any conventional technique at step 654 for capturing the split tender category/sub-category/item preference(s) selected and/or entered by the customer at step 652. Thereafter at step 656, the processor 50 is operable to associate the captured split tender category/sub-category/item preference (s) selected and/or entered by the customer, e.g., STC(S), with the corresponding EPI/EPI code pair and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI/EPI code pair and EMSID combination, the processor 50 will automatically implement the one or more split tender category/sub-category/item preferences selected and/or entered by the customer at step 632, e.g., by processing items within each of the one or more customer-selected or entered split tender categories, sub-categories and/or items in accordance with one or more corresponding customer-selected or entered split tender payment rules in purchase transactions at any of the POS systems $24_1$-$24_M$, $24_1$-$24_N$ in accordance with the EPI/EPI code pair and EMSID combination and, in some embodiments, by controlling one or more of the displays 218 and/or display of the purchase interface 214 of the POS system 24 to display one or more notifications, messages or other information relating to the processing of such items. Following step 656, and also following the "NONE" branch of step 652 if the customer declines to select or enter one or more split tender category/sub-category/item preferences, the process 650 advances to step 658.

At step 658, the processor 50 is operable to generate and include for display on the accessed customer's page of the EMS interface a graphic user interface (GUI) which includes one or more fields for entering at least one split tender payment rule or one or more GUI elements for selecting at least one split tender payment rule; i.e., a payment subsidization rule defining an amount or degree of subsidization of a category of items, sub-category of items and/or item(s) purchased at any of the POS systems $24_1$-$24_M$, $24_1$-$24_N$ in accordance with the associated EPI/EPI code pair and EMSID combination. Examples of such split tender payment rules may include, but are not limited to, any one or combination of % of total spend, % of spend in any category of items selected by the customer at step 552, % of spend in any sub-category of items selected by the customer at step 552, % of spend for any item(s) selected by the customer at step 552, spend limit for total spend, spend limit in any category of items selected by the customer at step 552, spend limit in any sub-category of items selected by the customer at step 552, spend limit for any item(s) selected by the customer at step 552, and the like.

Following step 658, the process 650 advances to step 660 where the processor 50 captures the split tender payment rule(s) selected and/or entered by the customer at step 658. In the illustrated embodiment, the processor 50 is operable to execute step 660 by assigning at least one split tender payment rule variable STPR(S) to the at least one customer-selected or entered split tender payment rule, although it will be understood that the processor 50 may alternatively use any conventional technique at step 660 for capturing the split tender payment rule(s) selected and/or entered by the customer at step 658. Thereafter at step 662, the processor 50 is operable to associate the captured split tender payment rule(s) selected and/or entered by the customer, e.g., STPR (S), with corresponding one(s) of the split tender payment category(s), split tender payment sub-category(s) and/or split tender item(s) selected or entered by the customer at step 652 and with the corresponding EPI/EPI code pair and EMSID combination selected by the customer in the process 500 illustrated in FIG. 5A. During subsequent processing of purchase transactions at any of the POS systems $24_1$-$24_M$, $24_1$-$24_N$ which are conducted in accordance with the associated EPI/EPI code pair and EMSID combination, the processor 50 will automatically implement the one or more split tender payment rules selected and/or entered by the customer at step 658 for each item(s) purchased in any of the corresponding split tender payment category(s), split tender payment sub-category(s) and/or split tender item(s) selected or entered by the customer at step 652 and, in some embodiments, by controlling one or more of the displays 218 and/or display of the purchase interface 214 of the POS system 24 to display one or more notifications, messages or other information relating to the one or more such split tender payment rules. Following step 662, the process 650 advances to step 664.

At step 664, the processor 50 is operable to generate and include for display on the accessed customer's page of the EMS interface a graphic user interface (GUI) which includes one or more fields for entering at least one split tender payment source funding rule or one or more GUI elements for selecting at least one split tender payment source funding rule; i.e., one or more rules defining one or more conditions under which the split tender payment source, i.e., the EPS associated with the EPI/EPI code and EMSID combination selected by the customer in the process 500 illustrated in FIG. 5A, is to be re-funded by the customer. In some embodiments, the customer may wish to use a dedicated EPS for split tender use by the customer or another. In some such embodiments, the dedicated EPS may be, for example, a gift card or similar such EPS which, by its nature, carries a set monetary amount that may be re-funded or replaced by another such card. In any case, the customer may illustratively choose to re-fund any such split tender EPS source at the convenience of the customer, e.g., via conventional mechanisms and/or by using the process 500 illustrated in FIG. 5A to link another EPS source and EPI/EPI code combination to the EMSID supplied by the customer to the user, and/or to re-fund any such split tender EPS source using steps 664-668. In some embodiments, the customer may illustratively choose to be reminded to re-fund any split tender EPS sources established by the customer as part of that customer's purchase transactions, and an example process for implementing such split-tender re-funding is illustrated in FIG. 9 and will be described in detail hereinafter. In any case, examples of split tender payment source funding rules may include, but are not limited to, any one or combination of a specified monetary amount per specified time period, e.g., day, week, month, quarter, year, etc., a specified monetary amount per split tender category, sub-category and/or item (selected by the customer at step 658) in any specified time period, e.g., day, week, month, quarter, year, etc., a specified % (e.g., greater than, less than or equal to 100) of total spend in a previous specified time period, e.g., day, week, month, quarter, year, etc., a specified % (e.g., greater than, less than or equal to 100) of spend amount in any previous specified time period, e.g., day, week, month, quarter, year, etc., per split tender category, sub-category and/or item (selected by the customer at step 658), a specified total monetary amount or amount per split tender category, sub-category and/or item (selected by the customer at step 658) in any specified time period based on the user's purchase history in total or defined by any one or more of the split tender category(s), sub-category(s) and/or item(s) selected by the customer at step 658, a specified % (e.g., greater than, less than or equal to 100) of total spend amount or spend amount per split tender category, sub-category and/or item (selected by the customer at step 658) in any specified time period based on the user's purchase history in total or defined by any one or more of the split tender category(s), sub-category(s) and/or item(s) selected by the customer at step 658, and the like.

Following step 664, the process 650 advances to step 666 where the processor 50 captures the split tender payment source funding rule(s) selected and/or entered by the customer at step 664. In the illustrated embodiment, the processor 50 is operable to execute step 666 by assigning at least one split tender payment source funding rule variable STPSF(S) to the at least one customer-selected or entered split tender payment source funding rule(s), although it will be understood that the processor 50 may alternatively use any conventional technique at step 666 for capturing the split tender payment source funding rule(s) selected and/or entered by the customer at step 664. Thereafter at step 668, the processor 50 is operable to associate the captured split tender payment source funding rule(s) selected and/or entered by the customer, e.g., STPSF(S), with the corresponding EPI/EPI code pair and EMSID combination selected by the customer in the process 500 illustrated in FIG. 5A or with corresponding one(s) of the split tender payment category(s), split tender payment sub-category(s) and/or split tender item(s) selected or entered by the customer at step 652 and with the corresponding EPI/EPI code pair and EMSID combination selected by the customer in the process 500 illustrated in FIG. 5A. Following step 668, and also following the "NONE" branch of step 664 if the customer declines to select or enter one or more split tender payment source funding rule(s), the process 650 returns to step 568 of the process 550 illustrated in FIG. 5B.

The processes 500, 550 and 650 together provide for the establishment and funding by a customer of one or more split tender payment sources, and one or more rules governing use of each by the customer and/or by one or more others to whom the customer grants access (i.e., by supplying an EMSID and security code linked in the customer's account data 404 to the split tender payment source). In some embodiments, the user of such a split tender payment source at one of the POS systems $24_1$-$24_M$, $24_1$-$24_N$ may be required to provide payment for one or more items, one or more categories of items and/or one or more sub-categories of items ("user amount(s)") excluded by the customer from subsidization via the split tender payment source and/or for which subsidization limits would otherwise be exceeded, all in accordance with one or more preferences and/or rules established by the customer via the process 650. It will be understood that this disclosure contemplates any conventional mechanism via which payment of such user amount(s) may be made by the user including, for example, but not limited to, cash, check, any conventional electronic payment system (EPS) as this term is described and defined above, e.g., including one or more conventional credit cards, debit cards, pre-paid debit cards, gift cards, etc., government assistance program identifier, e.g., access code, EPS, etc., store credit identifier, e.g., store credit slip, item return slip, etc., and the like.

The process 650 illustrated in FIG. 6C and described herein as including a sequence of three different selectable split tender preferences, i.e., one or more split tender category(s)/sub-category(s)/item(s), one or more split tender payment rules and one or more split tender payment source funding rules. It will be understood, however, that alternative embodiments of the process 650 may include more, fewer, different or different combinations of such selectable preferences, and that any such alternative embodiments of the process 650 are contemplated by this disclosure.

Reward Preferences Process

Referring now to FIG. 6D, a simplified flow diagram is shown depicting an embodiment 680 of the reward preferences process executed at step 574 of the process 550 illustrated in FIG. 5B. In accordance with the process 680, the customer may select one or more reward preferences to be automatically implemented during subsequent processing of purchase transactions at any of the POS systems $24_1$-$24_M$, $24_1$-$24_N$ conducted in accordance with the EPI and EMSID combination selected in the process 500 illustrated in FIG. 5A.

As described above with respect to the purchase restriction preferences process and with respect to the split tender preferences process, a customer, e.g., a parent, guardian or other, ("the provider") may wish to allow another, e.g., a child, dependent or other, ("the user") to purchase items from the retail enterprise 11 by charging at least some of the items via one of the POS systems $24_1$-$24_M$, $24_1$-$24_N$ to an EPS established by the customer in the customer's EMS account data 404 (e.g., using the process 500 illustrated in FIG. 5A) without actually providing the user with physical or other access to the EPS. In such embodiments, the user may charge one or more items in a purchase transaction conducted via one of the POS systems $24_1$-$24_M$, $24_1$-$24_N$ to the EPS identified by a corresponding EPI associated in the provider's customer account data 404 with the EMSID and EPI code which matches a security code supplied by the provider to the user. Illustratively, the user will take action to provide the EMSID and security code to the one of the POS systems $24_1$-$24_M$, $24_1$-$24_N$ at which the purchase transaction is taking place, and the processor 50 then processes the transaction by searching the customer account data 404 for a matching EMSID and EPI code, and then charges one or more of the items being purchased by the user to the EPS identified by the EPI associated in the customer account data 404 with the matching EMSID and EPI code.

In such embodiments in which the customer is the provider and another is the user and/or in other embodiments in which the customer is both the provider and the user, the provider of the EPS may wish to provide one or more rewards for in the form of increased funds made available to the user. The use(s) of such increased funds may be unrestricted or defined by the customer, and in any case will be used for purchase transactions at any of the POS systems $24_1$-$24_M$, $24_1$-$24_N$ conducted in accordance with the associated EPI/EPI code pair and EMSID combination selected by the customer via the process 500 illustrated in FIG. 5A. Examples of such uses defined by the customer may include, but are not limited to, the purchase of one or more specified items, one or more specified or user-selectable items in one or more specified item categories, one or more specified or user-selectable items in one or more specified item sub-categories or the like. The process 680 illustrated in FIG. 6D illustrates one example embodiment of a process by which the provider may establish reward preferences.

In one embodiment, the process 680 is or includes the reward preferences module 460 stored in the memory 54 (and/or data storage 56) of the main server 12 in the form of instructions executable by the processor 50 of the main server 12. The process steps of the process 680 will thus be described below for purposes of this disclosure as being executed by the processor 50 of the main server 12. It will be understood, however, that in some alternate embodiments, the process 680 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 680 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 680 may be stored, in whole or in part, in a memory of the enterprise server(s) 26 in the form of instructions executable, in whole or in part, by a processor of the enterprise server(s) 26. In any such embodiments, the process 680 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection The process 680 begins at step 682 where the processor 50 is operable to generate and include for display on the accessed customer's page of the EMS interface a graphic user interface (GUI) which includes one or more fields for entering at least one single-instance reward or one or more GUI elements for selecting at least one single-instance reward; i.e., a one-time monetary award to be subsequently used in a purchase transaction at any of the POS systems $24_1$-$24_M$, $24_1$-$24_N$ in accordance with the associated EPI/EPI code pair and EMSID combination, which reward may or may not be restricted in its use. Examples of single-instance rewards with restrictions may include, but are not limited to, any one or combination of a monetary amount defined by the customer for the purchase of one or more specified items or user-selectable items, of one or more specified or user-selectable items in one or more specified item categories, of one or more specified or user-selectable items in one or more specified item sub-categories, of any such item before or after a specified date, or the like.

Following step 682, the process 680 advances to step 684 where the processor 50 captures the single-instance reward (s) selected and/or entered by the customer at step 682. In the illustrated embodiment, the processor 50 is operable to execute step 684 by assigning at least one single-instance reward variable SIR(S) to the at least one customer-selected or entered single-instance reward, although it will be understood that the processor 50 may alternatively use any conventional technique at step 684 for capturing the single-instance reward selected and/or entered by the customer at step 682. Thereafter at step 686, the processor 50 is operable to associate the captured single-instance reward selected and/or entered by the customer, e.g., SIR(S), with the corresponding EPI/EPI code pair and EMSID combination selected by the customer in the process 500 illustrated in FIG. 5A. During subsequent processing of a purchase transactions at any of the POS systems $24_1$-$24_M$, $24_1$-$24_N$ which is conducted in accordance with the associated EPI/EPI code pair and EMSID combination, the processor 50 will automatically implement the one or more single-instance rewards selected and/or entered by the customer at step 632. Examples of such implementation may be or include, but are not limited to, controlling the display 218 and/or a display of the purchase interface 214 to display a message or notification of the single-instance reward, the amount thereof and, in some embodiments, one or more restrictions on its use, if any, e.g., restricted to use in the purchase of one or more specified items, item(s) in one or more specified categories, item(s) in one or more specified sub-categories, usable before, after or on a particular date and/or time, or the like, and then processing one or more items presented by the user in a purchase transaction that qualify for purchase in accordance with the single-instance reward. Following step 686, and also following the "NONE" branch of step 682 if the customer declines to select or enter one or more single-instance rewards, the process 680 advances to step 688.

At step 688 the processor 50 is operable to generate and include for display on the accessed customer's page of the EMS interface a graphic user interface (GUI) which includes one or more fields for entering at least one purchase history-based reward or one or more GUI elements for selecting at least one purchase history-based reward; i.e., an unrestricted or restricted-use monetary award provided on a one-time basis or provided dynamically (i.e., repetitively over time), and in any case based on the purchase history of the user of the EPS relative to one or more product purchase goals, EPS usage goals or the like. Any such monetary reward, like the single-instance reward described above, may be subsequently used in a purchase transaction at any of the POS systems $24_1$-$24_M$, $24_1$-$24_N$ in accordance with the associated EPI/EPI code pair and EMSID combination. Examples of purchase history-based rewards may include, but are not limited, to rewards for the purchase of healthy foods or food groups, rewards for historical frugal spending in total and/or in one or more item categories and/or subcategories, rewards for negative behavior, e.g., not purchasing one or more specified items, one or more categories of items and/or one or more sub-categories of items, not spending or exceeding budgeted spend amounts, e.g., weekly, monthly or annual spend targets or limits, or the like.

Following step 688, the process 680 advances to step 690 where the processor 50 captures the purchase history-based reward(s) selected and/or entered by the customer at step 688. In the illustrated embodiment, the processor 50 is operable to execute step 690 by assigning at least purchase history-based reward variable PHR(S) to the at least one customer-selected or entered purchase history-based reward, although it will be understood that the processor 50 may alternatively use any conventional technique at step 690 for capturing the purchase history-based reward(s) selected and/or entered by the customer at step 688. Thereafter at step 692, the processor 50 is operable to associate the captured purchase history-based reward selected and/or entered by the customer, e.g., PHR(S), with the corresponding EPI/EPI code pair and EMSID combination selected by the customer in the process 500 illustrated in FIG. 5A. During subsequent processing of a purchase transactions at any of the POS systems $24_1$-$24_M$, $24_1$-$24_N$ which is conducted in accordance with the associated EPI/EPI code pair and EMSID combination, the processor 50 will automatically implement the one or more purchase history-based rewards selected and/or entered by the customer at step 632. Examples of such implementation may be or include, but are not limited to, controlling the display 218 and/or a display of the purchase interface 214 to display a message or notification of a purchase history-based reward if/when and as it may occur, the amount thereof and, in some embodiments, one or more restrictions on its use, if any, e.g., restricted to use in the purchase of one or more specified items, item(s) in one or more specified categories, item(s) in one or more specified sub-categories, usable before, after or on a particular date and/or time, or the like, and then processing one or more items presented by the user in a purchase transaction that qualify for purchase in accordance with the purchase history-based reward. Following step 692, and also following the "NONE" branch of step 688 if the customer declines to select or enter one or more single-instance rewards, the process 680 returns to step 574 of the process 550 illustrated in FIG. 5B.

The process 680 illustrated in FIG. 6D and described herein as including a sequence of two different customer-selectable rewards or reward preferences, i.e., one or more single-instance rewards and one or more purchase history-based rewards. It will be understood, however, that alternative embodiments of the process 680 may include more, fewer, different or different combinations of such selectable rewards or reward preferences, and that any such alternative embodiments of the process 680 are contemplated by this disclosure.

Purchase Transaction Process

Referring now to FIG. 7, a simplified flow diagram is shown depicting an embodiment of a purchase transaction process 700 in which, during a transaction for the purchase of one or more items at one of the point-of-sale systems $24_1$-$24_M$, $24_1$-$24_N$ of the retail enterprise 11, payment, or at least partial payment, for at least some of the one or more items in the purchase transaction may be selected to be a conventional payment mechanism or a stored electronic payment system, SEPS, i.e., an electronic payment system EPS previously selected or entered into the customer's enterprise membership service (EMS) account. In one embodiment, the process 700 is or includes the stored EPS payment module 444 stored in the memory 54 (and/or data storage 56) of the main server 12 in the form of instructions executable by the processor 50 of the main server 12, and the process steps of the process 700 will be described below for purposes of this disclosure as being executed by the processor 50 of the main server 12. It will be understood, however, that in some alternate embodiments, the process 700 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 700 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 700 may be stored, in whole or in part, in a memory of the enterprise server(s) 26 in the form of instructions executable, in whole or in part, by a processor of the enterprise server(s) 26. In any such embodiments, the process 700 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

In embodiments in which a customer presents one or more items for purchase at a point-of-sale system $24_1$-$24_M$, $24_1$-$24_N$ of the retail enterprise 11 and then subsequently tenders payment during or after the point-of-sale system $24_1$-$24_M$, $24_1$-$24_N$ processes the one or more items, such as may typically occur during a purchase of one or more items at a brick-and-mortar outlet having a number of different types of items in inventory, the process 700 illustratively begins at step 702 which may include steps 704 and 706. At step 704, the customer presents one or more items for purchase at a point-of-sale system $24_1$-$24_M$, $24_1$-$24_N$, and step 706 the point-of-sale system $24_1$-$24_M$, $24_1$-$24_N$ processes the one or more items in a conventional manner, e.g., by price scanning the one or more items, for purchase by the customer. In such embodiments, steps 704 and 706 may illustratively be concluded before advancing to the payment processing steps 708-714 of the process 700. In other embodiments, one or more of the payment processing steps 708-714 may be executed during the execution of step 704 and/or of step 706, and in such embodiments step 702 may therefore be inserted, in whole or in part, between one or more of the payment processing steps 708-714. In still other embodiments in which pre-payment or acceptance of a pre-payment instrument is required prior to delivery to the customer of one or more requested items, such as may occur, for example, when the requested item is fuel and the point-of-sale system $24_1$-$24_M$, $24_1$-$24_N$ is a conventional fuel dispenser and/or a local/hub server $22_1$-$22_L$ of an associated fuel center and/or convenience store at which one or more such fuel dispensers is located, step 704 may typically be executed prior to the payment processing steps 708-714 and step 706 may then be typically executed, i.e., by activating the fuel dispenser for dispensation of fuel, after the payment processing steps 708-714. In such embodiments, step 702 may thus be fragmented such that step 704 is executed prior to the payment process steps 708-714, i.e., when the customer requests one or more items for purchase at a point-of-sale system of the retail enterprise 11, and such that step 706 may be executed at any of various points within the payment processing steps 708-714 after pre-payment has been accepted or authorized by the main server 12, e.g., after the main server 12 has authorized a pre-payment instrument, such as a credit or debit card, to be subsequently processed for payment following delivery of the requested item(s). Other combinations are also possible, and it will therefore be understood that step 702, in its entirety, may in some embodiments occur at any point relative to one or more of the payment processing steps 708-714, and in other embodiments step 702 may be fragmented such that steps 704 and 706 may each independently occur at any point relative to one or more of the payment processing steps 708-714.

In any case, the payment processing steps of the process 700 begin at step 708 where the processor 50 is operable to control the display monitor, e.g., the display monitor 218, which may be part of or separate from, the payment interface 214 of the one of the point-of-sale systems $24_1$-$24_M$, $24_1$-$24_N$ processing the purchase transaction, to display a number of different transaction payment options including an option to select at least one of the one or more stored electronic payment systems, SEPS, previously entered into the customer's EMS account. The various transaction payment options displayed at step 708 may include, for example, one or more of cash, check, and the like, and the at least one EPS option may include one or more conventional EPS options such as a credit card, debit card, and the like along with the stored EPS option SEPS. Thereafter at step 710, the processor 50 is operable to determine whether the customer has selected, i.e., manually via a keypad or touch-screen feature of the display monitor 218 or of the payment interface 214, or via another keypad or touch-screen feature or other input mechanism of another input device included in the peripheral devices 212 of the point-of-sale system $24_1$-$24_M$, $24_1$-$24_N$, the stored EPS option SEPS or other conventional form of transaction payment. If, at step 710, the processor 50 determines that the customer has not selected the SEPS option, the process 700 advances to step 714 where the one of the point-of-sale systems $24_1$-$24_M$, $24_1$-$24_N$ processing the purchase transaction and processor 50 are together operable to process the transaction payment in a conventional manner. If, at step 710, the processor 50 instead determines that the customer has selected the SEPS option, the process 700 advances to step 712 where the processor 50 is operable to execute a stored electronic payment system, SEPS, process. The process 700 terminates following completion of either of steps 712 and 414.

EPI Code Generation and SEPS Payment Process—Embodiment 1

Figure 8A:
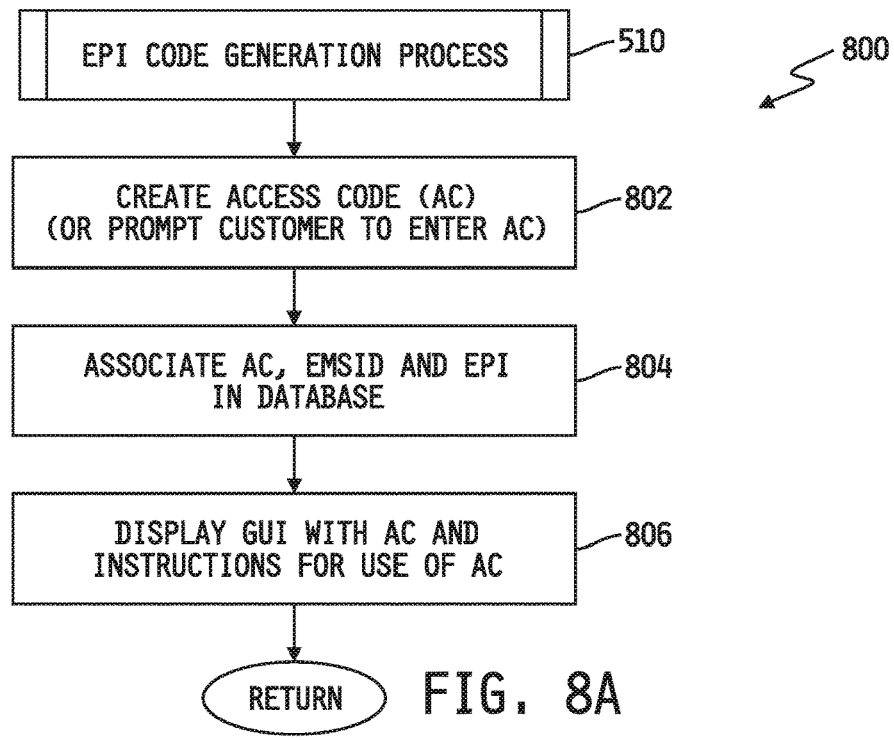
FIG. 8A is a simplified flow diagram of an embodiment of the EPI code generation process executed as part of the process illustrated in the flow diagram of FIG. 5A.
Figure 8B:
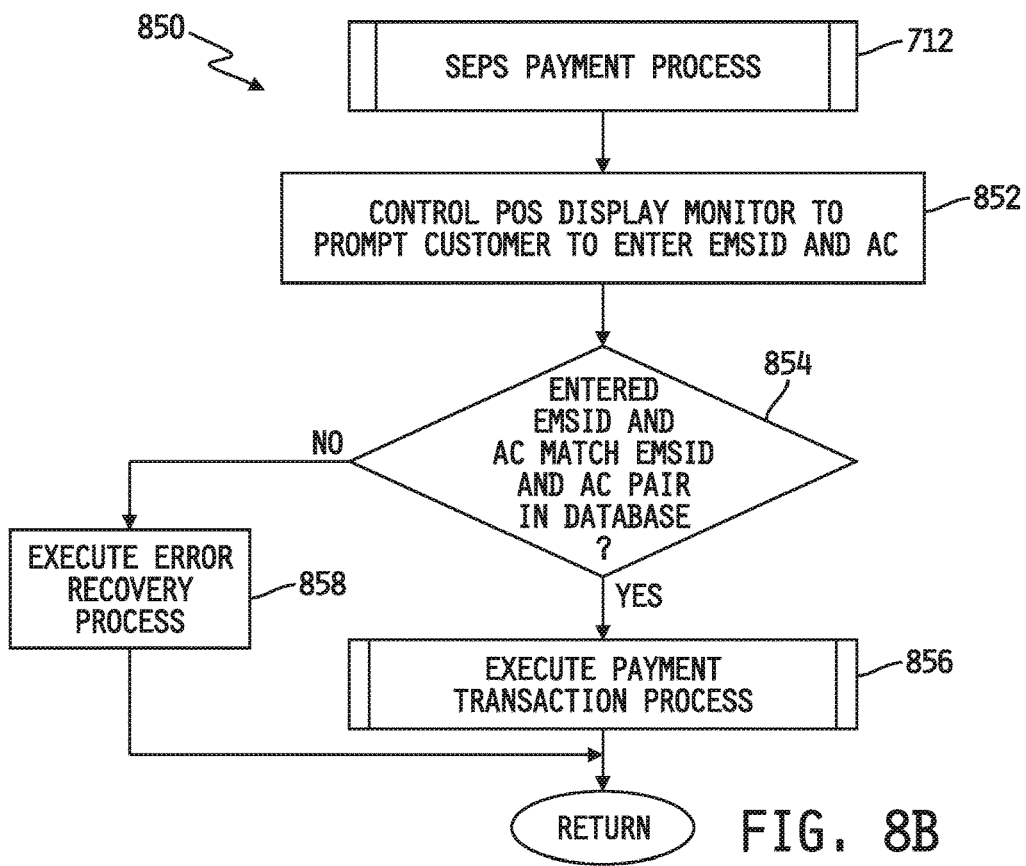
FIG. 8B is a simplified flow diagram of an embodiment of the SEPS payment process, associated with the EPI code generation process of FIG. 8A, executed as part of the process illustrated in the flow diagram of FIG. 7.

Referring now to FIGS. 8A and 8B, simplified flow diagrams are respectively shown of a process 800 for executing an embodiment of the EPI code generation process identified at step 510 of the process 500 illustrated in FIG. 5A, and of a corresponding process 850 for executing the SEPS payment process identified at step 712 of the process 700 illustrated in FIG. 7. In the embodiment illustrated in FIGS. 8A and 8B, the EPI code is illustratively generated in a form that is required to be manually entered during execution of the corresponding SEPS payment process of FIG. 8B by a customer, or other user of any of the one or more EMSIDs associated with the customer in the customer account data 404 ("other user"), into any of the point-of-sale systems $24_1$-$24_M$, $24_1$-$24_N$ that subsequently processes a transaction for the purchase by the customer (or other user) of one or more items from the retail enterprise 11.

In one embodiment, the process 800 is or includes the EPI code generation module 446 stored in the memory 54 (and/or data storage 56) of the main server 12 in the form of instructions executable by the processor 50 of the main server 12, and the process 850 is or includes the SEPS payment processor module 448 stored in memory 54 (and/or data storage 56) of the main server 12 in the form of instructions executable by the processor 50 of the main server 12, and the process steps of the processes 800 and 850 will therefore be described below for purposes of this disclosure as being executed by the processor 50 of the main server 12. It will be understood, however, that in some alternate embodiments, the process 800 and/or the process 850 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 800 and/or the process 850 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 800 and/or the process 850 may be stored, in whole or in part, in a memory of the enterprise server(s) 26 in the form of instructions executable, in whole or in part, by a processor of the enterprise server(s) 26. In any such embodiments, the process 800 and/or the process 850 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The EPI code generation process 800 illustrated in FIG. 8A begins at step 802 where the processor 50 is operable to create a security code in the form of part or all of an access code, AC, and/or to prompt the customer (i.e., the customer executing the EPS/EPI entry process 500 of FIG. 5A) to enter part or all of the access code, AC. Illustratively, the access code, AC, is a sequence of characters that will be required to be manually entered by the customer or other user into any of the point-of-sale systems $24_1$-$24_M$, $24_1$-$24_N$ during subsequent transactions for the purchase by the customer or other user of one or more items from the retail enterprise 11, for the purpose of identifying the electronic payment system, EPS, for use by the customer or other user during any such purchase transaction. The sequence of characters may be or include any combination of digits, letters of any alphabet, punctuation symbols and/or other character symbols.

In embodiments in which the processor 50 solely generates the access code, AC, at step 802 the processor 50 may be operable to generate the access code, AC, randomly, as a function of one or more variables generally, or as a function of one or more portions of the electronic payment information, EPI, of the corresponding EPS entered by the customer into the customer's EMS account data and/or as a function of any other information entered by the customer into the customer's EMS account data. As one example, which should not be considered limiting in any way, the processor 50 may be operable at step 802 to generate the access code, AC, as a subset of the account or identification number of the EPS and/or of the security code of the EPS (e.g., the typically three-digit Card Security Code (CSC), Card Security Value, CSV, Card Verification Number (CVN), Card Verification Code (CVC), etc., printed on the backs of Credit and Debit Cards) in embodiments in which the EPI includes such a security code. In embodiments in which the customer enters the access code in whole or in part, the access code, AC, may illustratively be any sequence of characters in the form of any number of digits, any number of letters of any alphabet and/or any number of punctuation or other symbols. In some embodiments in which the customer enters the access code, AC, the customer-entered access code, AC, acts as an initial access code which the processor 50 is operable to process using any conventional processing technique to produce a second access code, AC, which then replaces or is appended to the customer-entered access code, AC or vice versa. Those skilled in the art will recognize other techniques for generating an access code, AC, that may or may not be a function of one or more portions of the EPI and/or of one or more portions of any other information about the customer stored in the customer account data 404, and it will be understood that any such alternate techniques are contemplated by this disclosure.

Following step 802, the process 800 advances to step 804 where the processor 50 is operable to associate the created or generated access code, AC, with the EMSID selected by the customer, i.e., during execution of the process 500, as the EMSID to associate in the customer's account data 404 with the security code, e.g., access code, AC, generated by EPI code generation process, and also with the EPI associated with the EPS selected by the customer, i.e., during execution of the process 500, as the EPI/EPS to associate in the customer's account data 404 with the generated security code. In one embodiment, the processor 50 is operable to execute step 804 by storing the access code, AC, in a database and then linking the stored AC value to stored values of EMSID and EPI using one or more conventional data association techniques. Illustratively, the generated access code, AC, may be stored by the processor 50, in whole or in part, in the customer account data 404 of the database 402, and/or elsewhere in one or more other databases or memory units within or outside of the system 10. The processor 50 is illustratively operable to link the stored AC value to stored values of EMSID and EPI using one or more conventional linking or pointing mechanisms, examples of which include, but are not limited to, a table, a chart, a linked list or other pointer, or the like.

Following step 804, the process 800 advances to step 806 where the processor 50 is operable to generate and include for display on the accessed customer's page of the EMS interface, or as a new page for display on the accessed customer's page of the EMS interface, a graphic user interface (GUI) displaying the generated access code, AC. Illustratively, the GUI generated at step 806 may further include instructions for use of the access code, AC. Following completion of step 806, the process 800 returns to the process 500 illustrated in FIG. 5A.

Referring now to FIG. 8B, an embodiment of the SEPS payment process 850 identified at step 712 of the process 700 illustrated in FIG. 7 begins at step 852 where the processor 50 is operable to control the point-of-sale display monitor 218 and/or other display monitor associated with the payment interface 214, to prompt the customer or other user conducting the purchase transaction to manually enter into the point-of-sale system $24_1$-$24_M$, $24_1$-$24_N$, e.g., via a hardware input device of the point-of-sale system $24_1$-$24_M$, $24_1$-$24_N$ such as a keypad or touch-screen keypad of the display 218, payment interface 214 or other hardware input device, an EMSID and an access code, AC. Thereafter at step 854, the processor 50 is operable to determine whether the customer-entered EMSID and AC match a corresponding EMSID and AC pair stored in the customer account data 404. In some embodiments, the customer or other user may enter the EMSID at any time during, or as part of the process of commencing, the purchase transaction at the point-of-sale system $24_1$-$24_M$, $24_1$-$24_N$, and in such embodiments, the processor 50 may therefore illustratively be operable at step 852 to omit the prompt for the customer's EMSID if it has already been entered into the point-of-sale system $24_1$-$24_M$, $24_1$-$24_N$ as part of the current purchase transaction.

In cases where the customer who associated one or more EMSID, EPS/EPI and security code combinations in the customer's account data 404, e.g., via execution of the process 500 of FIG. 5A, is conducting the present purchase transaction, the EMSID and access code, AC, entered by the customer in response to the prompt at step 852 may be any EMSID/AC combination previously associated by the customer in the customer's account data 404 with a corresponding EPS/EPI. In cases where an "other user" is conducting the present purchase transaction, the EMSID and access code, AC, entered by the other user will generally be an EMSID/AC pair entrusted to the other user by or on behalf of a customer who has previously associated the ESMID/AC pair with a corresponding EPS/EPI in the customer's account data 404, e.g., via execution of the process 500 of FIG. 5A.

In one embodiment the processor 50 is operable to execute step 854 of the process 850 by searching for the EMSID supplied by the customer or other user in response to the prompt at step 852, e.g., by searching in the customer account data 404 in embodiments in which the EMSIDs are stored in the customer accounts data 404, or by searching in one or more other databases in which EMSIDs may be stored. In any case, if a matching EMSID is found at step 854, the processor 50 is then operable to compare the access code, AC, of each electronic payment system, EPS, previously entered into the EMS account identified by the matching EMSID with the access code, AC, supplied by the customer or other user in response to the prompt at step 852. If a matching access code, AC, is found, then the process 850 advances to step 856 where the processor 50 is operable to identify the electronic payment information, EPI, associated with the matching EMSID and AC, and to then execute a payment transaction process to process payment for the purchase transaction using the electronic payment information, EPI, associated with the matching EMSID and AC.

In some alternate embodiments, the processor 50 is operable to execute step 854 of the process 850 by searching for the access code, AC, supplied by the customer or other user in response to the prompt at step 852, e.g., in the EMS account data 404 in embodiments in which the access codes, AC, are stored in the EMS accounts data 404, or in one or more other databases in which access codes, AC, are stored. If a matching access code, AC, is found, the processor 50 is then operable to compare the entered EMSID with the EMSID associated with the matching access code. If an EMSID match is also found, the process 850 then advances to step 856 where the processor 50 is operable to identify the electronic payment information, EPI, associated with the matching EMSID and AC, and to then execute the payment transaction process to process payment for the purchase transaction using the electronic payment information, EPI, associated with the matching EMSID and AC. In any case, an example embodiment of the payment transaction process executed at step 856 is illustrated in FIG. 9 and will be described in detail hereinafter.

If, at step 854, the processor 50 determines that none of the one or more databases in which EMSIDs are stored has stored therein an EMSID that matches the EMSID entered by the customer or other user in response to the prompt at step 852, or if the processor 50 determines that none of the one or more databases in which access codes, AC, are stored has stored therein an access code, AC, that matches the access code, AC, entered by the customer or other user in response to the prompt at step 852, the process 850 advances to step 858 where the processor 50 executes an error recovery process. The error recovery process may include, for example, controlling the display 218 and/or a display of the payment interface 214 of the point-of-sale system $24_1$-$24_M$, $24_1$-$24_N$ at which the purchase transaction is taking place to display a message or notification that no EPS could be found that matches the customer or user entered EMSID and/or AC and, in some embodiments, requesting re-entry of one or both such variables or requesting payment for the current purchase transaction using another payment option, e.g., cash, check, another EPS stored in the customer's EMS account, a different, tangible EPS, or the like. In any case, the process 850 terminates and is returned to step 712 of the process 700 following completion of step 856 or step 858.

EPI Code Generation and SEPS Payment
Process—Embodiment 2

Figure 10A:
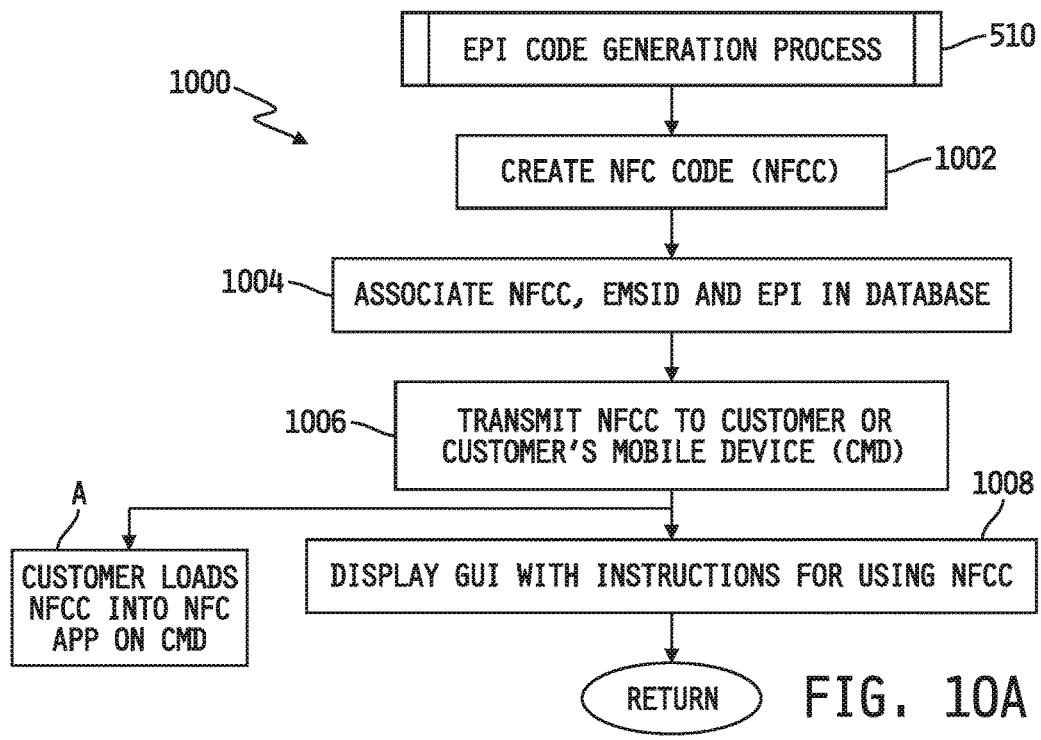
FIG. 10A is a simplified flow diagram of another embodiment of the EPI code generation process executed as part of the process illustrated in the flow diagram of FIG. 5A.
Figure 10B:
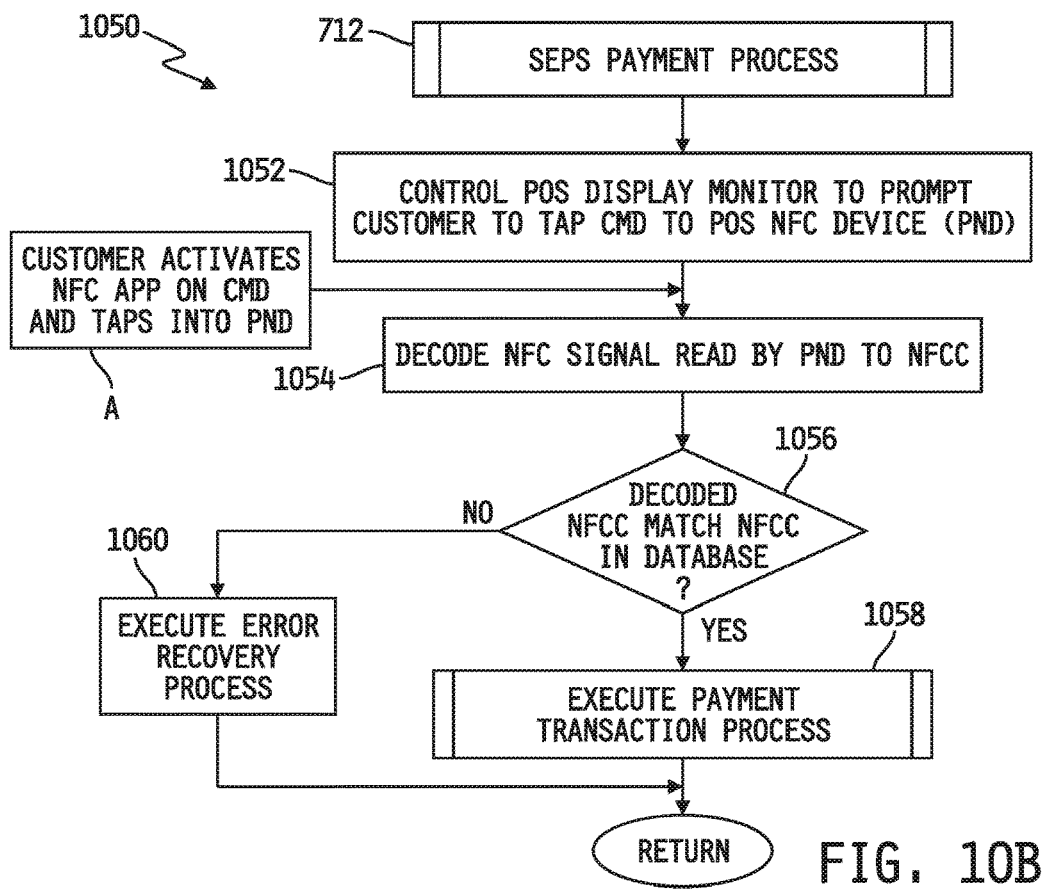
FIG. 10B is a simplified flow diagram of another embodiment of the SEPS payment process, associated with the EPI code generation process of FIG. 10A, executed as part of the process illustrated in the flow diagram of FIG. 7.

Referring now to FIGS. 10A and 10B, simplified flow diagrams are respectively shown of a process 1000 for executing another embodiment of the EPI code generation process identified at step 510 of the process 500 illustrated in FIG. 5A, and of a corresponding process 1050 for executing another embodiment of the SEPS payment process identified at step 712 of the process 700 illustrated in FIG. 7. As in the embodiment illustrated in FIGS. 8A and 8B, the EPI code or security code in the embodiment illustrated in FIG. 10A is illustratively generated in a form that is required to be manually supplied during execution of the corresponding SEPS payment process of FIG. 10B by a customer, or other user of any of the one or more EMSIDs associated with the customer in the customer account data 404 ("other user"), to any of the point-of-sale systems $24_1$-$24_M$, $24_1$-$24_N$ that subsequently processes a transaction for the purchase by the customer (or other user) of one or more items from the retail enterprise 11. In the embodiment illustrated in FIGS. 10A and 10B, the EPI code is illustratively generated in a form that will be stored in, or otherwise accessed by, a mobile communication device 16 carried by the customer or other user, and that will require a manually initiated transfer of such an EPI code via an NFC device 320 of the mobile communication device 16 to an NFC interface 222 of the point-of-sale system $24_1$-$24_M$, $24_1$-$24_N$ that subsequently processes a transaction for the purchase by the customer or other user of one or more items from the retail enterprise 11.

In one embodiment, the process 1000 is or includes the EPI code generation module 446 stored in the memory 54 (and/or data storage 56) of the main server 12 in the form of instructions executable by the processor 50 of the main server 12, and the process 1050 is or includes the SEPS payment processor module 448 stored in memory 54 (and/or data storage 56) of the main server 12 in the form of instructions executable by the processor 50 of the main server 12, and the process steps of the processes 1000 and 1050 will therefore be described below for purposes of this disclosure as being executed by the processor 50 of the main server 12. It will be understood, however, that in some alternate embodiments, the process 1000 and/or the process 1050 may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 1000 and/or the process 1050 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 1000 and/or the process 1050 may be stored, in whole or in part, in a memory of the enterprise server(s) 26 in the form of instructions executable, in whole or in part, by a processor of the enterprise server(s) 26. In any such embodiments, the process 1000 and/or the process 1050 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The embodiment illustrated in FIGS. 10A and 10B further illustratively requires the mobile communication device 16 to include the NFC/SC application 310 described hereinabove with respect to FIG. 3A. The NFC/SC application 310, in the context of the embodiment illustrated in FIGS. 10A and 10B, is or includes a conventional NFC application which, when executed by the processor 300 of the mobile communication device 16, causes the processor 300 to transmit the generated EPI code from the NFC device 320 of the mobile communication device 16 to the NFC interface 222 of the point-of-sale system $24_1$-$24_M$, $24_1$-$24_N$ that subsequently processes a transaction for the purchase by the customer or other user of one or more items from the retail enterprise 11.

In the embodiment illustrated in FIG. 10A, the EPI code generation process 1000 begins at step 1002 where the processor 50 is operable to create a security code in the form of an NFC code, NFCC. Illustratively, the NFC code, NFCC, is a unique sequence of bits that will be transmitted by the NFC device 320 of the mobile communication device 16 to the NFC interface 222 of any of the point-of-sale systems $24_1$-$24_M$, $24_1$-$24_N$ that subsequently processes a transaction for the purchase by the customer or other user of one or more items from the retail enterprise 11, for the purpose of identifying an electronic payment system, EPS, for use by the customer or other user during any such purchase transaction. The processor 50 may illustratively be operable at step 1002 to generate the NFC code, NFCC, randomly, as a function of one or more variables generally, or as a function of one or more portions of the electronic payment information, EPI, of the corresponding EPS entered by the customer into the customer's EMS account data and/or as a function of any other information entered by the customer into the customer's EMS account data. As one example, which should not be considered limiting in any way, the processor 50 may be operable at step 1002 to generate the NFC code, NFCC, as a function of an entirety or subset of the account or identification number of the EPS and/or of the security code of the EPS in embodiments in which the EPI includes such a security code. In other embodiments, the processor 50 may include in or append to the NFC code, NFCC, an EMSID code corresponding to the EMSID identified or supplied by the customer for execution of the EPI code generation process. Those skilled in the art will recognize other techniques for generating an NFC code, NFCC, that may or may not be a function of one or more portions of the EPI, and it will be understood that any such alternate techniques are contemplated by this disclosure.

Following step 1002, the process 1000 advances to step 1004 where the processor 50 is operable to associate the created or generated NFC code, NFCC, with the EMSID selected by the customer, i.e., during execution of the process 500, as the EMSID to associate in the customer's account data 404 with the security code, e.g., NFC code, NFCCC, generated by EPI code generation process, and also with the EPI associated with the EPS selected by the customer, i.e., during execution of the process 500, as the EPI/EPS to associate in the customer's account data 404 with the generated security code. In one embodiment, the processor 50 is operable to execute step 1004 by storing the NFC code, NFCC, in a database and then linking the stored NFC Code to stored values of EMSID and EPI using one or more conventional data association techniques. Illustratively, the generated NFC code, NFCC, may be stored by the processor 50, in whole or in part, in the customer account data 404 of the database 402, and/or elsewhere in one or more other databases or memory units within or outside of the system 10. The processor 50 is illustratively operable to link the stored NFC Code NFCC to stored values of EMSID and EPI using one or more conventional linking or pointing mechanisms, examples of which include, but are not limited to, a table, a chart, a linked list or other pointer, or the like.

Following step 1004, the process 1000 advances to step 1006 where the processor 50 is operable to transmit the generated NFC code, NFCC, to the customer, e.g., via email, or to the customer's mobile device 16 (CMD), e.g., via a short message service (sms) or other wireless communication technique or protocol. Alternatively, the processor 50 may make the NFC code, NFCC, available to the customer via the customer's EMS account. In any case, outside of the process 1000 controlled by the processor 50, the customer loads the NFC code, NFCC, into the NFC/SC application 310 on the CMD 16 as illustrated in FIG. 10A by the process step A.

In some embodiments in which the customer intends to allow an "other user" to use the associated EPS to purchase items from the retail enterprise 11, the process 1000 may include one or more conventional steps via which the customer may direct the processor 50 to transmit the generated NFC code, NFCC, to a mobile device 16 or other electronic communication device of the other user, e.g., via email, text or other wireless communication technique or protocol. In other embodiments in which the customer intends to allow an "other user" to use the associated EPS to purchase items from the retail enterprise 11, the customer may control the customer's mobile communication device 16 to transmit the NFC code NFCC to a mobile communication device 16 of the other user or to otherwise provide access to the NFCC code by the other user's mobile communication device 16 for storage thereon. The mobile communication device 16 of the other user will illustratively include the NFC/SC App 310 stored in the memory 304 thereof so that the other user may subsequently use such a mobile communication device to transfer the NFC code NFCC to any of the POS systems $24_1$-$24_M$, $24_1$-$24_N$.

In some embodiments, the NFC/SC application 310 illustratively includes conventional software which guides the customer or an "other user" in transferring the NFC code, NFCC, from the customer's or other user's email or short message service (sms) to the NFC/SC application 310. In other embodiments, the NFC/SC application 310 includes conventional software that automatically transfers the NFC code, NFCC, to the CMD 16 and/or to the other user's mobile communication device from the customer's EMS account or other location.

Following step 1006, the process 1000 advances in some embodiments to step 1008 where the processor 50 is operable to generate and include for display on the accessed customer's page of the EMS interface, or as a new page for display on the accessed customer's page of the EMS interface, a graphic user interface (GUI) information relating to the generated NFC code, NFCC, including, for example, instructions for use of the NFC code, NFCC. Following completion of step 1008, the process 1000 returns to the process 500 illustrated in FIG. 5A.

Referring now to FIG. 10B, another embodiment of the SEPS payment process 1050 identified at step 712 of the process 700 illustrated in FIG. 7 begins at step 1052 where the processor 50 is operable to control the point-of-sale display monitor 218, and/or other display monitor associated with the payment interface 214, to prompt the customer or other user to manually enter the NFC code into the point-of-sale system $24_1$-$24_M$, $24_1$-$24_N$, e.g., by manually tapping the customer CMD 16 or mobile communication device 16 of the other user to, or passing such a mobile communication device near, the POS NFC interface 222 (PND). Outside of the process 1050, the customer or other user activates the NFC/SC app 310 on the customer's CMD 16 or on the mobile communication device 16 of the other user if it is not already activated, and then taps the CMD 16 or mobile communication device 16 of the other user into or near the PND 222 as illustrated by the process step A in FIG. 10B to thereby transfer in a conventional manner an NFC signal produced by the CMD 16 or other user's mobile communication device 16 in a conventional manner to the NFC interface 222. The NFC signal produced by the NFC device 320 of the CMD 16 or other user's mobile communication device 16 is then read by the POS NFC interface 222 in a conventional manner and subsequently decoded in a conventional manner by the processor 50 at step 1054 of the process 1050. Thereafter at step 1056 the processor 50 is operable to determine whether the decoded NFC code, NFCC, matches an NFC code, NFCC, e.g., in the customer account database 404.

In some embodiments, the NFC code, NFCC, includes an EMSID and a security code, and in such embodiments the processor 50 is operable to execute steps 1054 and 1056 by processing the NFC code NFCC to determine the EMSID and security code carried thereby or embedded or encoded therein, and to then search the customer account database 404 for matching values thereof, e.g., using any of the techniques described above with respect to step 854 of the process 850 illustrated in FIG. 8B. If such matches are found, the processor 50 is further operable at step 1056 to identify the EPI associated therewith in the customer account data 404 for purposes of processing payment for the transaction.

In other embodiments in which the NFC code, NFCC, does not include an EMSID, the process 1050 may include an additional step which requires the customer or other user to manually enter an EMSID. In some such embodiments, the EMSID may be manually entered as described above with respect to the process 850 illustrated in FIG. 8B. In other embodiments, the customer's or other user's mobile communication device 16 may have stored therein, e.g., via an alternate embodiment of the process 1000 illustrated in FIG. 10A, a second NFC code carrying or containing an EMSID, and in such embodiments such an EMSID may be manually entered into the POS system $24_1$-$24_M$, $24_1$-$24_N$ as described above with respect to steps 1052 and outside step A of the process 1050. In either case, the processor 50 is operable at step 1056 to search the customer account database 404 for matching values the manually entered EMSID and security code, e.g., using any of the techniques described above with respect to step 854 of the process 850 illustrated in FIG. 8B and, if such matches are found, the processor 50 is further operable at step 1056 to identify the EPI associated therewith in the customer account data 404 for purposes of processing payment for the transaction.

In cases where the customer who associated one or more EMSID, EPS/EPI and security code combinations in the customer's account data 404, e.g., via execution of the process 500 of FIG. 5A, is conducting the present purchase transaction, the EMSID and/or security code, NFCC, entered by the customer in response to the prompt at step 1052 may be any NFCC or EMSID/NFCC combination previously associated by the customer in the customer's account data 404 with a corresponding EPS/EPI. In cases where an "other user" is conducting the present purchase transaction, the EMSID and/or security code, NFCC, entered by the other user in response to the prompt at step 1052 will generally be an NFCC or EMSID/NFC pair entrusted to the other user by or on behalf of a customer who has previously associated the NFCC or ESMID/NFCC pair with a corresponding EPS/EPI in the customer's account data 404, e.g., via execution of the process 500 of FIG. 5A.

In either case, if the processor 50 determines a match at step 1056, the process 1050 advances to step 1058 with a matching EPI where the processor 50 is operable to execute a payment transaction process, an example of which is illustrated in FIG. 9 and will be described in detail hereinafter. If, on the other hand, the processor 50 does not determine a match at step 1056, the processor 50 is operable at step 1060 to execute an error recovery process, examples of which were described above with respect to step 858 of the process 850 illustrated in FIG. 8B. Following either of steps 1058 and 1060, the process 1050 terminates and is returned to step 712 of the process 700.

EPI Code Generation and SEPS Payment Process—Embodiment 3

Figure 11A:
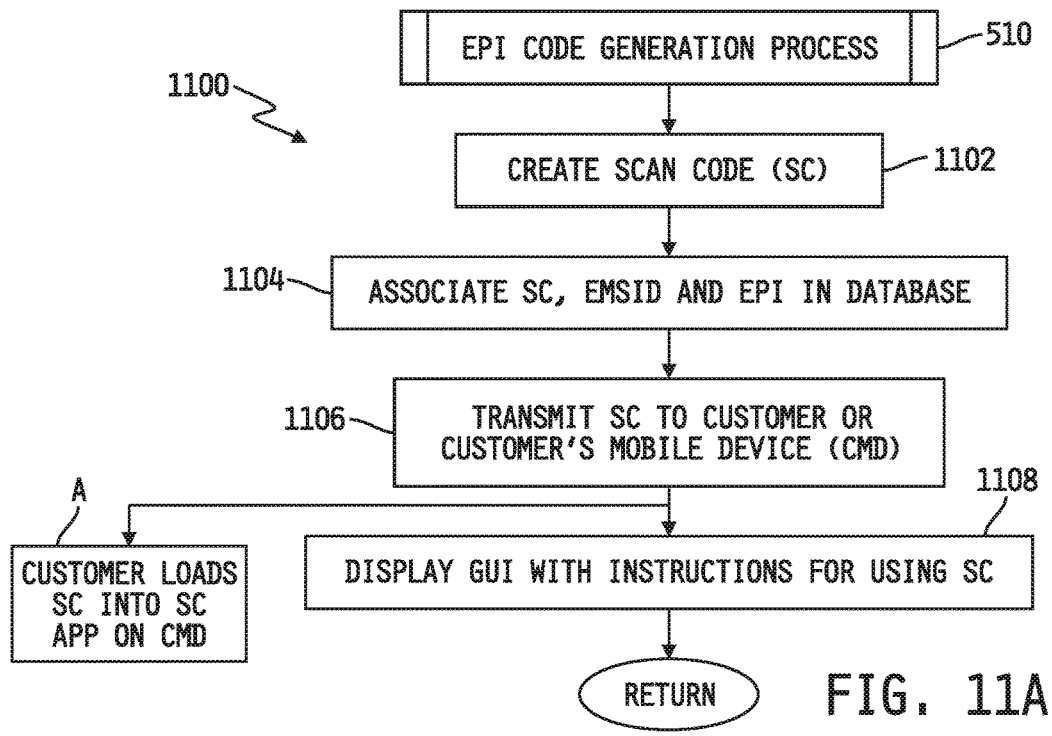
FIG. 11A is a simplified flow diagram of yet another embodiment of the EPI code generation process executed as part of the process illustrated in the flow diagram of FIG. 5A.
Figure 11B:
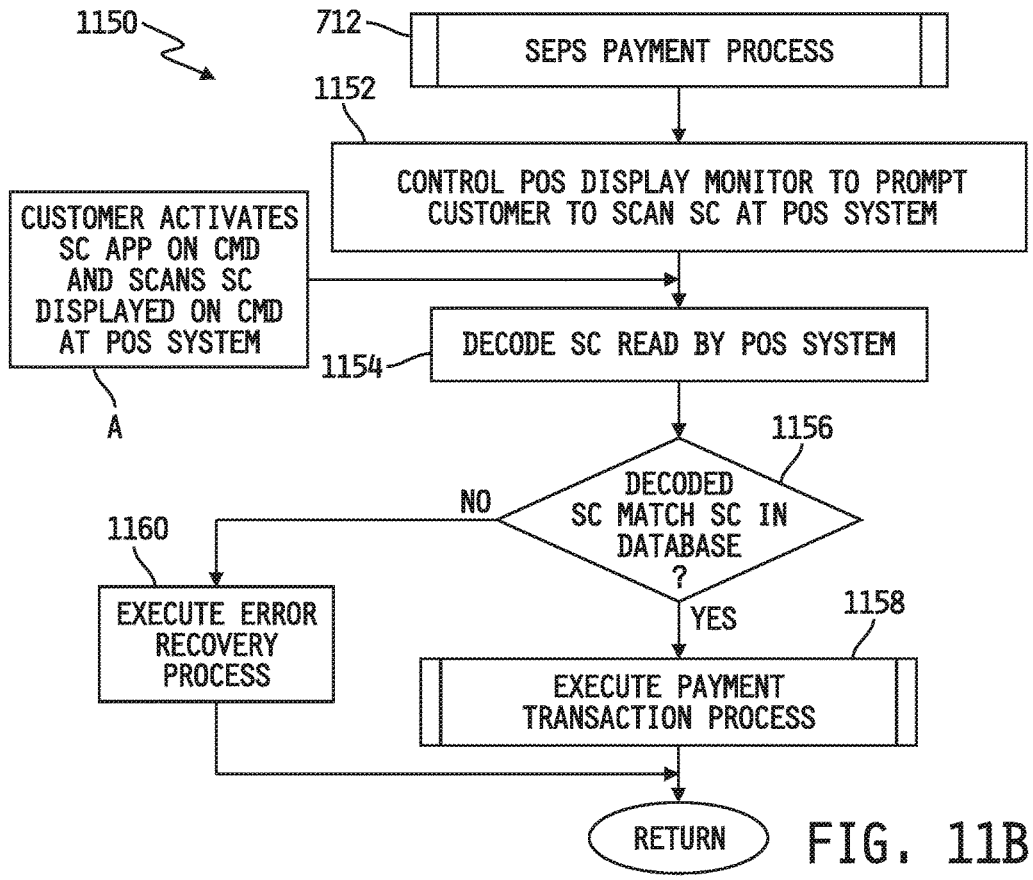
FIG. 11B is a simplified flow diagram of yet another embodiment of the SEPS payment process, associated with the EPI code generation process of FIG. 11A, executed as part of the process illustrated in the flow diagram of FIG. 7.

Referring now to FIGS. 11A and 11B, simplified flow diagrams are respectively shown of a process 1100 for executing yet another embodiment of the EPI code generation process identified at step 510 of the process 500 illustrated in FIG. 5A, and of a corresponding process 1150 for executing yet another embodiment of the SEPS payment process identified at step 712 of the process 700 illustrated in FIG. 7. As in the embodiment illustrated in FIGS. 8A and 8B and in FIGS. 10A and 10B, the EPI code in the embodiment illustrated in FIG. 11A is illustratively generated in a form that is required to be manually supplied during execution of the corresponding SEPS payment process of FIG. 11B by a customer, or other user of any of the one or more EMSIDs associated with the customer in the customer account data 404 ("other user"), to any of the point-of-sale systems 24₁-24_M, 24₁-24_N that subsequently processes a transaction for the purchase by the customer (or other user) of one or more items from the retail enterprise 11. In the embodiment illustrated in FIGS. 11A and 11B, the EPI code or security code is illustratively generated in a form of a scan code that will be stored in, or otherwise accessed by, a mobile communication device 16 carried by the customer or other user, and that will require a manually initiated transfer of such an EPI code via an item scanner 216 of any of the point-of-sale systems 24₁-24_M, 24₁-24_N that subsequently processes a transaction for the purchase by the customer or other user of one or more items from the retail enterprise 11.

In one embodiment, the process 1100 is or includes the EPI code generation module 446 stored in the memory 54 (and/or data storage 56) of the main server 12 in the form of instructions executable by the processor 50 of the main server 12, and the process 1150 is or includes the SEPS payment processor module 448 stored in memory 54 (and/or data storage 56) of the main server 12 in the form of instructions executable by the processor 50 of the main server 12, and the process steps of the processes 1100 and 1150 will therefore be described below for purposes of this disclosure as being executed by the processor 50 of the main server 12. It will be understood, however, that in some alternate embodiments, the process 1100 and/or the process 1150 may be alternatively stored, in whole or in part, in the memory 34 (and/or data storage 36) of the one or more of the local servers 22₁-22_L in the form of instructions executable, in whole or in part, by the processor 30 of one or more of the local servers 22₁-22_L, and in other embodiments the process 1100 and/or the process 1150 may be stored, in whole or in part, in the memory 202 (and/or data storage 206) of the one or more of the POS systems 24₁-24_M, 24₁-24_N in the form of instructions executable, in whole or in part, by the processor 200 of one or more of the one or more of the POS systems 24₁-24_M, 24₁-24_N, and in still other embodiments which include one or more enterprise servers 26 as illustrated in FIG. 1, the process 1100 and/or the process 1150 may be stored, in whole or in part, in a memory of the enterprise server(s) 26 in the form of instructions executable, in whole or in part, by a processor of the enterprise server(s) 26. In any such embodiments, the process 1100 and/or the process 1150 may be executed in whole or in part by one or more processors within any one or a combination of the main server 12, any of the one or more local servers 22₁-22_L, any of the one or more of the POS systems 24₁-24_M, 24₁-24_N and the enterprise server(s) 26, wherein information may be shared between the such systems via wired and/or wireless connection.

The embodiment illustrated in FIGS. 11A and 11B further illustratively requires the mobile communication device 16 (of a customer or other user) to include the NFC/SC application 310 described hereinabove with respect to FIG. 3A. The NFC/SC application 310, in the context of the embodiment illustrated in FIGS. 11A and 11B, is or includes a conventional display application which, when executed by the processor 300 of the mobile communication device 16, causes the processor 300 to display on the display device 322, e.g., a display screen, of the mobile communication device 16 a scan code, e.g., in the form of a bar code or other conventional scan code, which is stored within or accessible by the mobile communication device 16 and which can be scanned by the item scanner 216 of a point-of-sale system 24₁-24_M, 24₁-24_N.

In the embodiment illustrated in FIG. 11A, the EPI code generation process 1100 begins at step 1102 where the processor 50 is operable to create a security code in the form of a scan code, SC. Illustratively, the scan code, SC, is a unique bitmap or other type of machine-readable optical data in the form of a bar code such as a linear bar code, matrix code or other such unique code that may be scanned by the item scanner(s) 216 or image capturing device and then decoded by the processor 50, that will be displayed on the display device 322 of a mobile communication device 16. The processor 50 may illustratively be operable at step 1102 to generate the scan code, SC, randomly, as a function of one or more variables generally, or as a function of one or more portions of the electronic payment information, EPI, of the corresponding EPS entered by the customer into the customer's EMS account and/or as a function of any other information entered by the customer into the customer's EMS account data 404. As one example of the latter, which should not be considered limiting in any way, the processor 50 may be operable at step 1102 to generate the scan code, SCC, as function of the entirety or a subset of the account or identification number of the EPS and/or of the security code of the EPS in embodiments in which the EPI includes such a security code. In other embodiments, the processor 50 may include the EMSID in the scan code, SC, e.g., the processor 50 may encode the EMSID into the scan code. Those skilled in the art will recognize other techniques for generating a scan code, SCC, that may or may not be a function of one or more portions of the EPI, and it will be understood that any such alternate techniques are contemplated by this disclosure.

Following step 1102, the process 1100 advances to step 1104 where the processor 50 is operable to associate the generated scan code, SCC, the EMSID entered by the customer to access the process 500 (e.g., in embodiments in which the EMSID is not included in the scan code, SC), and the EPI associated with the EPS corresponding EPS entered by the customer in the process 500. In one embodiment, the processor 50 is operable to execute step 1104 by storing the scan code, SC, in a database and then linking the stored SC value to stored values of EMSID and EPI using one or more conventional data association techniques. Illustratively, the generated scan code, SC, may be stored by the processor 50, in whole or in part, in the customer account data 404 of the database 402, or elsewhere in one or more other databases or memory units within or outside of the system 10. The processor 50 is illustratively operable to link the stored SC value to stored values of EMSID and EPI using one or more conventional linking or pointing mechanisms, examples of which include, but are not limited to, a table, a chart, a linked list or other pointer, or the like. In embodiments in which the scan code, SC, includes the customer's EMSID, the processor 50 is illustratively operable at step 1104 to associate the scan code, SC, only with the stored value of EPI.

Following step 1104, the process 1100 advances to step 1106 where the processor 50 is operable to transmit the generated scan code, SC, to the customer, e.g., via email, or to the customer's mobile device 16 (CMD), e.g., via a short message service (sms) or other wireless communication technique or protocol. Alternatively, the processor 50 may make the scan code, SC, available to the customer via the customer's EMS account. In any case, outside of the process 1100 controlled by the processor 50, the customer loads the scan code, SC, into the NFC/SC application 310 on the CMD 16 as illustrated in FIG. 11A by the process step A.

In some embodiments in which the customer intends to allow an "other user" to use the associated EPS to purchase items from the retail enterprise 11, the process 1100 may include one or more conventional steps via which the customer may direct the processor 50 to transmit the generated scan code, SC, to a mobile device 16 or other electronic communication device of the other user, e.g., via email, text or other wireless communication technique or protocol. In other embodiments in which the customer intends to allow an "other user" to use the associated EPS to purchase items from the retail enterprise 11, the customer may control the customer's mobile communication device 16 to transmit the scan code SC to a mobile communication device 16 of the other user or to otherwise provide access to the SC code by the other user's mobile communication device 16 for storage thereon. The mobile communication device 16 of the other user will illustratively include the NFC/SC App 310 stored in the memory 304 thereof so that the other user may subsequently use such a mobile communication device to supply the scan code SC to any of the POS systems $24_1$-$24_M$, $24_1$-$24_N$.

In some embodiments, the NFC/SC application 310 illustratively includes conventional software which guides the customer or "other user" in transferring the scan code, SC, from the customer's or other user's email or short message service (sms) to the NFC/SC application 310. In other embodiments, the NFC/SC application 310 includes conventional software that automatically transfers the scan code, SC, to the CMD 16 and/or to the other user's mobile communication device from the customer's EMS account or other location.

Following step 1106, the process 1100 advances to step 1108 where the processor 50 is operable to generate and include for display on the accessed customer's page of the EMS interface, or as a new page for display on the accessed customer's page of the EMS interface, a graphic user interface (GUI) information relating to the generated scan code, SC, including, for example, instructions for use of the scan code, SC. Following completion of step 1108, the process 1100 returns to the process 500 illustrated in FIG. 5A.

Referring now to FIG. 11B, yet another embodiment of the SEPS payment process 1150 identified at step 712 of the process 700 illustrated in FIG. 7 begins at step 1152 where the processor 50 is operable to control the point-of-sale display monitor 218 and/or a monitor associated with the payment interface 214 to prompt the customer to manually enter the SC code into the point-of-sale system $24_1$-$24_M$, $24_1$-$24_N$ by manually scanning the scan code, SC, or having the scan code, SC, scanned by another such as an employee of the retail enterprise 11, using an item scanner 216 of the point-of-sale system $24_1$-$24_M$, $24_1$-$24_N$. Outside of the process 1150, the customer or other user then activates the NFC/SC app 310 on the customer's or other user's CMD 16 if it is not already activated, and the processor 300 of the CMD 16 is operable in a conventional manner to display the stored or otherwise accessed scan code, SC, on the display screen 322 of the CMD 16. The customer or other user then scans, or has scanned, in a conventional manner the scan code, SC, displayed on the display screen 322 of the CMD 16 by the point-of-sale system $24_1$-$24_M$, $24_1$-$24_N$, e.g., by the item scanner 216, as illustrated by the process step A in FIG. 11B. The scan code, SC, scanned and read by the item scanner 216 of the point-of-sale system $24_1$-$24_M$, $24_1$-$24_N$ is then decoded in a conventional manner by the processor 50 at step 1154 of the process 1150 to determine the scan code, SC. Thereafter at step 1156, the processor 50 is operable to determine whether the decoded scan code, SC, matches a scan code, SC, in the database, i.e., whether the decoded scan code, SC, matches a corresponding scan code, SC, associated with one of the customer members of the EMS program.

In some embodiments, the scan code, SC, includes an EMSID and a security code, and in such embodiments the processor 50 is operable to execute steps 1154 and 1156 by processing the scan code SC to determine the EMSID and security code carried thereby or embedded or encoded therein, and to then search the customer account database 404 for matching values thereof, e.g., using any of the techniques described above with respect to step 854 of the process 850 illustrated in FIG. 8B. If such matches are found, the processor 50 is further operable at step 1156 to identify the EPI associated therewith in the customer account data 404 for purposes of processing payment for the transaction.

In other embodiments in which the scan code, SC, does not include an EMSID, the process 1150 may include an additional step which requires the customer or other user to manually enter an EMSID. In some such embodiments, the EMSID may be manually entered as described above with respect to the process 850 illustrated in FIG. 8B. In other embodiments, the customer's or other user's mobile communication device 16 may have stored therein, e.g., via an alternate embodiment of the process 1100 illustrated in FIG. 11A, a second scan code, SC2, carrying or containing an EMSID, and in such embodiments such an EMSID may be manually entered into the POS system $24_1$-$24_M$, $24_1$-$24_N$ as described above with respect to steps 1152 and outside step A of the process 1150. In either case, the processor 50 is operable at step 1156 to search the customer account database 404 for matching values the manually entered EMSID and security code, e.g., using any of the techniques described above with respect to step 854 of the process 850 illustrated in FIG. 8B and, if such matches are found, the processor 50 is further operable at step 1156 to identify the EPI associated therewith in the customer account data 404 for purposes of processing payment for the transaction.

In cases where the customer who associated one or more EMSID, EPS/EPI and security code combinations in the customer's account data 404, e.g., via execution of the process 500 of FIG. 5A, is conducting the present purchase transaction, the EMSID and/or security code, SC, entered by the customer in response to the prompt at step 1152 may be any scan code, SC, or EMSID/SC combination previously associated by the customer in the customer's account data 404 with a corresponding EPS/EPI. In cases where an "other user" is conducting the present purchase transaction, the EMSID and/or scan code, SC, entered by the other user in response to the prompt at step 1152 will generally be an SC or EMSID/SC pair or combination entrusted to the other user by or on behalf of a customer who has previously associated the SC or ESMID/SC pair or combination with a corresponding EPS/EPI in the customer's account data 404, e.g., via execution of the process 500 of FIG. 5A.

In either case, if the processor 50 determines a match at step 1156, the process 1150 advances to step 1158 with a matching EPI where the processor 50 is operable to execute a payment transaction process, an example of which is illustrated in FIG. 9 and will be described in detail hereinafter. If, on the other hand, the processor 50 does not determine a match at step 1156, the processor 50 is operable at step 1160 to execute an error recovery process, examples of which were described above with respect to step 858 of the process 850 illustrated in FIG. 8B. Following either of steps 1158 and 1160, the process 1150 terminates and is returned to step 712 of the process 700.

EPI Code Generation Process—Embodiment 4

Figure 12:
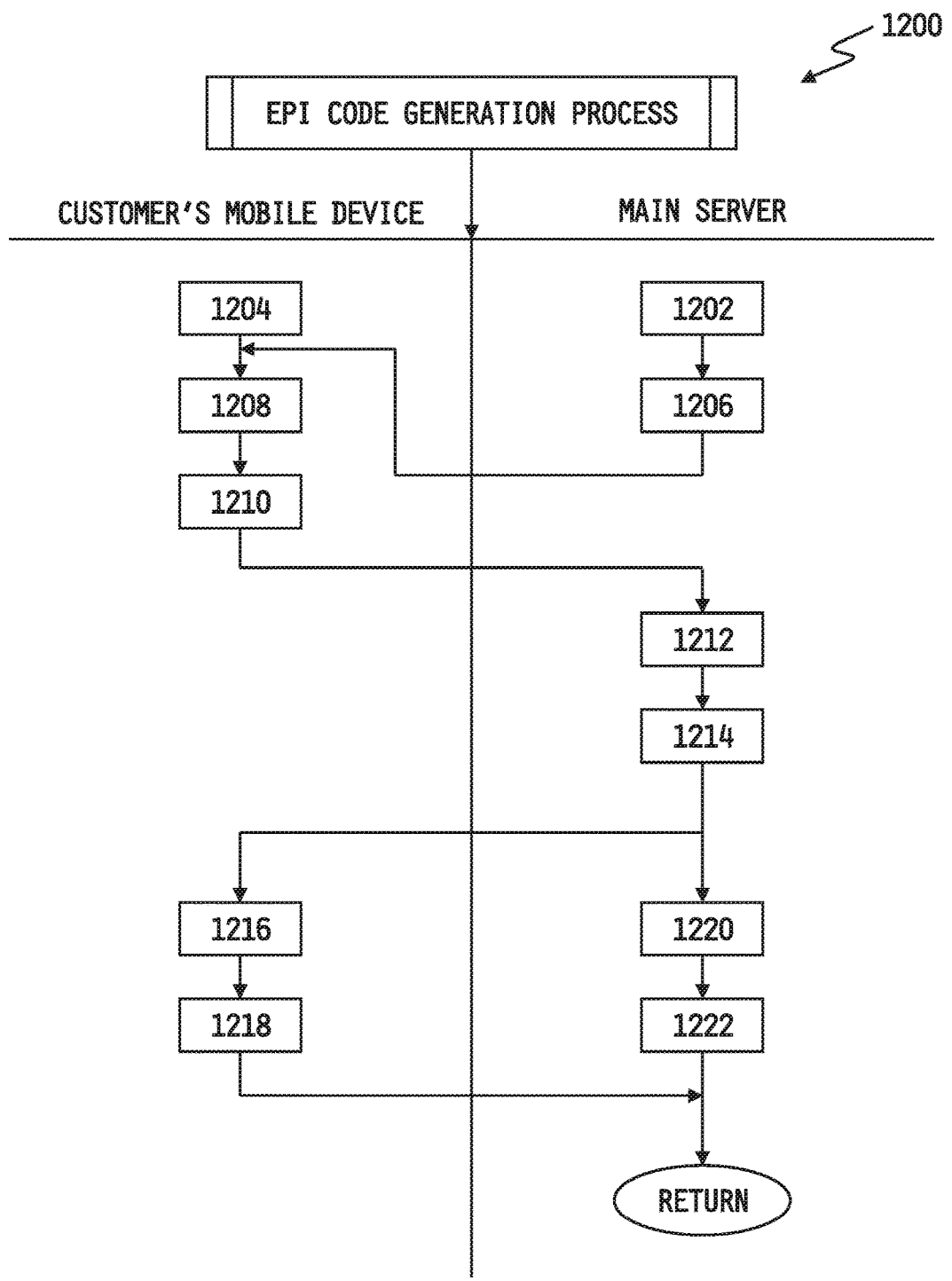
FIG. 12 is a simplified flow diagram of still another embodiment of the EPI code generation process, associated with any one or more of the EPI code generation processes of FIGS. 8A, 10A and 11A, executed as part of the process illustrated in the flow diagram of FIG. 5A.

Referring now to FIG. 12, a simplified flow diagram is shown of a process 1200 for executing a further embodiment of the EPI code generation process identified at step 510 of the process 500 illustrated in FIG. 5A. In some embodiments, the EPI code generation process 1200 illustrated in FIG. 12 may be used in addition to or in place of any of the EPI code generation processes 800, 1000 and 1100 illustrated in FIGS. 8A, 10A and 11A respectively and described above. As in the embodiments illustrated in FIGS. 8A, 10A and 11A, the EPI code in the embodiment illustrated in FIG. 12 is illustratively generated in a form that is required to be manually supplied during execution of one of the SEPS payment processes of FIG. 8B, 10B or 11B by a customer, or other user of any of the one or more EMSIDs associated with the customer in the customer account data 404 ("other user"), to any of the point-of-sale systems $24_1$-$24_M$, $24_1$-$24_N$ that subsequently processes a transaction for the purchase by the customer (or other user) of one or more items from the retail enterprise 11.

In the embodiment illustrated in FIG. 12, the EPI code generation process 1200 is an interactive process that takes place between the processor 50 of the server 12 and the processor 300 of a customer's mobile communication device 16. In this regard, the process 1200 is illustratively one that is stored, in one embodiment, in-part in the memory 54 (and/or data storage 56) of the main server 12 in the form of instructions executable by the processor 50 of the main server 12 and in-part in the memory 304 or data storage 306 of the mobile communication device(s) in the form of instructions executable by the processor 300 of the mobile communication device(s), and the process steps of the process 1200 will thus be described below for purposes of this disclosure as being executed in part by the processor 50 of the main server 12 and in part by the processor 300 of the mobile communication device(s). It will be understood, however, that in some alternate embodiments, the part of the process 1200 executed by the processor 50 of the main server may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments this part of the process 1200 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, this part of the process 1200 may be stored, in whole or in part, in a memory of the enterprise server(s) 26 in the form of instructions executable, in whole or in part, by a processor of the enterprise server(s) 26. In any such embodiments, the part of the process 1200 indicated in FIG. 12 as being executed by the main server 12 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 1200 illustrated in FIG. 12 begins at step 1202 where the processor 50 of the main server 12 is operable to generate and include for display on the accessed customer's page of the EMS interface, or as a new page for display on the accessed customer's page of the EMS interface, a graphic user interface (GUI) prompting the customer to activate the NFC/SC application 310 on the customer's mobile communication device 16. If the customer has not already activated the NFC/SC application 310 on the customer's mobile communication device 16, the customer does so at step 1204 in response to the prompt at step 1202.

Following step 1202, the processor 50 is operable at step 1206 to generate and display a random, pseudo-random or other code, RC, and to instruct the customer to enter RC into a corresponding screen or field displayed or accessible on the customer's mobile communication device 16 as part of the NFC/SC application 310. Thereafter at step 1208, the customer is responsive to the instructions at step 1206 to enter the code, RC, into the corresponding field or screen displayed on the customer's mobile communication device 16, and the processor 300 of the mobile communication device 16 is thereafter responsive at step 1210 to such customer entry of the code, RC, to transmit the code, RC, and one or more additional data to the main server 12, which transmission is thereafter received by the processor 50 at step 1212. The steps 1206-1210 are illustratively included in the process 1200 to establish communication between the processor 50 and the processor 300, and to further establish the identity of the mobile communication device 16 with which the processor 50 is communicating. In this regard, the data which may accompany the code, RC, may be or include any information which establishes the identity of the customer within the EMS program and/or the identity of the mobile communication device 16 as one that is associated with the customer within the EMS program. Examples of such data may include, but are not limited to, one or more of the customer's EMSID, the customer's email address, the contact number, e.g., cellular telephone number, of the mobile communication device 16 with which the processor 50 is communicating, and the like.

Following receipt of the code, RC, (and, in some embodiments, any additional data) from the mobile communication device 16 at step 1212, the processor 50 is operable at step 1214 to generate an EPI code and to transmit the generated EPI code to the mobile communication device 16. After receipt by the mobile communication device 16 at step 1216 of the generated EPI code transmitted by the processor 50, the processor 300 of the mobile communication device 16 is operable at step 1218 to process the EPI code received from the main server 12. In the meantime, the processor 50 of the main server 12 is operable following step 1214 to locate at step 1220 the customer's EMSID within the EMS account and to thereafter at step 1222 to associate the EPI code with the customer's EMSID and with the EPI as described hereinabove. Following steps 1218 and 1222, the process 1200 terminates and returns to step 510 of the process 500 illustrated in FIG. 5A.

In embodiments in which the EPI code generated by the processor 50 is an access code, AC, as described hereinabove with respect to the process 800 illustrated in FIG. 8A, the access code, AC, is or includes the code RC and the processor 300 of the mobile communication device 16 is illustratively operable at step 1218 to process the access code, AC, by controlling the display 322 to display the access code, AC, and/or by storing the access code, AC, in the memory 304 or data storage 306 for subsequent recall by the customer.

In embodiments in which the EPI code generated by the processor 50 is an NFC code, NFCC, as described hereinabove with respect to the process 1000 illustrated in FIG. 10A, the NFC code, NFCC, is or includes the code RC and the processor 300 of the mobile communication device 16 is illustratively operable at step 1218 to process the NFC code, NFCC, by storing the NFC code, NFCC, in the memory 304 or data storage 306 for subsequent recall and generation of an NFC signal therefrom in a conventional manner.

In embodiments in which the EPI code generated by the processor 50 is a scan code, SC, as described hereinabove with respect to the process 1100 illustrated in FIG. 11A, the scan code, SC, is or includes the code RC and the processor 300 of the mobile communication device 16 is illustratively operable at step 1218 in one embodiment to process the scan code, SC, by controlling the display 322 to display the scan code, SC, and/or by storing the scan code, SC, in the memory 304 or data storage 306 for subsequent recall. In some alternate embodiments in which the EPI code is a scan code, the processor 50 may be operable in one embodiment to generate the scan code, SC, not as a bar code image or map but rather as data from which such a bar code image may be reproducibly generated. In such embodiments, the processor 50 is illustratively operable at step 1214 to transmit to the mobile communication device 16 only the scan code data, and the NFC/SC application 310 illustratively includes conventional software executable by the processor 300 of the mobile communication device 16 to cause the processor 300 to generate a bar code image from the bar code data and to control the display 322 to display thereon a bar code image.

As used hereinabove in relation to customer entry of an EMSID and/or security code, and/or in relation to entry of an EMSID and/or security code by another user to which the customer has provided such an EMSID and/or security code, the phrases "manually entered," "manually supplied" and/or "manually provided" are to be understood to be synonymous and may therefore be used interchangeably. Such phrases should be understood to generally require the customer or other user to take some type of cognitively-controlled action, e.g., manual or physical movement or gesture, to provide the EMSID and/or security code to the one of the POS systems $24_1$-$24_M$, $24_1$-$24_N$ at which the customer (or other user) is presently engaged in a purchase transaction. Several examples of such manually entered, supplied and/or provided have been described above including, for example, manually selecting a code, e.g., an access code, or other sequence of characters via a keypad or touchscreen, manually tapping or swiping an NFC device carried by a mobile communication device 16 to or near an NFC interface and scanning an image of a code or codes displayed on a display screen of a mobile communication device 16 using a conventional POS scanner. Examples of other conventional mechanisms via which an individual, i.e., a customer or other user, may manually enter, supply and/or provide an EMSID and/or security code to the one of the POS systems $24_1$-$24_M$, $24_1$-$24_N$ at which the customer (or other user) is presently engaged in a purchase transaction and/or to one or more of the servers 12, $22_1$-$22_L$ and/or 26 operable to control one or more of such POS systems $24_1$-$24_M$, $24_1$-$24_N$, may include, but are not limited to, selecting one or more menu items displayed on the display 218 and/or a display of the payment interface 214, emailing or texting the EMSID and/or security code by the individual via a mobile communication device 16 to an email address or communication number/code of or associated with one of the POS systems $24_1$-$24_M$, $24_1$-$24_N$ and/or one or more of the servers 12, $22_1$-$22_L$ and/or 26, manually manipulating by the individual of a mobile communication device 16 to cause the mobile communication device 16 to transmit to (and for reception by) a POS system $24_1$-$24_M$, $24_1$-$24_N$ and/or one or more of the servers 12, $22_1$-$22_L$ and/or 26 a radio frequency or other wireless signal carrying the EMSID and/or security code, capturing an image of the EMSID and/or security code, e.g., displayed on the display of a mobile communication device 16 by a camera or other image capturing mechanism at the one of the POS systems $24_1$-$24_M$, $24_1$-$24_N$ at which the customer (or other user) is presently engaged in a purchase transaction, and the like. It will be understood that any such alternate mechanism, device, system or technique via which an individual, i.e., a customer or other user, may manually enter, supply and/or otherwise provide an EMSID and/or security code to the one of the POS systems $24_1$-$24_M$, $24_1$-$24_N$ at which the customer (or other user) is presently engaged in a purchase transaction and/or to one or more of the servers 12, $22_1$-$22_L$ and/or 26 operable to control one or more of such POS systems $24_1$-$24_M$, $24_1$-$24_N$, may be implemented in any of the processes described hereinabove, and those skilled in the art will recognize that any modifications to any such process required for such implementation would be a mechanical step for a skilled artisan.

Payment Transaction Process

Referring now to FIG. 9, a simplified flow diagram is shown of a process 900 for executing an embodiment of the payment transaction process executed by the processor 50 at step 856 of the SEPS payment process 850 illustrated in FIG. 8B, at step 1058 of the SEPS payment process 1050 illustrated in FIG. 10B and at step 1158 of the SEPS payment process 1158 illustrated in FIG. 11B. The payment transaction process 900 is illustratively executed during a purchase transaction taking place at one of the POS systems $24_1$-$24_M$, $24_1$-$24_N$ in which a stored EPS/EPI, i.e., stored in a customer's account data 404 or other storage location, has been identified by the processor 50 based on an EMSID and security code manually entered, supplied or otherwise provided directly to the POS system and/or to one or more of the various servers 12, $22_1$-$22_L$, 26, e.g., in accordance with and as part of one of the SEPS payment processes 850, 1050 and 1150.

The EMSID and security code, e.g., AC, NFCC, SC or RC, manually entered, supplied or otherwise provided during such a purchase transaction may, in some purchase transactions, have been entered, supplied or otherwise provided by the customer who established the EMSID, security code and EPS/EPI, i.e., the customer who executed a process, such as the process 500 illustrated in FIG. 5A, to associate in that customer's account data 404 and/or other storage location the EMSID, security code and EPS/EPI. In such purchase transactions, such a customer will, in the following description, be referred to as "the customer," and the identified EPS/EPI is accessed and used by the customer during the purchase transaction for payment of one or more items in the purchase transaction. In some embodiments, the processor 50 may be operable during such a purchase transaction to implement one or more display/receipt preferences established by the customer and associated in the customer account data 404 or other database with the EMSID, security code and EPS/EPI combination. In some embodiments, processor 50 may be operable during such a purchase transaction to process the EPS/EPI in an unrestricted manner. In some embodiments, the processor 50 may be operable during such a purchase transaction to process the EPS/EPI in a restricted manner in accordance with one or more restriction and/or split-tender preferences established by the customer and associated in the customer account data 404 or other database with the EMSID, security code and EPS/EPI combination. In still other embodiments, the processor 50 may be operable during such a purchase transaction to implement one or more reward preferences established by the customer and associated in the customer account data 404 or other database with the EMSID, security code and EPS/EPI combination. It will be understood that in the process 900 illustrated in FIG. 9, one or more such embodiments may be carried out alone or in combination with one or more other such embodiments.

In other purchase transactions, the manually entered, supplied or otherwise provided EMSID and security code, e.g., AC, NFCC, SC or RC, may have been entered, supplied or otherwise provided by another user to whom "the customer" has provided and entrusted the EMSID and security code in order for the user to access and use the associated EPS/EPI for payment of one or more items in the purchase transaction. In such purchase transactions, such a user will, in the following description, be referred to as "a user" or "the user." In some embodiments, the processor 50 may be operable during such a purchase transaction to implement one or more display/receipt preferences established by the customer and associated in the customer account data 404 or other database with the EMSID, security code and EPS/EPI combination. In some embodiments, processor 50 may be operable during such a purchase transaction to process the EPS/EPI in an unrestricted manner. In some embodiments, the processor 50 may be operable during such a purchase transaction to process the EPS/EPI in a restricted manner in accordance with one or more restriction and/or split-tender preferences established by the customer and associated in the customer account data 404 or other database with the EMSID, security code and EPS/EPI combination. In still other embodiments, the processor 50 may be operable during such a purchase transaction to implement one or more reward preferences established by the customer and associated in the customer account data 404 or other database with the EMSID, security code and EPS/EPI combination. It will be understood that in the process 900 illustrated in FIG. 9, one or more such embodiments may be carried out alone or in combination with one or more other such embodiments.

In one embodiment, the process 900 is or includes the payment transaction module 460 stored in the memory 54 (and/or data storage 56) of the main server 12 in the form of instructions executable by the processor 50 of the main server 12, and the process steps of the process 900 will therefore be described below for purposes of this disclosure as being executed by the processor 50 of the main server 12. It will be understood, however, that in some alternate embodiments, the process 900 executed by the processor 50 of the main server may be alternatively stored, in whole or in part, in the memory 34 (and/or data storage 36) of the one or more of the local servers $22_1$-$22_L$ in the form of instructions executable, in whole or in part, by the processor 30 of one or more of the local servers $22_1$-$22_L$, and in other embodiments the process 900 may be stored, in whole or in part, in the memory 202 (and/or data storage 206) of the one or more of the POS systems $24_1$-$24_M$, $24_1$-$24_N$ in the form of instructions executable, in whole or in part, by the processor 200 of one or more of the one or more of the POS systems $24_1$-$24_M$, $24_1$-$24_N$, and in still other embodiments which include one or more enterprise servers 26 as illustrated in FIG. 1, the process 900 may be stored, in whole or in part, in a memory of the enterprise server(s) 26 in the form of instructions executable, in whole or in part, by a processor of the enterprise server(s) 26. In any such embodiments, the process 900 may be executed in whole or in part by one or more processors within any one or a combination of the main server 12, any of the one or more local servers $22_1$-$22_L$, any of the one or more of the POS systems $24_1$-$24_M$, $24_1$-$24_N$ and the enterprise server(s) 26, wherein information may be shared between the such systems via wired and/or wireless connection.

The process 900 begins at step 902 where the processor 50 is operable to identify any display/receipt preferences associated in the customer account data 404 or other database with the EMSID, security code and EPS/EPI combination used in the SEPS payment process 850, 1050, 1150 to advance to the payment transaction process 900. Thereafter at step 904, the processor 50 is operable to implement the identified display/receipt preference(s), if any, e.g., by processing the purchase transaction in accordance with any such identified display/receipt preferences as described hereinabove with respect to the process 600 illustrated in FIG. 6A.

Following step 904, the process 900 advances to step 906 where the processor 50 is operable to identify any restriction preferences associated in the customer account data 404 or other database with the EMSID, security code and EPS/EPI combination used in the SEPS payment process 850, 1050, 1150 to advance to the payment transaction process 900. Thereafter at step 908, the processor 50 is operable to implement the identified restriction preference(s), if any, e.g., by processing the purchase transaction in accordance with any such identified purchase restriction preferences as described hereinabove with respect to the process 630 illustrated in FIG. 6B. Optionally, the process 900 may include a step 910, as illustrated in FIG. 9 by dashed-line representation, in which the processor 50 is operable to control the POS display 218 and/or a display of the POS payment interface 214 to display one or more messages, notifications and/or instructions relating to one or more of the implemented purchase restrictions, if any.

In embodiments in which the identified EPS/EPI may be a split-tender EPS/EPI, e.g., by designation as such by the customer in accordance with the process 650 illustrated in FIG. 6C, the process 900 may include a number of additional steps 912-928. In such embodiments which include step 910, the process 900 advances from step 910 to step 912, and in embodiments which do not include step 910, the process 900 advances from step 910 to step 912. In any case, the processor 50 is operable at step 912 to identify the split-tender use source associated in the customer account data 404 or other database with the EMSID, security code and EPS/EPI combination used in the SEPS payment process 850, 1050, 1150 to advance to the payment transaction process 900, i.e., to determine whether the identified EPS/EPI is a split-tender source to be used by the customer, whether the identified EPS/EPI is a split-tender source to be used by a user and, in some embodiments in which the customer is conducting the purchase transaction, whether the identified EPS/EPI is a split-tender source which requires re-funding and/or whether any additional split-tender EPS/EPIs associated with the customer require re-funding. In some embodiments the EMSID and/or security code used to access the identified EPS/EPI, and/or the EPS/EPI itself, may include information identifying such EMSID and/or security code as assigned to the customer or a user, and in such embodiments the processor 50 is operable at step 912 to determine whether the customer associated with the EMSID and/or security code or a user is conducting the present purchase transaction by processing such information and making such a determination based thereon. In other embodiments, step 912 may include one or more conventional security steps in which the customer supplies to the POS and/or server one or more additional security codes or other information to identify the customer as the individual conducting the present purchase transaction.

In any case, if at step 912 the processor 50 determines that a user is conducting the present purchase transaction and that the identified EPS/EPI is a split-tender EPS/EPI, i.e., the identified EPS/EPI is a split-tender payment source (STPS), designated for use by the user, e.g., by access to the EPS/EPI gained by the user via the EMSID and security code entered, supplied or otherwise provided to the POS and/or server(s) by the user, the process 900 advances to step 914 where the processor 50 is operable to process payment for the purchase transaction using the identified EPS/EPI in accordance with the one or more split-tender payment rules established by the customer and associated with the identified EMSID, security code and/or EPS/EPI in the customer account data 404 or other database, and to also process the remaining payment amount, if any, using any conventional form of legal tender presented to the POS system by the user. In some embodiments, the process 900 may include another step 916, as shown by dashed-line representation in FIG. 9, to which the process 900 advances from step 914. In embodiments which include step 916, the processor 50 is operable at step 916 to control the POS display 218 and/or a display associated with the POS payment interface 914 to display a split-tender payment source (STPS) balance, i.e., one or more amounts remaining, e.g., in total, for one or more split tender categories or split-tender sub-categories and/or for one or more split-tender items, overall, and/or for a specified time period, as may have been established by the customer during execution of the process 650 illustrated in FIG. 6C. In embodiments in which the customer has established one or more reward preferences, e.g., in accordance with the process 680 illustrated in FIG. 6D, the processor 50 may be operable at step 916 to control the display POS 218 and/or a display associated with the POS payment interface 914 to display the grant(s) of any such one or more rewards and/or to display progress toward achievement of one or more such rewards. It will be understood that in embodiments which do not include split-tender EPS/EPI(s) and in embodiments which may include split-tender EPS/EPI(s) but in which the identified EPS/EPI is not a split-tender EPS/EPI, the process 900 may omit step 914 but may include step 916 to display information to the user, an example of which may be or include any such reward information. In any such embodiment in which the customer has established one or more reward preferences, e.g., in accordance with the process 680 illustrated in FIG. 6D, the processor 50 may be operable after or as part of the step 914 and/or step 916 to manage and update any rewards earned or otherwise due to the user based on one or more rewards established by the customer in accordance with the process illustrated in FIG. 6D.

If, at step 912 the processor 50 determines that the customer is conducting the present purchase transaction and that the identified EPS/EPI is a split-tender EPS/EPI, i.e., the identified EPS/EPI is a split-tender payment source (STPS), the process 900 advances to step 918 where the processor 50 is operable to determine whether the STPS balance is low, e.g., whether the monetary amount chargeable to the STPS is below a predefined balance amount, whether the monetary amount chargeable to the STPS is insufficient to satisfy the amount due in accordance with the split-tender payment rule(s) established by the process 650 illustrated in FIG. 6C, or the like. If so, the process 900 advances to step 920 where the processor 50 is operable to control the POS display 218 and/or a display associated with the POS payment interface 214 to prompt the customer to re-fund the STPS (i.e., the EPS/EPI identified as a split-tender payment source), if desired and in any amount desired. Thereafter at step 922, the processor 50 is operable to add the customer-entered amount to the transaction total, i.e., to the total amount due in the present purchase transaction, and to also add the customer-entered amount to the STPS balance. The process 900 advances from step 922, and also from the "NO" branch of step 918, to step 924 where the processor 50 is operable to determine whether the customer has any more split-tender payment sources, i.e., EPS/EPIs established and designated in the customer's account data 404 or other database via the process 500 illustrated in FIG. 5A, which has a, or which have, low balance(s). If so, the process 900 advances to step 926 where the processor 50 is operable to identify one of, or the, low balance split-tender payment source(s), LBSTPS, and to loop back through steps 920 and 922 to allow the customer to re-fund any such one or more split-tender payment sources and to add any such re-funding amounts to the transaction total. Following the "NO" branch of step 926, when the processor 50 determines that the customer has no, or no more, additional low balance split-tender payment source(s) that the customer wishes to re-fund, the process 900 advances to step 928 where the processor 50 is operable to process the transaction payment, i.e., payment for the present purchase transaction being conducted at one of the POS systems $24_1$-$24_M$, $24_1$-$24_N$, using the identified EPS/EPI, i.e., the EPI associated in the customer's account data 404 with the customer-entered EMSID and security code AC, NFCC or SC. In embodiments in which the customer has established one or more reward preferences, e.g., in accordance with the process 680 illustrated in FIG. 6D, the processor 50 may be operable after or as part of any of steps 918-928 to manage and update any rewards earned or otherwise due to the user based on one or more rewards established by the customer in accordance with the process illustrated in FIG. 6D, and to add the amount(s) of any such rewards to the customer's purchase total at step 922.

In any case, as part of or after step 914 and/or step 928, the processor 50 is illustratively operable to update the customer's purchase history, i.e., the purchase history associated with the EMSID used to gain access to the process 900, with the items in the present purchase transaction. Following step 928 and also following step 916, the process 900 terminates and returns to step 856 of the process 850, step 1058 of the process 1050 or step 1158 of the process 1150.

The process 900 is illustrated in FIG. 9 and described herein as processing purchase transactions in accordance with four different customer-established preferences, i.e., a display/receipt preferences process, a purchase restriction preferences process, a split tender preferences process and a reward preferences process. It will be understood, however, that alternative embodiments may not include one or more, or any, of such customer-established preferences processes and in such embodiments the process 900 may thus include more, fewer, different or different combinations of such customer-established preferences, and that any such alternative embodiments of the process 900 are contemplated by this disclosure.

It should now be apparent from the foregoing that the system and methods described in this disclosure provide for the storage of any number of electronic payment systems, EPSs, in a customer's EMS account, as well as a number of different mechanisms by which a customer or other user allowed to do so by the customer may access, via manual input to a point-of-sale system $24_1$-$24_M$, $24_1$-$24_N$, a stored EPS during a transaction at the point-of-sale system $24_1$-$24_M$, $24_1$-$24_N$ and use the accessed EPS as payment for the purchase of at least some of a number of items by the customer or other user from the retail enterprise 11. By providing for access and use by customers, and other users allowed by customers to do so, of stored EPSs to pay for purchases at the various point-of-sale systems $24_1$-$24_M$, $24_1$-$24_N$, customers are relieved of the burden of manually supplying tangible EPSs to the point-of-sale systems $24_1$-$24_M$, $24_1$-$24_N$, for the purchase of items from the retail enterprise 11. Customers of the retail enterprise 11 and other users of the retail enterprise 11 authorized by customer are thus likewise relieved of the burden of ensuring that they possess one or more tangible EPSs when embarking upon shopping expeditions at the retail enterprise 11.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. Moreover, it will be understood that while several process steps in various sequences have been illustrated and described herein with respect to the processes 500, 550, 600, 630, 650, 680, 700, 800, 850, 900, 1000, 1050, 1100, 1150 and 1200, any one or more such processes 500, 550, 600, 630, 650, 680, 700, 800, 850, 900, 1000, 1050, 1100, 1150 and 1200 may alternatively include more, fewer and/or different steps, and that any such steps may be executed in different sequences from those illustrated and described, without departing from the scope of the concepts and techniques described herein.

What is claimed is:

1. A method of effecting payment for point-of-sale purchases at a retail enterprise, the method comprising:
   in a database having stored therein a plurality of customer identification codes each uniquely identifying a different customer of a retail enterprise, a plurality of unique codes and a plurality of electronic payment system identifiers, associating, in the database with a processor, each of the plurality of customer identification codes with a respective one of the plurality of unique codes and with a respective one of the plurality of electronic payment system identifiers that identifies a corresponding electronic payment system to be used to process payments for purchases made at a point-of-sale system of the retail enterprise,
   receiving, by the processor, a first code and a second code each manually provided to at least one input device of a point-of-sale system of the retail enterprise, via user interaction with the at least one input device, as part of a transaction for the purchase at the point-of-sale system of one or more items, and
   in response to receipt of the first and second codes,
   (i) accessing, by the processor, a matching one of the plurality of customer identification codes in the database that matches the received first code,
   (ii) determining, by the processor, the one of the plurality of unique codes and the one of the plurality of electronic payment system identifiers associated in the database with the matching one of the plurality of customer identification codes, and
   (iii) processing payment for the one or more items using the electronic payment system identified by the electronic payment system identifier associated in the database with the matching one of the plurality of customer identification codes if the received second code matches the one of the plurality of unique codes associated in the database with the matching one of the plurality of customer identification codes.

2. The method of claim 1, wherein the at least one input device comprises at least one of a keypad and a display having a touch-screen keypad displayed thereon,
   and wherein user interaction with the at least one input device comprises manually entering the first and the second code via the keypad or the touch-screen keypad to supply the first and second codes to the processor.

3. The method of claim 1, wherein the at least one input device comprises an item scanner,
   and wherein the second code is displayed on a display of a mobile electronic device in the form of a scannable code,
   and wherein user interaction with the at least one input device includes manually scanning the scannable code using the item scanner to supply the second code to the processor.

4. The method of claim 3, wherein the first code is included in the scannable code displayed on the display of the mobile electronic device,
   and wherein user interaction with the at least one input device comprises manually scanning the scannable code using the item scanner to supply the first code to the processor.

5. The method of claim 3, wherein the at least one input device comprises at least one of a keypad and a display having a touch-screen keypad displayed thereon,
   and wherein user interaction with the at least one input device further comprises manually entering the first code via the keypad or the touch-screen keypad to supply the first code to the processor.

6. The method of claim 1, wherein the database further has stored therein a plurality of customer preferences each defining one or more customer-selected preferences to be automatically implemented by the processor during processing of purchase transactions at the point-of-sale system according to the first and second codes, wherein the one or more customer-selected preferences include at least one of (a) a manner in which a purchase transaction receipt is to be supplied to the customer, (b) one or more purchase transaction-related items to be displayed or not displayed on a display device of the point-of-sale system during the purchase transactions, (c) one or more messages to be displayed to a cashier operating the point-of-sale system during the purchase transactions, (d) one or more purchase restrictions defining at least one of a purchase transaction spending limit and any of product categories, product sub-categories and products prohibited for purchase, (e) one or more split-tender rules for allocating payment for the one or more items between the electronic payment system identified by the electronic payment system identifier associated in the database with the matching one of the plurality of customer identification codes and an electronic payment system associated with a third party and (f) a reward preference defining a type of reward to be received, and wherein the method further comprises:
with the processor, associating in the database each of the plurality of customer identification codes with a respective one of the plurality of customer preferences, and
if the received second code matches the one of the plurality of unique codes associated in the database with the matching one of the plurality of customer identification codes:
with the processor, determining the one or more customer-selected preferences defined by the one of the plurality of customer preferences associated in the database with the matching one of the plurality of customer identification codes, and
with the processor, automatically implementing the determined one or more customer-selected preferences.

7. The method of claim 6, wherein the reward preference defines one of a single-instance reward and a customer purchase history-based reward.

8. A system for effecting payment for point-of-sale purchases at a retail enterprise, the system comprising:
at least one database having stored therein (a) a plurality of customer identification codes each uniquely identifying a different customer a retail enterprise, (b) a plurality of electronic payment system identifiers, and (c) a plurality of unique codes, wherein each of the plurality of customer identification codes is associated in the database with a respective one of the plurality of unique codes and with a respective one of the plurality of electronic payment system identifiers that identifies a corresponding electronic payment system to be used to process payments for purchases made at a point-of-sale system of the retail enterprise,
a processor,
a plurality of point-of-sale systems of the retail enterprise each controlled, at least in part, by the processor and each having at least one input device, and
memory having instructions stored therein which, when executed by the processor, cause the processor to receive a first code and a second code each manually provided to the at least one input device of one of the plurality of point-of-sale systems, via user interaction with the at least one input device, as part of a transaction for the purchase at the one of the plurality of point-of-sale systems of one or more items, and in response to receipt of the first and second codes, (i) access a matching one of the plurality of customer identification codes in the database that matches the received first code, (ii) determine the one of the plurality of unique codes and the plurality of electronic payment system identifiers associated in the database with the matching one of the plurality of customer identification codes, and (iii) process payment for the one or more items using the electronic payment system identified by the electronic payment system identifier associated in the database with the matching one of the plurality of customer identification codes if the received second code matches the one of the plurality of unique codes associated in the database with the matching one of the plurality of customer identification codes.

9. The system of claim 8, wherein the at least one input device of each of the plurality of point-of-sale systems comprises at least one of a keypad and a display having a touch-screen keypad displayed thereon,
and wherein user interaction with the at least one input device comprises manually entering the first and the second code via the keypad or the touch-screen keypad to supply the first and second codes to the processor.

10. The system of claim 8, wherein the at least one input device of each of the plurality of point-of-sale systems comprises an item scanner,
and wherein the second code is displayed on a display of a mobile electronic device in the form of a scannable code,
and wherein user interaction with the at least one input device includes manually scanning the scannable code using the item scanner to supply the second code to the processor.

11. The system of claim 10, wherein the first code is included in the scannable code displayed on the display of the mobile electronic device,
and wherein user interaction with the at least one input device comprises manually scanning the scannable code using the item scanner to supply the first code to the processor.

12. The system of claim 10, wherein the at least one input device of each of the plurality of point-of-sale systems comprises at least one of a keypad and a display having a touch-screen keypad displayed thereon,
and wherein user interaction with the at least one input device further comprises manually entering the first code via the keypad or the touch-screen keypad to supply the first code to the processor.

13. The system of claim 8, wherein the database further has stored therein a plurality of customer preferences each defining one or more customer-selected preferences to be automatically implemented by the processor during processing of purchase transactions at the point-of-sale system according to the first and second codes, wherein the one or more customer-selected preferences include at least one of (a) a manner in which a purchase transaction receipt is to be supplied to the customer, (b) one or more purchase transaction-related items to be displayed or not displayed on a display device of the point-of-sale system during the purchase transactions, (c) one or more messages to be displayed to a cashier operating the point-of-sale system during the purchase transactions, (d) one or more purchase restrictions defining at least one of a purchase transaction spending limit and any of product categories, product sub-categories and products prohibited for purchase, (e) one or more split-tender rules for allocating payment for the one or more items between the electronic payment system identified by the electronic payment system identifier associated in the database with the matching one of the plurality of customer identification codes and an electronic payment system associated with a third party and (f) a reward preference defining a type of reward to be received, and wherein the instructions stored in the memory further include instructions which, when executed by the processor, cause the processor to:
associate in the database each of the plurality of customer identification codes with a respective one of the plurality of customer preferences, and
if the received second code matches the one of the plurality of unique codes associated in the database with the matching one of the plurality of customer identification codes:
   determine the one or more customer-selected preferences defined by the one of the plurality of customer preferences associated in the database with the matching one of the plurality of customer identification codes, and
   automatically implement the determined one or more customer-selected preferences.

14. One or more non-transitory computer readable media containing instructions for effecting payment for point-of-sale purchases at a retail enterprise, wherein execution of the instructions by one or more processors of a computing system cause the one or more processors to:
in a database having stored therein a plurality of customer identification codes each uniquely identifying a different customer of a retail enterprise, a plurality of unique codes and a plurality of electronic payment system identifiers, associating in the database each of the plurality of customer identification codes with a respective one of the plurality of unique codes and with a respective one of the plurality of electronic payment system identifiers that identifies a corresponding electronic payment system to be used to process payments for purchases made at a point-of-sale system of the retail enterprise,
receive a first code and a second code each manually provided to an input device of a point-of-sale system of the retail enterprise, via user interaction with the input device, as part of a transaction for the purchase at the point-of-sale system of one or more items, and
in response to receipt of the first and second codes,
   (i) access a matching one of the plurality of customer identification codes in the database that matches the received first code,
   (ii) determine the one of the plurality of unique codes and the one of the plurality of electronic payment system identifiers associated in the database with the matching one of the plurality of customer identification codes, and
   (iii) process payment for the one or more items using the electronic payment system identified by the electronic payment system identifier associated in the database with the matching one of the plurality of customer identification codes if the received second code matches the one of the plurality of unique codes associated in the database with the matching one of the plurality of customer identification codes.

15. The one or more non-transitory computer readable media of claim 14, wherein the at least one input device comprises at least one of a keypad and a display having a touch-screen keypad displayed thereon,
   and wherein user interaction with the at least one input device comprises manually entering the first and the second code via the keypad or the touch-screen keypad to supply the first and second codes to the processor.

16. The one or more non-transitory computer readable media of claim 14, wherein the at least one input device comprises an item scanner,
   and wherein the second code is displayed on a display of a mobile electronic device in the form of a scannable code,
   and wherein user interaction with the at least one input device includes manually scanning the scannable code using the item scanner to supply the second code to the processor.

17. The one or more non-transitory computer readable media of claim 16, wherein the first code is included in the scannable code displayed on the display of the mobile electronic device,
   and wherein user interaction with the at least one input device comprises manually scanning the scannable code using the item scanner to supply the first code to the processor.

18. The one or more non-transitory computer readable media of claim 16, wherein the at least one input device comprises at least one of a keypad and a display having a touch-screen keypad displayed thereon,
   and wherein user interaction with the at least one input device further comprises manually entering the first code via the keypad or the touch-screen keypad to supply the first code to the processor.

19. The one or more non-transitory computer readable media of claim 14, wherein the database further has stored therein a plurality of customer preferences each defining one or more customer-selected preferences to be automatically implemented by the processor during processing of purchase transactions at the point-of-sale system according to the first and second codes, wherein the one or more customer-selected preferences include at least one of (a) a manner in which a purchase transaction receipt is to be supplied to the customer, (b) one or more purchase transaction-related items to be displayed or not displayed on a display device of the point-of-sale system during the purchase transactions, (c) one or more messages to be displayed to a cashier operating the point-of-sale system during the purchase transactions, (d) one or more purchase restrictions defining at least one of a purchase transaction spending limit and any of product categories, product sub-categories and products prohibited for purchase, (e) one or more split-tender rules for allocating payment for the one or more items between the electronic payment system identified by the electronic payment system identifier associated in the database with the matching one of the plurality of customer identification codes and an electronic payment system associated with a third party and (f) a reward preference defining a type of reward to be received,
   and wherein execution of the instructions by one or more processors of the computing system causes the one or more processors to:
   associate in the database each of the plurality of customer identification codes with a respective one of the plurality of customer preferences, and
   if the received second code matches the one of the plurality of unique codes associated in the database with the matching one of the plurality of customer identification codes:
      determine the one or more customer-selected preferences defined by the one of the plurality of customer preferences associated in the database with the matching one of the plurality of customer identification codes, and
      automatically implement the determined one or more customer-selected preferences.

20. The one or more non-transitory computer readable media of claim 19, wherein the reward preference defines one of a single-instance reward and a customer purchase history-based reward.

* * * * *